United States Patent
Lim et al.

(10) Patent No.: US 11,950,320 B2
(45) Date of Patent: Apr. 2, 2024

(54) APPARATUS AND METHODS FOR LINKAGE OF OR PROFILE TRANSFER BETWEEN DEVICES

(71) Applicant: Samsung Electronics Co., Ltd., Suwon-si (KR)

(72) Inventors: Taehyung Lim, Suwon-si (KR); Jonghoe Koo, Suwon-si (KR); Kangjin Yoon, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 17/444,359

(22) Filed: Aug. 3, 2021

(65) Prior Publication Data

US 2022/0046409 A1   Feb. 10, 2022

(30) Foreign Application Priority Data

Aug. 4, 2020   (KR) .................. 10-2020-0097436

(51) Int. Cl.
*H04W 8/18*   (2009.01)
*H04L 9/40*   (2022.01)
*H04W 8/20*   (2009.01)
*H04W 12/06*   (2021.01)
*H04W 12/40*   (2021.01)

(52) U.S. Cl.
CPC ......... *H04W 8/183* (2013.01); *H04L 63/0869* (2013.01); *H04W 8/205* (2013.01); *H04W 12/06* (2013.01); *H04W 12/40* (2021.01)

(58) Field of Classification Search
CPC .............................. H04W 8/205; H04W 12/40
See application file for complete search history.

(56) References Cited

U.S. PATENT DOCUMENTS

2016/0241537 A1* 8/2016 Cha .................... H04L 63/20
2018/0212772 A1   7/2018 Leavy et al.
(Continued)

FOREIGN PATENT DOCUMENTS

KR   10-2020-0101257 A   8/2020

OTHER PUBLICATIONS

International Search Report and Written Opinion of the International Searching Authority in connection with International Application No. PCT/KR2021/010163 dated Nov. 12, 2021, 6 pages.

(Continued)

*Primary Examiner* — Barry W Taylor

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure discloses a method and device for naturally associating various available options in moving a bundle or a profile between smart secure media.

18 Claims, 25 Drawing Sheets

(56) References Cited

U.S. PATENT DOCUMENTS

| | | |
|---|---|---|
| 2020/0059778 A1* | 2/2020 | Li .................. H04W 8/205 |
| 2020/0092095 A1 | 3/2020 | Yang et al. |
| 2020/0137572 A1 | 4/2020 | Lee et al. |
| 2020/0221294 A1 | 7/2020 | Kang et al. |
| 2021/0014669 A1* | 1/2021 | Goyal ............ H04W 12/71 |
| 2021/0076195 A1* | 3/2021 | Chaugule ........ H04W 8/205 |
| 2021/0400466 A1* | 12/2021 | Chaugule ........ H04W 88/02 |

OTHER PUBLICATIONS

ETSI TS 103 465 V16.2.0 (Jun. 2020); Technical Specification; Smart Cards; Smart Secure Platform (SSP); Requirements Specification (Release 16); 51 pages.

* cited by examiner

APPARATUS AND METHODS FOR LINKAGE OF OR PROFILE TRANSFER BETWEEN DEVICES

CROSS-REFERENCE TO RELATED APPLICATION

This application is based on and claims priority under 35 U.S.C. 119 to Korean Patent Application No. 10-2020-0097436 filed on Aug. 4, 2020 in the Korean Intellectual Property Office, the disclosure of which is herein incorporated by reference in its entirety.

BACKGROUND

1. Field

The disclosure relates to smart secure media, and more particularly, to apparatus and methods for linking various options in transferring bundle or profile between smart secure media.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, as various services can be provided according to the development of mobile communication systems, a method for effectively providing these services is required. For example, there is a need for a safe and efficient method to move bundles or profiles (or profile packages) online between two devices.

SUMMARY

The disclosed embodiment provides a device and method for naturally linking available options when intending to move a bundle or a profile between security modules included in two electronic devices.

According to various embodiments of the disclosure, a bundle or a profile installed in one device can be transmitted and installed to another device through one of various available options.

According to an embodiment of the disclosure, there is provided a method performed by a first terminal in a wireless communication system, the method comprising: obtaining bundle information; setting an available transfer option based on the bundle information; generating a transfer code including the available transfer option; and transmitting, to a second terminal, the transfer code, wherein a transfer option is determined based on the transfer code.

In an exemplary embodiment, the method further comprises: performing an offline mutual authentication, in case that the transfer option is an offline transfer; in case that the offline mutual authentication is a success, performing an offline eligibility check; and in case that the offline mutual authentication is a failure, performing an online eligibility check.

In an exemplary embodiment, the method further comprises: in case that the offline eligibility check is a success, performing an offline transfer; and in case that the offline eligibility check is a failure, performing an online eligibility check.

In an exemplary embodiment, the method further comprises: performing an online eligibility check; in case that the online eligibility check is a success, performing an online transfer; and in case that the online eligibility check is a failure, performing a re-provisioning.

In an exemplary embodiment, the second terminal is an embedded Subscriber Identity Module (eSIM) or an Integrated Smart Secure Platform (iSSP).

In accordance with another aspect of the disclosure, a method performed by a second terminal in a wireless communication system, the method comprising: receiving, from a first terminal, a transfer code including an available transfer option; and determining a transfer option based on the transfer code, wherein the available transfer option is set based on bundle information.

In accordance with another aspect of the disclosure, a first terminal in a wireless communication system, the first terminal comprising: a transceiver; and a controller coupled with the transceiver and configured to control to: obtain bundle information, set an available transfer option based on the bundle information, generate a transfer code including the available transfer option, and transmit, to a second terminal, the transfer code, wherein a transfer option is determined based on the transfer code.

In accordance with another aspect of the disclosure, a second terminal in a wireless communication system, the second terminal comprising: a transceiver; and a controller coupled with the transceiver and configured to control to: receive, from a first terminal, a transfer code including an available transfer option, and determine a transfer option based on the transfer code, wherein a transfer option is determined based on the transfer code.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
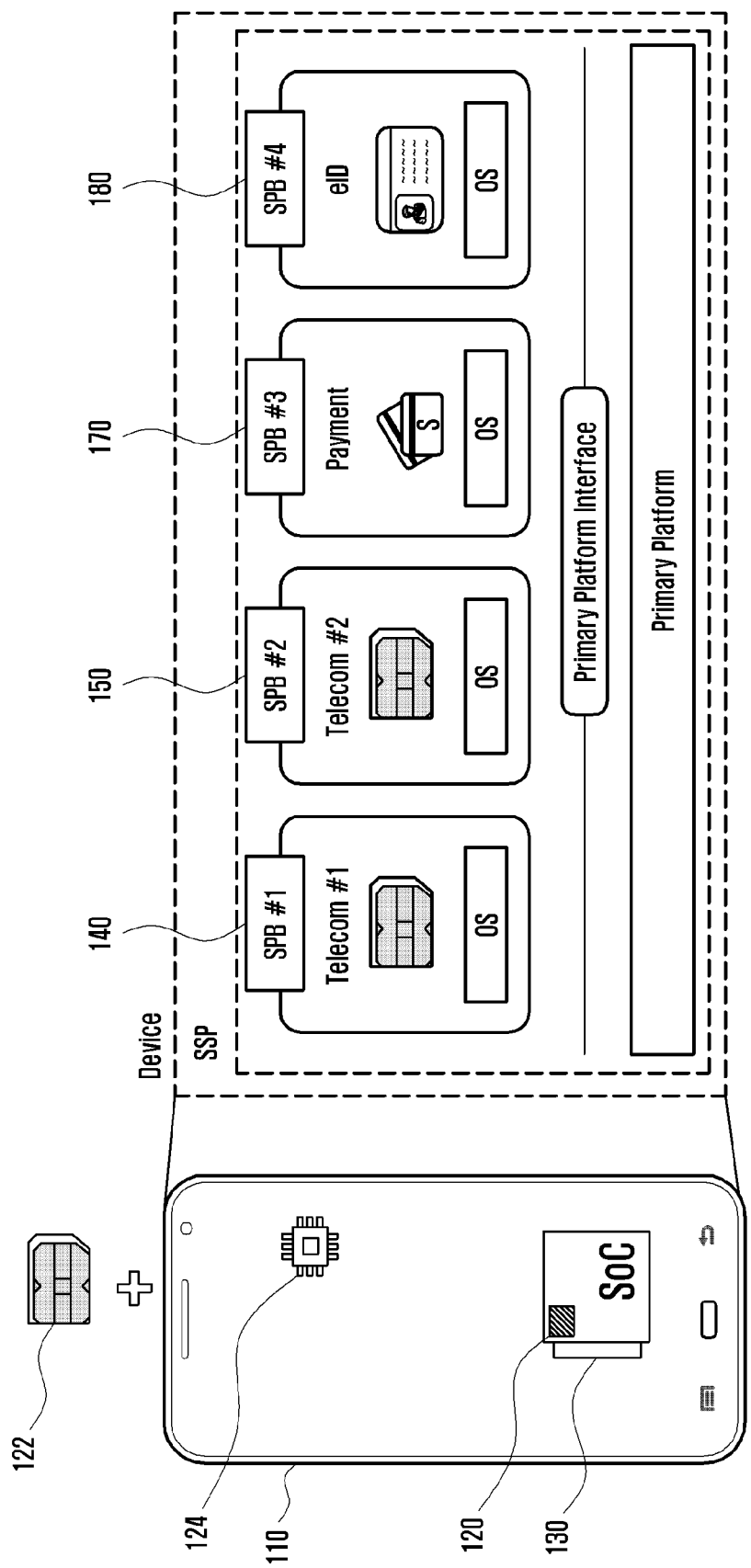
FIG. 1 illustrates a conceptual diagram of an SSP according to an embodiment of the disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method for achieving them will become apparent with reference to the embodiments described below in detail in conjunction with the accompanying drawings. However, the disclosure is not limited to the embodiments disclosed below, but may be implemented in various different forms, and only the present embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing specified logical function(s). Further, it should also be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as FPGA or ASIC, and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, and processes, functions, properties, and procedures, subroutines, segments of program code, drivers, firmware, microcode, circuitry, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card.

In the disclosure, modifiers such as first and second indicating terms may be used for distinguishing each term from each other in describing embodiments. Terms modified by modifiers such as first and second may refer to different objects. However, terms modified by modifiers such as first and second may refer to the same object. That is, modifiers such as first and second may be used for referring to the same object from different viewpoints. For example, modifiers such as first and second may be used for distinguishing the same object in terms of a function or an operation. For example, a first user and a second user may refer to the same user.

Further, in the disclosure, each embodiment is described by taking an SSP and an UICC as an example of the security medium, but the scope of the disclosure is not limited by the SSP and the UICC. For example, it is apparent to those skilled in the art that various embodiments to be described below may be applied substantially the same as or similar to other security media that perform substantially the same functions as or similar functions to those of the SSP and the UICC.

Specific terms used in the following description are provided to help the understanding of the disclosure, and the use of such specific terms may be changed to other forms without departing from the technical spirit of the disclosure.

A "secure element (SE)" means a security module that stores security information (e.g., mobile communication network access key, user identification information such as ID/passport, credit card information, encryption key, and the like) and that is configured with a single chip that can mount and operate a control module (e.g., a network access control module such as a USIM, an encryption module, a key generation module, and the like) using the stored security information. The SE may be used in various electronic devices (e.g., smartphones, tablet PCs, wearable devices, automobiles, IoT devices, and the like), and provide security services (e.g., mobile communication network access, payment, user authentication, and the like) through security information and control modules.

The SE may be divided into an universal integrated circuit card (UICC), an embedded secure element (eSE), and a smart secure platform (SSP), which is an integrated form of the UICC and the eSE, and may be subdivided into removable and embedded according to the form of connection to or installation in the electronic device, and integrated that is integrated into a specific element or system on chip (SoC).

A "universal integrated circuit card (UICC)" is a smart card using by inserting into a mobile communication terminal, and is also referred to as a UICC card. The UICC may include an access control module for accessing a network of a mobile operator. Examples of the access control module may include a universal subscriber identity module (USIM), a subscriber identity module (SIM), and an IP multimedia service identity module (ISIM). A UICC including a USIM is usually referred to as a USIM card. Similarly, a UICC including a SIM module is commonly referred to as a SIM card. However, the SIM module may be loaded upon producing the UICC, or a SIM module of a mobile communication service in which a user wants to use at a desired time may be downloaded to the UICC card. Further, a plurality of SIM modules may be downloaded and installed in the UICC card, and at least one SIM module thereof may be selected and used. Such a UICC card may or may not be fixed to the terminal. A UICC that is fixed to and used in a terminal is referred to as an embedded UICC (eUICC), and in particular, a communication processor of the terminal, an application processor, or a UICC built into a system-on-chip (SoC) including a single processor structure in which the two processors are integrated is referred to as an integrated UICC (iUICC). In general, the eUICC and the iUICC may mean a UICC card including a function that is fixedly used in a terminal and of remotely downloading at least one SIM module to the UICC card, and enabling any one of the downloaded SIM modules to be selected. In the disclosure, a UICC card including a function of remotely downloading at least one SIM module and enabling a SIM module to be selected is collectively referred to as an eUICC or an iUICC. That is, among UICC cards including a function for remotely downloading a SIM module and enabling a SIM module to be selected, a UICC card that is fixed or not fixed to a terminal is collectively referred to as eUICC or iUICC.

In this disclosure, the term UICC may be used interchangeably with a SIM, and the term eUICC may be used interchangeably with an eSIM.

An "eUICC identifier (eUICC ID)" may be an object identifier of the eUICC embedded in the terminal, and may be referred to as an EID. Further, when a provisioning profile is pre-loaded in the eUICC, the eUICC ID may be a profile ID of the corresponding provisioning profile. Further, in an embodiment of the disclosure, when the terminal and the eUICC chip are not separated, the eUICC ID may be a terminal ID. Further, the eUICC ID may refer to a specific secure domain of the eUICC chip.

An "embedded secure element (eSE)" refers to a fixed SE that is used by being fixed to an electronic device. The eSE is typically produced exclusively for a manufacturer by the request of a terminal manufacturer, and may be produced including an operating system and a framework. An applet-type service control module may be remotely downloaded and installed in the eSE, and the installed service control module may be used for various security services such as an electronic wallet, ticketing, an e-passport, and a digital key. In the disclosure, an SE in the form of a single chip attached to an electronic device, in which a service control module may be remotely downloaded and installed, is collectively referred to as an eSE.

A "smart secure platform (SSP)" means a single chip capable of integrating functions of an UICC and an eSE. The SSP may be divided into a removable SSP (rSSP), an embedded SSP (eSSP) and an integrated SSP (iSSP) built-in an SoC. The SSP may include one primary platform (PP) and at least one secondary platform bundle (SPB) operating on the PP, and the PP may include at least one of a hardware platform or a low level operating system (LLOS), and the SPB may include at least one of a high-level operating system (HLOS) or an application running on the HLOS. The SPB is referred to as an SPB or a bundle. The bundle may access resources such as a central processing unit and a memory of the PP through a primary platform interface (PPI) provided by the PP, thereby being run on the PP. Communication applications such as a subscriber identification module (SIM), a universal SIM (USIM), and an IP multimedia SIM (ISIM) may be loaded in the bundle, and various application such as an electronic wallet, ticketing, an electronic passport, and a digital key may be loaded. In the disclosure, the SSP may be referred to as a smart secure medium.

The SSP may be used for the above-described UICC or eSE purpose according to a bundle downloaded and installed, and because a plurality of bundles are installed in a single SSP and operated at the same time, the SSP may be used for a mixed purpose of the UICC and the eSE. That is, when a bundle including a profile operates, the SSP may be used for a UICC for accessing a network of a mobile operator. In the UICC bundle, at least one profile such as the above-described eUICC or iUICC may be remotely downloaded into the bundle, and any one or more profiles may be selected. Further, when a bundle including a service control module loaded with application applications capable of providing services such as an electronic wallet, ticketing, an e-passport, or a digital key operates on the SSP, the SSP may be used for the above-described eSE purpose. A plurality of service control modules may be installed and operated as integrated into one bundle or may be installed and operated as an independent bundle.

In the SSP, a bundle may be downloaded and installed from a secondary platform bundle manager (SPB Manager) using over the air (OTA) technology, or a bundle may be transmitted and installed from another terminal. In the disclosure, a method of installing the downloaded or transmitted bundle may be applied in the same manner to a removable SSP (rSSP) that may be inserted into and removed from the terminal, a fixed SSP (eSSP) installed in the terminal, and an integrated SSP (iSSP) included in the SoC installed in the terminal.

The "SSP identifier (SSP ID)" is an object identifier of the SSP built into the terminal and may be referred to as an sspID. Further, when a terminal and an SSP chip are not separated, as in the embodiment of the disclosure, the SSP ID may be a terminal ID. Further, the SSP ID may refer to a specific bundle identifier (SPB ID) in the SSP. In more detail, the SSP ID may refer to a bundle identifier of a management bundle or a secondary platform bundle loader (SPBL) that manages installation, enabling, disabling, and deletion of other bundles in the SSP. Further, the SSP ID may refer to a primary platform identifier in the SSP. The SSP may have a plurality of SSP identifiers, and the plurality of SSP identifiers may be values derived from a single unique SSP identifier.

A "part number ID" is information connected to the SSP built in the terminal, and may be information that may infer a 'manufacturer of a primary platform mounted on the SSP' and 'model information of the primary platform' using the information.

The "secondary platform bundle (SPB)" is driven using resources of the PP on a primary platform (PP) of the SSP, and for example, the UICC bundle may mean that an application, a file system, and an authentication key stored in the existing UICC, and an operating system (HLOS) in which they operate are packaged in the form of software. In this disclosure, an SPB may be referred to as a bundle.

In the disclosure, a "status" of a bundle may be as follows.

[Enable]

In the disclosure, an operation of enabling a bundle by a terminal or an external server may mean an operation of changing a status of a corresponding SPB to an enabled status and setting the terminal to receive a service provided by the bundle (e.g., a communication service, a credit card payment service, a user authentication service, and the like through a mobile operator). A bundle in an enabled status may be represented as an "enabled bundle". The bundle in the enabled status may be stored in an encrypted status in a storage space inside or outside the SSP.

[Active]

An enabled bundle in the disclosure may be changed to an active status according to a bundle external input (e.g., a user input, push, a request of an application in a terminal, an authentication request from a mobile operator, PP management message, and the like) or an operation within the bundle (e.g., timer, polling). The bundle in an active status may mean a bundle in a status that may be loaded into an operating memory inside the SSP in a storage space inside or outside the SSP, and in which security information may be processed using a secure CPU inside the SSP and in which a security service may be provided to the terminal.

[Disabled]

In the disclosure, an operation of disabling a bundle by a terminal or an external server may mean an operation of changing a status of the corresponding bundle to a disabled status and setting the terminal so that the terminal cannot receive a service provided by the bundle. An SPB in the disabled state may be represented as a "disabled bundle". A bundle in a disabled status may be stored in an encrypted status in a storage space inside or outside the SSP.

[Deleted]

In the disclosure, an operation of deleting a bundle by a terminal or an external server may mean an operation of changing a status of a corresponding bundle to a deleted status or deleting related data of the corresponding bundle including the corresponding bundle and setting the terminal or the external server so that the terminal or the external server may no longer drive, enable, or disable the corresponding bundle. A bundle in a deleted status may be represented as a "deleted bundle".

A "bundle image (or image)" may be used interchangeably with a bundle or may be used as a term referring to a data object of a specific bundle, and may be referred to as a bundle TLV (Tag, Length, Value) or a bundle image TLV. When the bundle image is encrypted using encryption parameters, the bundle image may be referred to as a protected bundle image (PBI) or a protected bundle Image TLV (PBI TLV). When the bundle image is encrypted using an encryption parameter that can only be decrypted by a specific SSP, the bundle image may be referred to as a bound bundle image (BBI) or a bound bundle image TLV (BBI TLV). The bundle image TLV may be a data set representing information constituting a bundle in a TLV (Tag, Length, Value) format.

A "bundle identifier" may be referred to as a factor matched to a bundle identifier (SPB ID), a bundle family identifier (SPB Family ID), a bundle family manager identifier (SPB Family Custodian Object ID), a bundle Matching ID, and an event identifier (Event ID). The bundle identifier (SPB ID) may indicate an object identifier of each bundle. The bundle family identifier may indicate an identifier for classifying the type of a bundle (e.g., a telecom bundle for accessing a mobile communication company network). In the disclosure, the bundle family identifier may be referred to as a family ID, Fid, or FID. The bundle family manager identifier may indicate an identifier that identifies a subject (e.g., a mobile operator, a terminal manufacturer, a specific organization, and the like) that manages the bundle family identifier. In the disclosure, the bundle family manager identifier may be referred to as an OID or Oid. The bundle identifier may be used as a value that can index bundles in the bundle management server or the terminal.

"Bundle metadata" is a term indicating a set of information that can refer to or describe a bundle. The bundle metadata may include the above-described bundle identifier. Further, bundle metadata may further include information on properties, characteristics, or settings of the bundle. Bundle metadata may be represented as "metadata".

A "profile" may mean a data object such as an application, a file system, and an authentication key value stored in an UICC.

In the disclosure, a "profile package" may mean that contents of the "profile" are packaged in the form of software that may be installed in the UICC. The 'profile package' may be referred to as a profile TLV or a profile package TLV. When the profile package is encrypted using an encryption parameter, the profile package may be referred to as a protected profile package (PPP) or a protected profile package TLV (PPP TLV). When the profile package is encrypted using an encryption parameter that can only be decrypted by a specific eUICC, the profile package may be referred to as a bound profile package (BPP) or a bound profile package TLV (BPP TLV). The profile package TLV may be a data set representing information constituting a profile in a TLV (Tag, Length, Value) format.

In the disclosure, a 'profile image' may mean binary data in which a profile package is installed in the UICC. The 'profile image' may be referred to as a Profile TLV or a profile image TLV. When the profile image is encrypted using an encryption parameter, the 'profile image' may be referred to as a protected profile image (PPI) or a protected profile image TLV (PPI TLV). When the profile image is encrypted using an encryption parameter that can only be decrypted by a specific eUICC, the 'profile image' may be referred to as a bound profile image (BPI) or a bound profile image TLV (BPI TLV). The profile image TLV may be a data set representing information constituting a profile in a TLV (Tag, Length, Value) format.

In the disclosure, a "status" of the profile may be as follows.

[Enable]

In the disclosure, an operation in which a terminal enables a profile may mean an operation of changing a status of a corresponding profile to an enabled state and setting the terminal to receive a communication service through the mobile operator that provides the profile. The profile in the enabled status may be represented as an "enabled profile".

[Disable]

In the disclosure, an operation in which a terminal disables a profile may mean an operation of changing a status of a corresponding profile to disabled and setting the terminal not to receive a communication service through the mobile operator that provides the profile. A profile in a disabled status may be represented as a "disabled profile".

[Delete]

In the disclosure, an operation in which a terminal deletes a profile may mean an operation of changing a status of a corresponding profile to deleted and setting the terminal to no longer enable or disable the corresponding profile. A profile in a deleted status may be represented as a "deleted profile".

In the disclosure, an operation in which the terminal enables, disables, or deletes a profile may mean an operation of only first marking a status of each profile as to be enabled, to be disabled, or to be deleted instead of changing immediately a status of each profile to enabled, disabled, or deleted, and in which the terminal or the UICC of the terminal performs a specific operation (e.g., perform a refresh or reset command) and then changes a status of each profile to enabled, disabled, or deleted. An operation of marking a status of a specific profile to a scheduled status (i.e., to be enabled, to be disabled, or to be deleted) is not necessarily limited to displaying one scheduled status for one profile, and may include displaying each of one or more profiles in the same or different scheduled status, display one profile in one or more scheduled statuses, or display each of one or more profiles the same as or different from each other in one or more scheduled statuses.

Further, when the terminal displays one or more scheduled statuses for a random profile, two scheduled status displays may be integrated into one. For example, when a random profile is displayed as to be disabled and to be deleted, the profile may be combined and displayed as to be disabled and deleted.

Further, an operation in which the terminal displays a scheduled status of one or more profiles may be performed sequentially or simultaneously. Further, an operation in which the terminal displays a scheduled status of one or more profiles and then changes a status of an actual profile may be performed sequentially or simultaneously.

A "profile Identifier" may be referred to as an factor matched to a profile ID, an integrated circuit card ID (ICCID), a matching ID, an event ID, an activation code, an activation code token, a command code, a command code token, a signed command code, an unsigned command code, an ISD-P, or a profile domain (PD). The profile ID may indicate an object identifier of each profile. The profile identifier may further include an address of a profile providing server (SM-DP+) that can index the profile. Further, the profile identifier may further include a signature of the profile providing server (SM-DP+).

A "bundle management server" may include a function of generating a bundle by a request of a service provider or other bundle management server, encrypting the generated bundle, generating a bundle remote management instruction, or encrypting the generated bundle remote management instruction. The bundle management server that provides the above functions may be represented with at least one of a secondary platform bundle manager (SPBM), a remote bundle manager (RBM), an image delivery server (IDS), subscription manager data preparation (SM-DP), subscription manager data preparation plus (SM-DP+), a manager bundle server, managing subscription manager data preparation plus (managing SM-DP+), a bundle encryption server, a bundle generation server, a bundle provisioner (BP), a bundle provider, or a bundle provisioning credentials holder) (BPC holder)

In the disclosure, the bundle management server may perform a function of downloading, installing, or updating bundles from the SSP and managing settings of keys and certificates for remotely managing a bundle status. The bundle management server that provides the above functions may be represented with at least one of a secondary platform bundle manager (SPBM), a remote bundle manager (RBM), an image delivery server (IDS), subscription manager secure routing (SM-SR), subscription manager secure routing plus (SM-SR+), an off-card entity of an eUICC profile manager or a profile management credentials holder (PMC holder), or an eUICC Manager (EM).

In the disclosure, the open relay server may receive an event register request (register event request) from one or more bundle management servers or open relay servers. Further, one or more open relay servers may be used in combination, and in this case, a first open relay server may receive an event register request from not only the bundle management server but also a second open relay server. In the disclosure, a function of the open relay server may be integrated into the bundle management server. The open relay server that provides the above functions may be represented with at least one of a secondary platform bundle manager (SPBM), a remote bundle manager (RBM), a secondary platform bundle discovery server (SPBDS), a bundle discovery Server (BDS), a subscription manager discovery service (SM-DS), a discovery service (DS), a root SM-DS, or an alternative SM-DS.

In the disclosure, the bundle management server may refer to a server that performs both a function of generating, encrypting, and transmitting a bundle or a bundle remote management instruction, and a function of setting an SSP and managing an installed bundle. Further, the bundle management server may refer to a server capable of further performing a function of an open relay server. Therefore, in various embodiments of the disclosure, operations of the bundle management server and the open relay server may be performed in one bundle management server. Further, each function may be divided and performed by a plurality of bundle management servers separated from each other. Further, in the specification of the disclosure, the bundle management server or the open relay server may be represented as a bundle server. The bundle server may be one of the bundle management server and the open relay server, and be a device including both functions and configuration of the bundle management server and the open relay server.

A "remote SIM provisioning server (RSP Server)" may be used as a name indicating a profile providing server, a profile management server, and/or an open relay server to be described later. The RSP server may be represented as subscription manager XX (SM-XX).

In the disclosure, the "profile providing server" may include a function of generating a profile, encrypting a generated profile, generating a profile remote management instruction, or encrypting a generated profile remote management instruction. The profile providing server may be represented as subscription manager data preparation (SM-DP), subscription manager data preparation plus (SM-DP+), off-card entity of profile domain, a profile encryption server, a profile generation server, a profile provisioner (PP), a profile provider, and a profile provisioning credentials holder (PPC holder).

In the disclosure, the "profile management server" may include a function for managing a profile. The profile management server may be represented with subscription manager secure routing (SM-SR), subscription manager secure routing plus (SM-SR+), off-card entity of an eUICC profile manager, or a profile management credentials holder (PMC holder), an eUICC Manager (EM), a profile manager (PP), and the like.

In the disclosure, the profile providing server may mean a combination of the functions of the profile management server. Accordingly, in various embodiments of the disclosure, an operation of the profile providing server may be performed by the profile management server. Similarly, an operation of the profile management server or SM-SR may be performed by the profile providing server.

In the disclosure, the "open relay server" may be represented as a subscription manager discovery service (SM-DS), a discovery service (DS), a root subscription manager discovery service (Root SM-DS), and an alternative subscription manager discovery service (alternative SM-DS). The open relay server may receive a register event request (or event register request) from one or more profile providing servers or open relay servers. Further, one or more open relay servers may be used in combination, and in this case, a first open relay server may receive an event register request from a second open relay server as well as the profile providing server.

A "service provider" may refer to a business entity that issues a requirement to a bundle management server to request bundle generation and that provides a service to a terminal through the bundle. For example, the service provider may mean a mobile operator that provides a communication network access service through a bundle loaded with a communication application, and may be collectively referred to a business supporting system (BSS), an operational supporting system (OSS), a point of sale terminal (POS terminal), and other IT systems of the mobile operator. Further, in the disclosure, the service provider is not limited to representing only one specific business entity, and may be used as a term referring to a group or association (or consortium) of one or more business entities or a representative representing the group or association. Further, in the disclosure, a service provider may be referred to as an operator (or OP or Op.), a bundle owner (BO), an image owner (IO), and the like, and each service provider may set or receive at least one name and/or object identifier (OID). When a service provider refers to a group, association, or representative of one or more business entities, a name or an object identifier of any group, association, or representative may be a name or an object identifier shared by all business entities belonging to the group or association or all business entities cooperating with the representative.

A "mobile operator" may refer to a business entity that provides a communication service to a terminal, and may be collectively referred to a business supporting system (BSS), an operational supporting system (OSS), a point of sale terminal (POS terminal), and other IT systems thereof. Further, in the disclosure, the mobile operator is not limited to representing only one specific business entity that provides communication services, but may be used as a term referring to a group or association (or consortium) of one or more businesses entity or an representative representing the group or association Further, in the disclosure, a mobile operator may be referred to as an operator (or OP or Op.), a mobile network operator (MNO), a mobile virtual network operator (MVNO), a service provider (or SP), a profile owner (PO), and the like, and each mobile operator may set or receive at least one name and/or object identifier (OID) of the mobile operator. When a mobile operator refers to a group, association, or representative of one or more business entity, a name or an object identifier of any group, association, or representative may be a name or an object identifier shared by all business entities affiliated with the group, association, or all business entities cooperating with the representative.

A "subscriber" may be used as a term referring to a service provider having ownership of the terminal or an end user having ownership of the terminal. In general, a terminal owned by a service provider may be referred to as an M2M device, and a terminal owned by a user may be referred to as a consumer device. In the case of an M2M terminal, although it does not have ownership of the terminal, but an end user may exist who transfers or leases the terminal from a service provider, and in this case, the subscriber may be different from or the same as the service provider.

"Subscriber intent" may be used as a generic term for the intention of a subscriber to manage a bundle locally or remotely. Further, in the case of local management, the subscriber intent refers to end user intent, and in the case of remote management, the subscriber intent may be used as a term referring to service provider intent.

"End user consent" may be used as a term indicating whether the user agrees to perform local management or remote management.

The 'terminal' may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and reproduction appliances having a wireless communication function, and Internet home appliances capable of wireless Internet access and browsing, as well as portable units or terminals incorporating combinations of such functions. Further, the terminal may include a machine to machine (M2M) terminal and a machine type communication (MTC) terminal/device, but is not limited thereto. In the disclosure, the terminal may be referred to as an electronic device.

In the disclosure, an SSP capable of downloading and installing a bundle may be embedded in the electronic device. When the SSP is not embedded in the electronic device, the SSP physically separated from the electronic device may be inserted into the electronic device to be connected to the electronic device. For example, the SSP may be inserted into the electronic device in the form of a card. The electronic device may include a terminal, and the terminal may be a terminal including an SSP capable of downloading and installing a bundle. The SSP may not only be embedded in the terminal, but may be inserted into the terminal when the terminal and the SSP are separated, and may be inserted into the terminal to be connected to the terminal.

In the disclosure, a UICC that may be installed by downloading a profile may be embedded in the electronic device. When the UICC is not embedded in the electronic device, the UICC physically separated from the electronic device may be inserted into the electronic device to be connected to the electronic device. For example, the UICC may be inserted into the electronic device in the form of a card. The electronic device may include a terminal, and in this case, the terminal may be a terminal including a UICC that may be installed by downloading a profile. The UICC may be embedded in the terminal, and when the terminal and the UICC are separated, the UICC may be inserted into the terminal, and be inserted into the terminal to be connected to the terminal. A UICC that may be installed by downloading a profile may be referred to as, for example, an eUICC.

"Local bundle assistant (LBA)" may refer to software or an application installed in a terminal or an electronic device in order to control the SSP. The above-described software or application may be referred to as a local bundle manager (LBM).

A "secondary platform bundle loader (SPBL)" may refer to a management bundle that manages installation, enable, disable, and deletion of other bundles in the SSP. The LBA of the terminal or the remote server may install, enable, disable, or delete a specific bundle through the loader. In the disclosure, the operation of the loader may be described as an operation of an SSP including the loader.

"Local profile assistant (LPA)" may refer to software or an application installed in a terminal or an electronic device in order to control an UICC or eUICC in the terminal or the electronic device.

"Event" may be used in the disclosure for the following purposes.

[When Used in Association with a Bundle]

An "event" may be a collective term for bundle download, remote bundle management, or other management/processing instructions of a bundle or an SSP. The event may be referred to as a remote bundle provisioning operation (or RBP operation) or an event record, and each event may be identified as an event identifier (or Event ID, EventID) corresponding thereto, a matching identifier (or Matching ID, MatchingID), and an address (FQDN, IP Address, or URL) of a bundle management server or an open relay server in which the corresponding event is stored, or data including at least one of each server identifier. Bundle download may be used interchangeably with bundle installation. Further, an event type may be used as a term indicating whether a specific event is bundle download, remote bundle management (e.g., delete, enable, disable, replace, update, and the like), or other management/processing commands of the bundle or the SSP. Further, the event type may be referred to as an operation type (or OperationType), an operation class (or OperationClass), an event request type, an event class, and an event request class, and the like.

"Local bundle management (LBM)" may be referred to as bundle local management, local management, local management command, local command, local bundle management package (LBM package), a bundle local management package, a local management package, a local management command package, a local command package, and the like. LBM may be used for installing a random bundle, changing a status (enabled, disabled, deleted) of a specific bundle, or updating contents of a specific bundle (e.g., bundle nickname or bundle metadata, and the like) through software installed in the terminal. The LBM may include one or more local management commands, and a target bundle of each local management command may be the same or different for each local management command.

"Remote bundle management (RBM)" may be referred to as bundle remote management, remote management, remote management command, remote command, remote bundle management package (RBM package), bundle remote management package, remote management package, remote management command package, remote command package, and the like. RBM may be used for installing a random bundle, changing a status (enabled, disabled, deleted) of a specific bundle, or updating contents of a specific bundle (e.g., bundle nickname, bundle metadata, or the like). The RBM may include one or more remote management commands, and a target bundle of each remote management command may be the same or different for each remote management command.

A "target bundle" may be used as a term referring to a bundle to be a target of a local management command or a remote management command.

A "bundle Rule" may be used as a term referring to information that the terminal should check when performing local management or remote management for a target bundle. Further, the bundle rule may be used interchangeably with terms such as a bundle policy, a rule, and a policy.

[When Used in Association with a Profile]

An "event" may be a general term for profile download, remote profile management, or management/processing instructions of other profiles or eUICCs. The event may be referred to as a remote SIM provisioning operation, an RSP operation, or an event record, and each event may be referred to as data including at least one of an event identifier (or Event ID, EventID) corresponding thereto, or matching identifier (or Matching ID, MatchingID), a profile providing server (SM-DP+) in which the corresponding event is stored, an address (FQDN, IP Address, or URL) of a subscription manager discovery service (SM-DS), a signature of a profile providing server (SM-DP+) or the subscription manager discovery service (SM-DS), or a digital certificate of a profile providing server (SM-DP+) or the subscription manager discovery service (SM-DS).

Data corresponding to an event may be referred to as a "command code". Part or all of procedures using the command code may be referred to as a "command code processing procedure", a "command code procedure", or "local profile assistant application programming interface (LPA API)". Profile download may be used interchangeably with profile Installation.

Further, an "event type" may be used as a term indicating whether a particular event is a profile download, remote profile management (e.g., delete, enable, disable, replace, update, and the like) or other profile or eUICC management/processing command and may be referred to as an operation type (or OperationType), operation class (or OperationClass), event request type, event class, event request class, and the like. A random event identifier (EventID or MatchingID) may designate a path or usage purpose (EventID Source or MatchingID Source) in which the terminal obtains the corresponding event identifier (EventID or MatchingID).

"Local profile management (LPM)" may be referred to as profile local management, local management, local management command, local command, local profile management package (LPM package), profile local management package, local management package, local management command package, local command package, and the like. LPM may be used for changing a status (enabled, disabled, deleted) of a specific profile through software installed in the terminal or updating contents of a specific profile (e.g., profile nickname, profile metadata, or the like). The LPM may include one or more local management commands, and in this case, a target profile of each local management command may be the same or different for each local management command.

"Remote profile management (RPM)" may be referred to as profile remote management, remote management, remote management command, remote command, remote profile management package (RPM package), profile remote management package, remote management package, remote management command package, remote command package, and the like. RPM may be used for changing a status (enabled, disabled, deleted) of a specific profile or updating contents of a specific profile (e.g., profile nickname, profile metadata, and the like). The RPM may include one or more remote management commands, and in this case, a target profile of each remote management command may be the same or different for each remote management command.

A "certificate" or a digital certificate may represent a digital certificate used for a mutual authentication based on an asymmetric key configured in a pair of a public key (PK) and a secret key (SK). Each certificate may include one or more public keys (PK), a public key identifier (PKID) corresponding to each public key, and a certificate issuer ID and digital signature of a certificate issuer (CI) issued the corresponding certificate. Further, the certificate issuer may be referred to as a certification issuer, a certificate authority (CA), a certification authority, and the like. In the disclosure, a public key (PK) and a public key identifier (PKID) may be used as a meaning that refers to a specific public key or a certificate including the corresponding public key, a part of a specific public key or a part of a certificate including the corresponding public key, an operation result (e.g., hash) value of a specific public key or an operation result (e.g., hash) value of a certificate including the corresponding public key, an operation result (e.g., hash) value of a part of a specific public key or an operation result (e.g., hash) value of a part of a certificate including a corresponding public key, or a storage space in which data is stored.

A "certificate chain" or a certificate hierarchy may indicate a correlation between certificates when a certificate (primary certificate) issued by a "certificate issuer" is used for issuing another certificate (secondary certificate) or when secondary certificates are used for jointly issuing third or higher certificates. In this case, a CI certificate used for issuing an initial certificate may be referred to as a root of certificate, a top certificate, a root CI, a root CI certificate, a root CA, a root CA certificate, and the like.

In describing the disclosure, when it is determined that a detailed description of a related known function or configuration may unnecessarily obscure the subject matter of the disclosure, a detailed description thereof will be omitted.

Hereinafter, various embodiments of a method and a device for moving and installing a bundle between terminals will be described.

FIG. 1 illustrates a conceptual diagram of an SSP according to an embodiment of the disclosure.

Referring to FIG. 1, according to an embodiment of the disclosure, a terminal 110 may include an SSP 120. For example, the SSP 120 may be embedded in an SoC 130 of the terminal 110. In this case, the SoC 130 may be a communication processor, an application processor, or a processor in which the two processors are integrated. For another example, the SSP 120 may be a detachable type 122 in the form of an independent chip without being integrated into the SoC or may be a built-in type 124 pre-built in the terminal 110.

According to various embodiments, the SSP 120 included in the terminal may include at least one of one or more telecom bundles, one or more payment bundles, or one or more electronic ID bundles. For example, as illustrated in FIG. 1, when a plurality of telecom bundles 140 and 150 are included in the SSP 120, the terminal 110 may enable to operate the plurality of telecom bundles 140 and 150 simultaneously or in time division according to settings to use a mobile communication network. Further, when a payment bundle 170 and an electronic ID bundle 180 are included in the SSP 120, the terminal 110 may use online payment through a terminal app or offline payment through an external credit card point of sale (PoS) device using the payment bundle 170, and authenticate the identity of a terminal owner using the electronic ID bundle 180.

Figure 2:
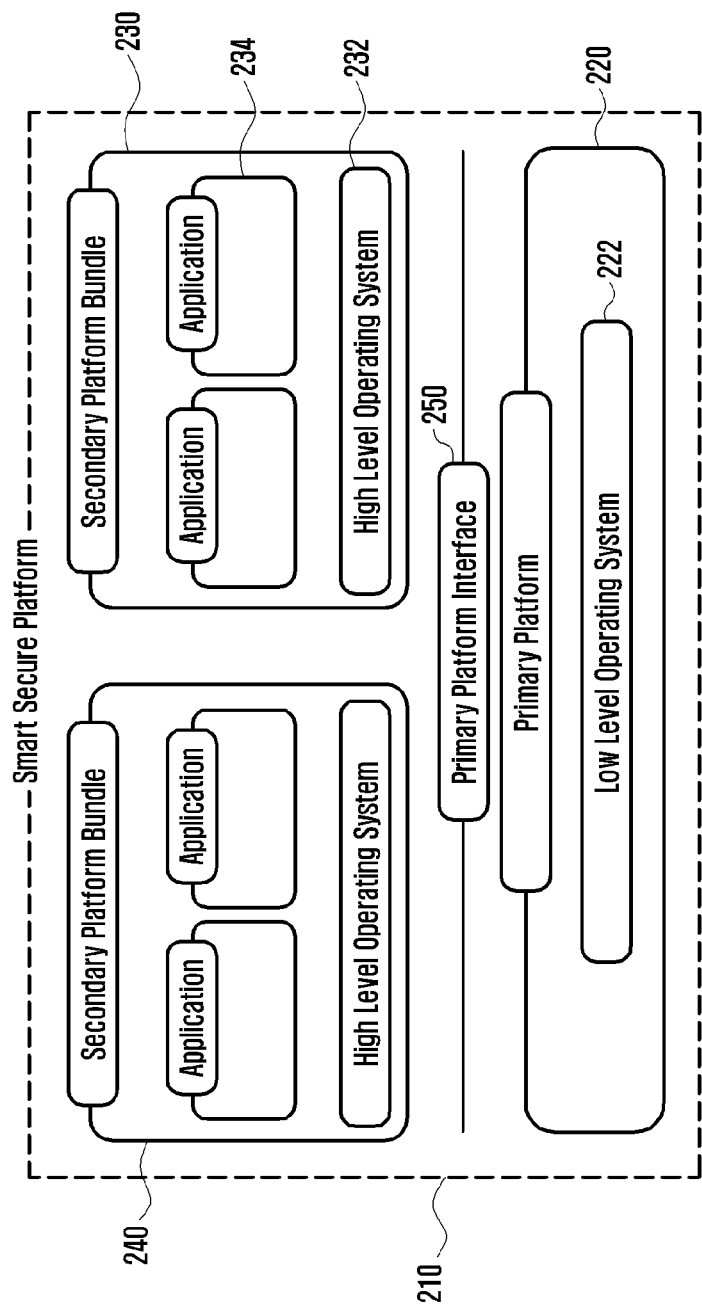
FIG. 2 illustrates a conceptual diagram of an internal structure of an SSP according to an embodiment of the disclosure.

FIG. 2 illustrates a conceptual diagram of an internal structure of an SSP according to an embodiment of the disclosure.

Referring to FIG. 2, according to an embodiment of the disclosure, an SSP 210 may include one primary platform (PP) 220 and at least one secondary platform bundle (SPB) 230 and 240 operating thereon.

According to various embodiments, the primary platform 220 may include hardware (not illustrated) and at least one low level operating system (LLOS) 222.

According to various embodiments, the secondary platform bundle 230 may include a high-level operating system (HLOS) 232 and at least one application 234 operating thereon.

According to various embodiments, each of the secondary platform bundles 230 and 240 may access resources such as a central processing unit and a memory of the primary platform 220 using a primary platform interface (PPI) 250, thereby being driven in the SSP 210.

Figure 3:
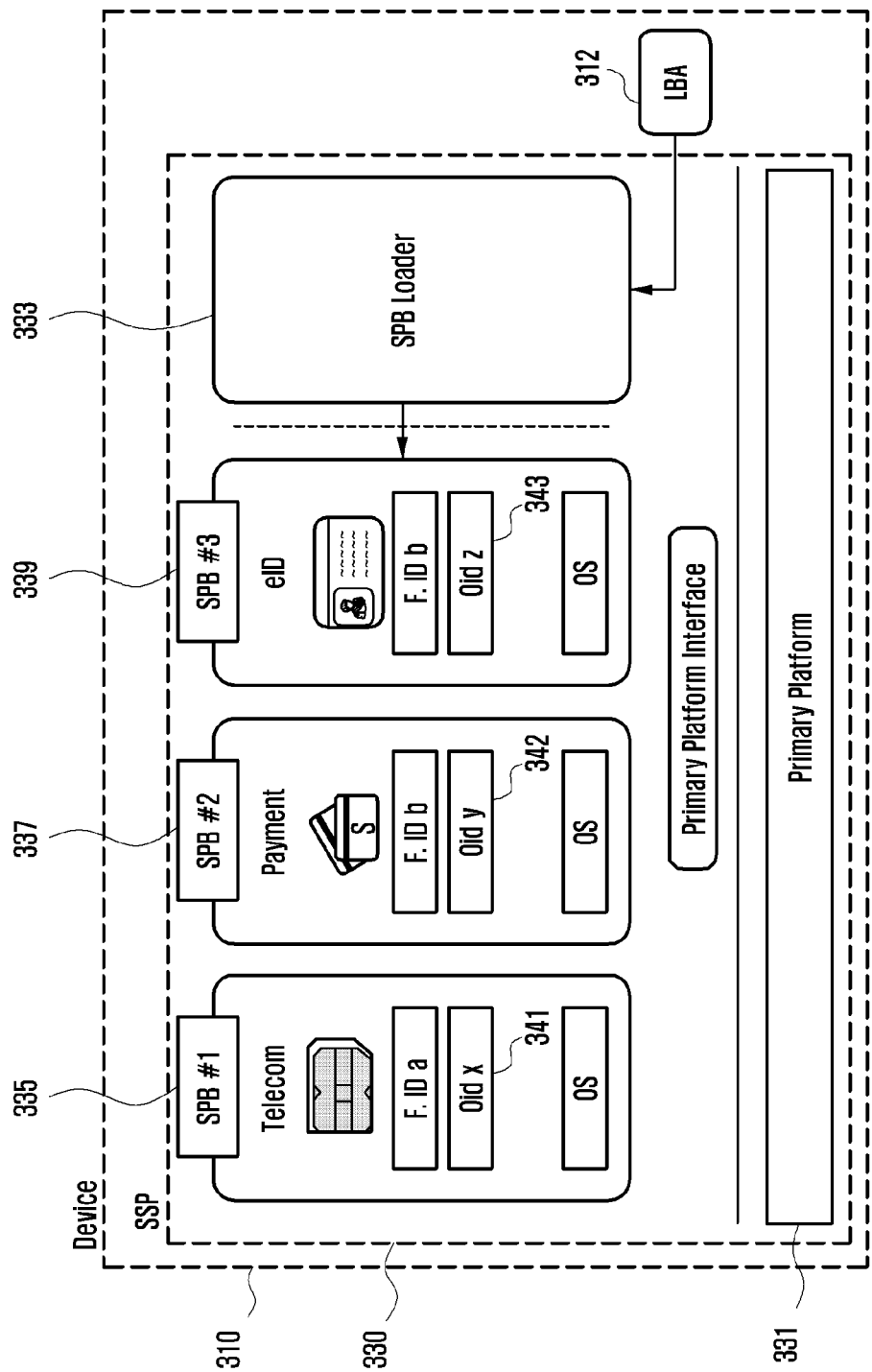
FIG. 3 illustrates a diagram of an example of components in a terminal used for the terminal to download and install a bundle to an SSP according to an embodiment of the disclosure.

FIG. 3 illustrates a diagram of an example of components in a terminal used for the terminal to download and install a bundle to an SSP according to an embodiment of the disclosure.

Referring to FIG. 3, according to an embodiment of the disclosure, a terminal 310 may include an SSP 330 and/or an LBA 312 for controlling the SSP 330. For example, the terminal 310 may be a terminal in which the SSP 330 is mounted and the LBA 312 for controlling the SSP 330 is installed. For example, the SSP 330 may be embedded in the terminal 310 or may be removed from the terminal 310.

According to various embodiments, the SSP 330 may include at least one of a primary platform 331, a secondary platform bundle loader (SPBL) 333, or one or more secondary platform bundles 335, 337, or 339.

According to various embodiments, the secondary platform bundle 335, 337, or 339 may be not installed in the SSP 330 at the time of release of the terminal, but may be downloaded and installed remotely after release.

According to various embodiments, as in the example of FIG. 3, each bundle may have a different bundle family identifier and/or bundle family manager identifier 341, 342, or 343. These bundle family identifiers and/or bundle family manager identifiers 341, 342, and 343 may be used as information necessary for downloading and installing a bundle. That is, the SSP 330 or the SPBL 333 may permit or deny the download and installation of a specific bundle according to the bundle family identifier and/or the bundle family manager identifier 341, 342, and 343.

Figure 4:
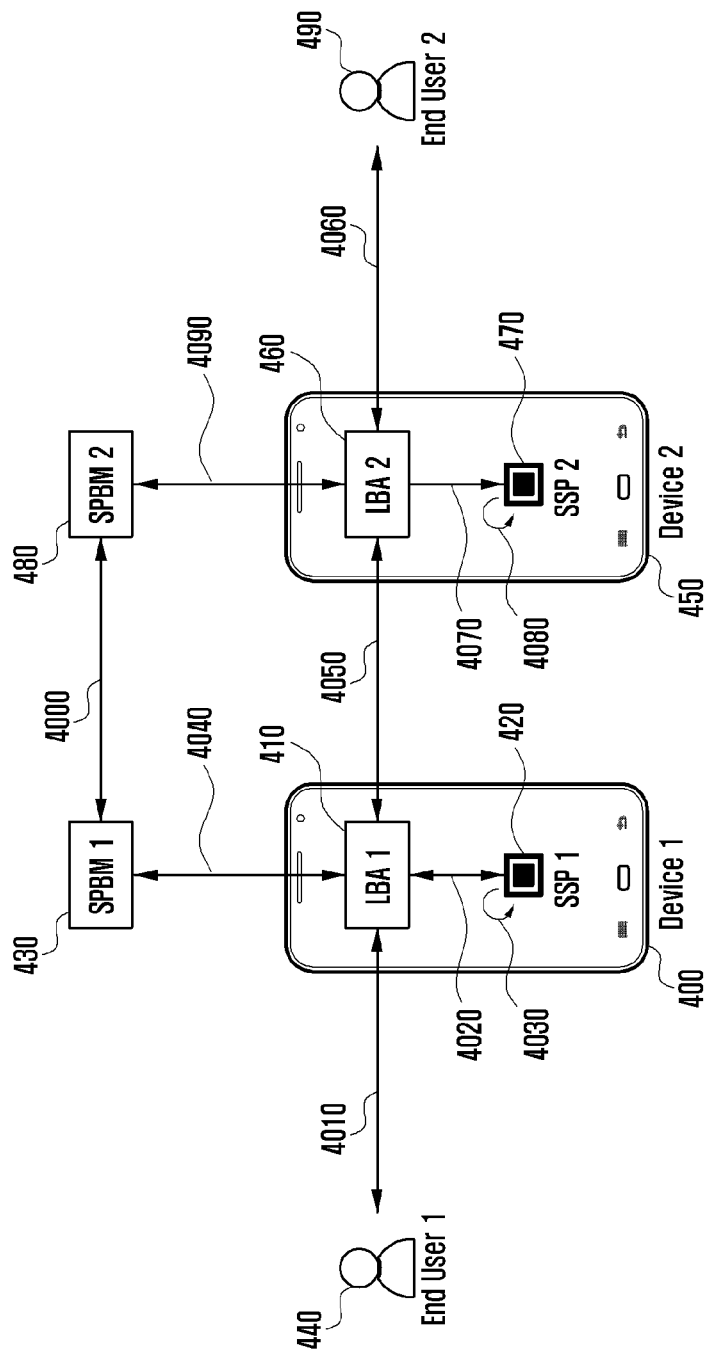
FIG. 4 illustrates a diagram of an example of a method in which two terminals and a server mutually operate so that a bundle or a service related to the bundle is moved offline or online from one terminal to another terminal according to an embodiment of the disclosure.

FIG. 4 illustrates a diagram of an example of a method in which two terminals and a server mutually operate so that a bundle or a service related to the bundle is moved offline or online from one terminal to another terminal according to an embodiment of the disclosure.

Referring to FIG. 4, in an embodiment of the disclosure, the terminal may include at least one LBA and at least one SSP. For example, a first terminal 400 may include a first LBA 410 and a first SSP 420, and a second terminal 450 may include a second LBA 460 and a second SSP 470.

According to various embodiments, in operations 4020 and 4070, the first/second LBA 410/460 may give commands to the first/second SSP 420/470 or transmit and receive data to and from the first/second SSP 420/470. Further, in operations 4030 and 4080, the first/second SSP 420/470 may generate, process, or verify necessary data inside the first/second SSP 420/470.

According to various embodiments, in operation 4050 (hereinafter, third operation), the first/second LBA 410/460 may be connected to each other to give a command to the counterpart or may transmit and receive data to and from the counterpart. In the third operation, the connection of 4050 may be a direct device-to-device connection between the first terminal 400 and the second terminal 450, and although not illustrated, the connection of 4050 may be an indirect device-to-device connection in which an external entity (e.g., external server) is connected between the first LBA 410 and the second LBA 460. A more detailed description of a connection method between the first LBA 410 and the second LBA 460 will be described with reference to the drawings to be described later.

According to various embodiments, a user may transfer a command to the terminal or receive information to be received from the terminal. For example, as in operations 4010 and 4060, the first/second user 440/490 may give a command to the first/second LBA 410/460 of the first/second terminal 400/450 or may receive information to be received from the first/second LBA 410/460. The first user 440 and the second user 490 may refer to different users or may refer to the same single user.

According to various embodiments, the bundle management server may transmit and receive data to and from the terminal. For example, as in operations 4040 and 4090, the first/second bundle management server 430/480 may receive and transmit messages from or to the first LBA 410/second LBA 460 of the first terminal 400/second terminal 450. The first bundle management server 430 and the second bundle management server 480 may be different bundle management servers or the same bundle management server. When the first bundle management server 430 and the second bundle management server 480 are different, as in operation 4000, the two servers may transmit and receive messages.

Although the drawing illustrates an example in which the first bundle management server 430 and the second bundle management server 480 directly transmit and receive messages, according to an embodiment, another one or more bundle management servers may be located between the two bundle management servers. For example, although not illustrated in the drawing, a third bundle management server may exist between the first bundle management server and the second bundle management server, so that when the first/second bundle management server transmits a message to the second/first bundle management server, the first/second bundle management server may transmit a message to the third bundle management server, and the third bundle management server may transmit the message to the second/first bundle management server. In a similar manner, a plurality of bundle management servers and/or relay servers may exist between the first bundle management server and the second bundle management server.

In the disclosure, for convenience of description, all of one or more bundle management servers may be referred to as one bundle management server. For example, in the drawing, the first bundle management server 430 and the second bundle management server 480 may be bound as one and referred to as a bundle management server. In this case, for example, an operation in which the first terminal transmits and receives a message to and from the second terminal via the first bundle management server and the second bundle management server may be described as an operation in which the first terminal transmits and receives a message to and from the second terminal via the bundle management server. Even when one or more bundle management servers exist between the first bundle management server and the second bundle management server, as described above, these bundle management servers may be collectively referred to as a bundle management server.

Figure 5:
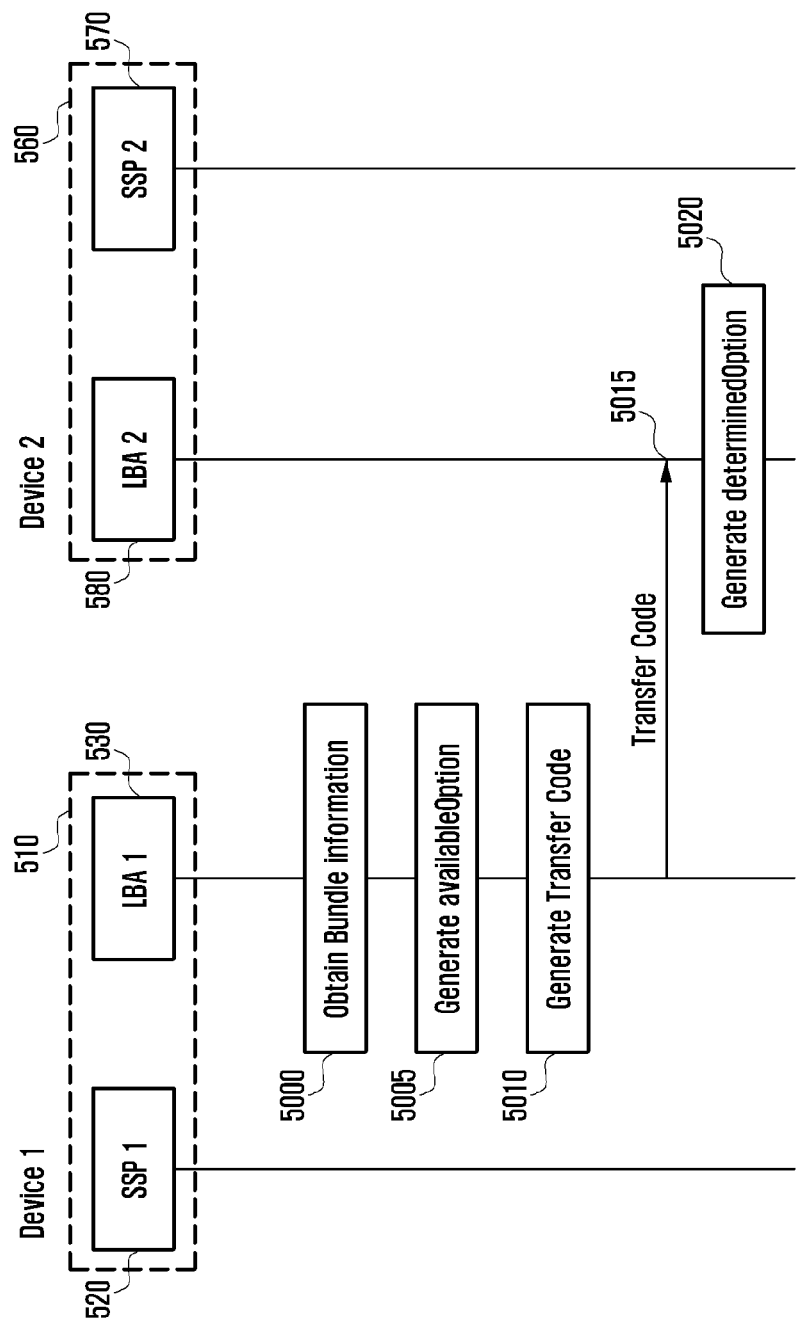
FIG. 5 illustrates a message flow diagram of a procedure for preparing to move a bundle or a service related to the bundle from one terminal to another terminal according to an embodiment of the disclosure.

FIG. 5 illustrates a message flow diagram of a procedure for preparing to move a bundle or a service related to the bundle from one terminal to another terminal according to an embodiment of the disclosure.

Referring to FIG. 5, the terminal may include at least one LBA and at least one SSP. For example, a first terminal 510 may include a first LBA 530 and a first SSP 520, and a second terminal 560 may include a second LBA 580 and a second SSP 570.

A method of moving a bundle or a service related to the bundle from one terminal to another terminal may be broadly classified as follows.

Offline movement: Movement of a bundle or a service related to the bundle through an offline method may mean that two terminals establish a connection without a bundle management server therebetween and that the bundle moves from one terminal to another terminal through the connection. Through transfer of the bundle, a service related to this may be moved. In this case, a method of possible connection will be referred to in the description of FIG. 6. The offline transfer process may be referred to as 'offline transfer'.

Online movement: Movement of a bundle or a service related to the bundle through an online method may mean that two terminals and the bundle management server, respectively establish a connection and that the bundle or the service related to the bundle moves with the help of the bundle management server.

Further, the online movement may be classified as follows.

Online Transfer: May refer to a process in which two terminals and the bundle management server, respectively establish a connection and in which a bundle or some data of the bundle installed in one terminal is transmitted to the bundle management server and then is transmitted to another terminal. Through transfer of a bundle, a service related to this may be moved.

Re-provisioning: May refer to a process in which the two terminals and the bundle management server, respectively establish a connection, but optionally, a bundle of a terminal where an original bundle was installed is deleted and in which the bundle management server generates a bundle related to a service to be moved and transmits the bundle to another terminal.

According to various embodiments, the first terminal 510 may have a pre-installed bundle, and further have metadata related to the pre-installed bundle. According to various embodiments, the first terminal 510 may have at least one of a bundle identifier (SPB ID), a bundle family identifier (SPB Family ID), or a bundle family manager identifier (SPB Family Custodian Object ID) related to a pre-installed bundle.

According to various embodiments, the first terminal 510 may have 'bundle movement setting' related to a pre-installed bundle.

'Bundle movement setting' may include factors including the following information.

Whether the bundle or a service related to the bundle may be transferred from one terminal to another terminal Further, the 'bundle movement setting' may include a factor indicating through which method a corresponding bundle or a service related to the bundle may be moved from one terminal to another terminal.

For example, the 'bundle movement setting' may include information on which method(s) of the following methods is(are) allowed.

Offline movement
Online movement

As another example, the 'bundle movement setting' may include information on which method(s) of the following methods is(are) allowed.

Offline transfer
Online transfer
Re-provisioning

Referring to FIG. 5, in step 5000, the first LBA 530 may obtain information on a (service related) bundle to be moved. Alternatively, information on a (service related) bundle to be moved may be transferred to the first LBA. For example, the first LBA 530 may obtain information on a (service related) bundle to be moved by receiving a user input for a user to select a bundle through a UI (User Interface) provided by the first terminal 510, and information on the (service related) bundle to be moved may be input to the first LBA 530 through a push input from a remote server, or the first LBA 530 may access the remote server to read information on the (service related) bundle to be moved.

In step 5005, the first LBA 530 may configure an "available option", which is information indicating through which method a bundle or a service related to the bundle in which the first LBA 530 intends to move may be moved. For example, the "available option" may include information on which method(s) of the following methods is(are) allowed.

Offline movement
Online movement

As another example, the 'available option' may include information on which method(s) of the following methods is(are) allowed.

Offline transfer
Online transfer
Re-provisioning

In this case, one or more of the following information may be used for configuring an "available option".

'Bundle movement setting' of the (service related) bundle to be moved

Function implemented in the first terminal (i.e., which type of movement the terminal function supports)

A currently possible connection method of the first terminal (e.g., whether the first terminal can currently communicate with the server through an online connection)

That is, the first terminal (e.g., the first LBA 530) may check a 'movement method allowed in the bundle movement setting' and/or 'movement method that is implemented in the first terminal and that may be supported' and/or a 'movement method that may be performed through the currently available connection method of the first terminal' and then configure "available options" using the information.

In step 5010, the first LBA 530 may generate a 'bundle transfer code'. The bundle transfer code may include a bundle identifier such as a bundle identifier (SPB ID), a bundle family identifier (SPB Family ID), and a bundle family manager identifier (SPB Family Custodian Object ID) of a bundle to be transmitted. Further, the bundle transfer information may further include other information indicating properties of the bundle (e.g., metadata of the bundle or a part of the metadata). Further, the bundle transfer information may include an address (SPBM Addr) of the bundle management server associated with the bundle to be transmitted.

Further, the bundle transfer code may include information (Supported Crypto Info) on encryption algorithms supported by the first terminal (e.g., the first SSP). Information on encryption algorithms supported by the first terminal may optionally include one or more of the following information; a list of elliptic curves supported by the first terminal, a list of key agreement algorithms supported by the first terminal, and an encryption algorithm list supported by the first terminal.

Further, when the first terminal and a second terminal need to establish a connection in the future, the bundle transfer code may include information necessary for establishing the connection.

Further, the bundle transfer code may include an "available option".

In step 5015, the bundle transfer code generated in step 5010 may be transmitted from the first LBA 530 to the second LBA 580. The bundle transfer code may be transmitted in various manners.

For example, the first LBA 530 may provide information to be transmitted to the second LBA 580 to a first user of the first terminal through an UI of the first terminal. The first user may provide the received information to a second user of the second terminal. The second user may input the received information into the second LBA using an UI of the second terminal.

Alternatively, the first LBA 530 may make information to be transmitted to the second LBA 580 in the form of an image (e.g., QR code) and display the image on a screen of the first terminal, and the second user may scan the image displayed on the screen of the first terminal using the second terminal to transmit information to the second LBA.

Alternatively, the first LBA 530 may establish a connection between the first LBA 530 and the second LBA 580 and transmit information to be transmitted using the established connection. In this case, the connection established between the first LBA 530 and the second LBA 580 may be a direct device-to-device connection (e.g., NFC, Bluetooth, UWB, WiFi-Direct, LTE device-to-device (D2D), 5G D2D) or may be a remote connection in which a remote server (e.g., relay server) is located between the first LBA 530 and the second LBA 580.

In step 5020, the second LBA 580 may configure a "determined option", which is information indicating through which method the second LBA 580 may receive a bundle or a service related to the bundle to be received. For example, the "determined option" may include information on which method(s) of the following methods is(are) allowed.

Offline movement
Online movement

As another example, the "determined option" may include information on which method(s) of the following methods is(are) allowed.

Offline transfer
Online transfer
Re-provisioning

In this case, one or more of the following information may be used for configuring a "determined option".

"Available options" received in step 5015
Functions implemented in the second terminal (i.e., which type of movement the terminal function supports)
A currently possible connection method of the second terminal (e.g., whether the second terminal can currently communicate with the server through an online connection)

That is, the second terminal (e.g., the second LBA 580) may check a 'movement method allowed in the received "available option", a 'movement method that is implemented in the second terminal and that can support', and/or a 'movement method that may be performed through a currently available connection method of the second terminal' and then configure a "determined option" using the information.

Figure 6:
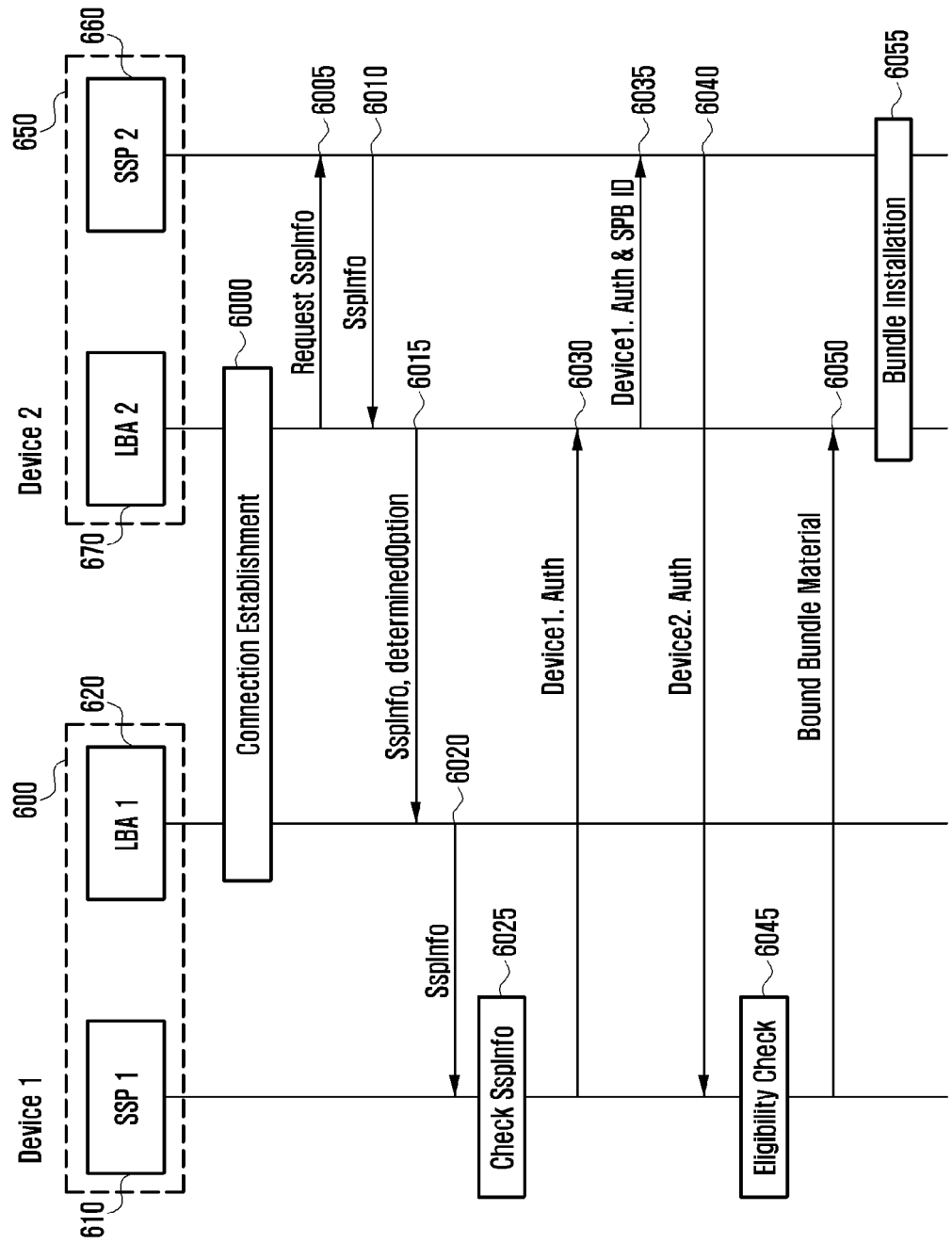
FIG. 6 illustrates a message flow diagram of an offline movement procedure of a bundle according to an embodiment of the disclosure.

FIG. 6 illustrates a message flow diagram of an offline movement procedure of a bundle according to an embodiment of the disclosure.

According to various embodiments, the terminal may include at least one LBA and at least one SSP. For example, as in an example of FIG. 6, a first terminal 600 may include a first LBA 620 and a first SSP 610, and a second terminal 650 may include a second LBA 670 and a second SSP 660.

A procedure illustrated in FIG. 6 may be performed after the procedure illustrated in FIG. 5.

Referring to FIG. 6, in step 6000, a connection may be established (or set) between the first LBA 620 and the second LBA 670. When information necessary for connection is transmitted in step 5015, the first LBA 620 and the second LBA 670 may establish a connection using this information. The connection between the first LBA 620 and the second LBA 670 may be a direct device-to-device connection (e.g., a wireless connection such as NFC, Bluetooth, UWB, WiFi-Direct, LTE device-to-device (D2D), and 5G D2D, or a wired connection through a cable) or a remote connection in which a remote server (e.g., relay server) is located between the first LBA 620 and the second LBA 670.

In step 6005, the second LBA 670 may request "SSP information (SspInfo)" to the second SSP 660. When the second LBA 670 requests "SSP information (SspInfo)" to the second SSP 660, the second LBA 670 may notify the second SSP 660 that a bundle movement in an offline method will be performed. Further, the second LBA 670 may selectively provide information on a bundle to be transmitted to the second SSP 660. The information may optionally include at least one of a bundle identifier (SPB ID), a bundle family identifier (SPB Family ID), or a bundle family manager identifier (SPB Family Custodian Object ID).

At least one of the following processes may be performed in step 6010.

The second SSP 660 may generate "SSP information" thereof. The "SSP information" may include information of the second SSP that should be provided for a bundle movement. For example, the "SSP information" may include information (certificate negotiation information) for a certificate negotiation process in which the second SSP 660 should go through before receiving a bundle. The "certificate negotiation information" may include certificate information (SenderSpblVerification) in which the second SSP 660 may use for verifying another SSP and certificate information (ReceiverSpblVerification) that may be used by the other SSP for verifying itself. Further, the "certificate negotiation information" may optionally further include a list of key agreement algorithms supported by the second SSP 660, and optionally further include a list of encryption algorithms supported by the second SSP 660. Further, the "certificate negotiation information" may be selected dependent on a value of the bundle family identifier or the bundle family manager identifier when the bundle family identifier (SPB Family ID) and the bundle family manager identifier (SPB Family Custodian Object ID) are provided in step 6005, and in this case, "SSP information" may optionally further include a bundle family identifier and a bundle family manager identifier together with certificate negotiation information. Further, the "SSP information" may optionally further include SSP version information including at least one of version information of the standard specification supported by the primary platform and the loader included in the second SSP 660.

The second SSP 660 may transmit the generated "SSP information" to the second LBA 670.

According to the above-described steps 6005 to 6010, the second LBA 670 may request "SSP information (SspInfo)" to the second SSP 660, and the second SSP 660 may generate "SSP information" thereof and then transmit "SSP information" to the second LBA 670. However, according to an embodiment, the second LBA 670 may generate "SSP information".

In step 6015, the second LBA 670 may transmit "SSP information" to the first LBA 620. Further, the second LBA 670 may further transmit a "determined option" to the first LBA 620. A description of the "determined option" will be described with reference to FIG. 5.

In step 6020, the first LBA 620 may transmit "SSP information" to the first SSP 610.

The following process may be performed in step 6025.

The first SSP 610 may perform a 'certificate negotiation process' using the received "SSP information". The process is as follows.

The first SSP 610 may check certificate information capable of verifying itself using the received "SenderSpblVerification" and "a list of key agreement algorithms supported by the second SSP 660", and select at least one key agreement certificate (ssp1.Cert.KA). Alternatively, the first SSP 610 may generate a public key "ssp1.ePK.KA and a private key "ssp1.eSK.KA", which are a key pair for asymmetric encryption to be used for key agreement" using the received "list of key agreement algorithms supported by the second SSP 660" and then select the public key (ssp1.ePK.KA) among the key pair. Further, the first SSP 610 may check certificate information capable of verifying itself using the received "SenderSpblVerification" and further select at least one signing certificate (ssp1.Cert.DS).

Further, the first SSP 610 may select at least one certificate of the second SSP 660 capable of verifying by itself using the received "ReceiverSpblVerification" and set corresponding information to "CiPkIdToBeUsed".

Further, the first SSP 610 may select at least one encryption algorithm to be used in the future using the received "list of encryption algorithms supported by the second SSP 660" and then set the corresponding information to "CryptoToBeUsed".

Further, the first SSP 610 may check the received list of "version information of the standard specification supported by the primary platform and the loader included in the second SSP 660", and check whether a version of the standard specification supported by itself exists among them.

When the above 'certificate negotiation process' fails (e.g., by checking "SenderSpblVerification", when certificate information capable of verifying the first SSP is not included therein, or by checking "ReceiverSpblVerification", when the first SSP does not include certificate information that may use for verifying another SSP), bundle transfer using the offline method between the two terminals may be stopped. In this case, when a service movement using the online method is allowed in a "determined option", a service movement using the online method between two terminals may be initiated. The process may be started when the first terminal notifies the second terminal that the service movement using the offline method has failed, and when the first terminal and the second terminal initiate an online method service movement. A description of the online method service movement will be described with reference to the description of FIGS. 7 to 10.

The following process may be performed in step 6030.

The first SSP 610 may generate "first terminal authentication information (Device1.Auth)" capable of authenticating itself. A more detailed procedure of the process is as follows.

The above-described "first terminal authentication information (Device1.Auth)" may include at least one of "ssp1.Cert.KA", "ssp1.ePK.KA", "CiPkIdToBeUsed", or "CryptoToBeUsed" described in step 6025. Further, the "first terminal authentication information (Device1.Auth)" may optionally further include the above-described "ssp1.Cert.DS". Further, the "first terminal authentication information (Device1.Auth)" may optionally further include at least one of a bundle identifier (SPB ID), a bundle family identifier (SPB Family ID), or a bundle family manager identifier (SPB Family Custodian Object ID) related to a bundle to be transmitted in the future.

In this case, part or all of the above-described "first terminal authentication information (Device1.Auth)" may be digitally signed to verify using ssp1.Cert.DS in order to ensure the integrity of the information, and digital signature data may be added as part of "first terminal authentication information".

The first SSP 610 may transmit "first terminal authentication information (Device1.Auth)" to the second LBA 670 via the first LBA 620.

In step 6035, the second LBA 670 may transmit "first terminal authentication information (Device1.Auth)" to the second SSP 660. Further, the second LBA 670 may transmit information (e.g., bundle identifier (SPB ID)) that may indicate a bundle to be moved to the second SSP 660.

At least one of the following processes may be performed in operation 6040.

The second SSP 660 may verify the received "first terminal authentication information (Device1.Auth)". When the second SSP 660 receives "ssp1.Cert.KA", the second SSP 660 may check a signature of the corresponding certificate to check the validity of the certificate. Further, when the second SSP 660 receives "ssp1.ePK.KA" and a digital signature thereof, the second SSP 660 may first check the validity of ssp1.Cert.DS, and then check the digital signature using the certificate to check the integrity of the received public key ssp1.ePK.KA. Further, the second SSP 660 may check the received "CiPkIdToBeUsed" to select at least one signing certificate (ssp2.Cert.DS) capable of verifying itself.

Further, although not illustrated in the drawing, the second SSP 660 may generate a public key "ssp2.ePK.KA" and a private key "ssp2.eSK.KA", which are a key pair for asymmetric encryption to be used for key agreement and then select the public key (ssp2.ePK.KA) among the key pair. Further, the second SSP 660 may select one of the public key for key agreement or ssp1.ePK.KA included in ssp1.Cert.KA, and then generate a session key ShKey01 to be used for encryption during communication with the first terminal in the future using the value and ssp2.eSK.KA. ShKey01 should be a session key for the encryption algorithm included in the received "CryptoToBeUsed".

The second SSP 660 may generate "second terminal authentication information (Device2.Auth)" capable of authenticating itself. In this case, the "second terminal authentication information (Device2.Auth)" may include "ssp2.Cert.DS". Further, the "second terminal authentication information (Device2.Auth)" may further include "ssp2.ePK.KA". Further, the "second terminal authentication information (Device2.Auth)" may further include a transaction ID indicating a current session generated by the second SSP 660. Further, the "second terminal authentication information (Device2.Auth)" may further include information (e.g., bundle identifier (SPB ID)) that may refer to a bundle to be moved. Further, the "second terminal authentication information (Device2.Auth)" may further include an SSP identifier of the second SSP 660. Further, the "second terminal authentication information (Device2.Auth)" may further include a part number ID of the second SSP 660. Further, the "second terminal authentication information (Device2.Auth)" may optionally further include at least one of a bundle identifier (SPB ID), a bundle family identifier (SPB Family ID), or a bundle family manager identifier (SPB Family Custodian Object ID) related to a bundle to be transmitted in the future.

In this case, part or all of the above-described "second terminal authentication information (Device2.Auth)" may be digitally signed to verify using ssp2.Cert.DS in order to ensure the integrity of information, and digital signature data may be added as part of the "second terminal authentication information". Further, part or all of "second terminal authentication information (Device2.Auth)" may be encrypted using the previously generated session key ShKey01.

The second SSP 660 may transmit "second terminal authentication information (Device2.Auth)" to the first SSP 610 via the second LBA 670 and the first LBA 620.

At least one of the following processes may be performed in operation 6045.

The first SSP 610 may verify the received "second terminal authentication information (Device2.Auth)". The first SSP 610 may verify a signature of the received "ssp2.Cert.DS" to verify the validity of the corresponding certificate. Further, the first SSP 610 may check whether the received bundle identifier (SPB ID), bundle family identifier (SPB Family ID), or bundle family manager identifier (SPB Family Custodian Object ID) corresponds with information of a bundle related to a service to be moved by itself.

The first SSP 610 may check bundle movement setting of a bundle related to the received bundle identifier to check whether the bundle is a bundle that may be transmitted to the second terminal. Further, the first SSP 610 may store a received transaction ID or a primary platform identifier mounted on the second SSP 660.

The first SSP 610 may check whether the second SSP 660 is an SSP capable of installing and using a bundle transmitted by itself using the received primary platform ID and/or part number ID (the process may be referred to as an eligibility check). As a result of the eligibility check, when it is determined that a bundle to be transmitted by the first terminal is installed in the second terminal and does not operate, and when a service movement using an online method is allowed in the "determined option", the service movement using the online method between the two terminals may be initiated. When the first terminal notifies the second terminal that a service movement using the offline method has failed, and when the first terminal and the second terminal initiate the online method service movement, the process may be started.

In the above-described process, when encrypted data is included in the "second terminal authentication information (Device2.Auth)", the first SSP 610 may generate a private key corresponding to a public key for key agreement included in the received ssp2.ePK.KA and ssp1.Cert.KA thereof or a session key ShKey01 using ssp1.eSK.KA, decrypt the encrypted data using the session key, and perform a verification process. Further, in this process, when a digital signature is included in the "second terminal authentication information (Device2.Auth)", the first SSP 610 may verify the validity of the received digital signature using "ssp2.Cert.DS".

At least one of the following processes may be performed in step 6050.

The first SSP 610 may generate a public key "ssp1.bundle.ePK.KA" and a private key "ssp1.bundle.eSK.KA", which are a key pair for asymmetric encryption to be used for key agreement. In this case, the key pair "ssp1.bundle.ePK.KA and ssp1.bundle.eSK.KA" may be set to the same value as that of the previously generated "ssp1.ePK.KA and ssp1.eSK.KA". Alternatively, the key pair "ssp1.bundle.ePK.KA and ssp1.bundle.eSK.KA" may be set to the same value as that of the previously used "public key included in ssp1.Cert.KA and a corresponding private key". Further, the first SSP 610 may generate a session key ShKey02 using ssp1.bundle.eSK.KA and ssp2.ePK.KA. When ssp1.eSK.KA or a 'private key corresponding to the public key included in ssp1.Cert.Ka' was reused for ssp1.bundle.eSK.KA, a value of the session key ShKey02 may be also set to the value of the previously generated ShKey01.

The first SSP 610 may configure a bundle to be transmitted to the second terminal 650 and/or metadata related to the bundle. In this case, the first SSP 610 may identify a bundle in which the first SSP 610 intends to transmit using the received 'bundle identifier'. Further, the bundle to be configured may include "ssp1.Cert.DS". Further, the bundle to be configured may further include "ssp1.bundle.ePK.KA". Further, the bundle to be configured may further include a transaction ID for identifying the corresponding session. Further, the bundle to be configured may optionally further include at least one of a bundle identifier (SPB ID), a bundle family identifier (SPB Family ID), or a bundle family manager identifier (SPB Family Custodian Object ID) related to the bundle to be transmitted. Further, the bundle to be configured may optionally further include metadata of the corresponding bundle. Further, the bundle to be configured may optionally further include an address (SPBM Addr) of the bundle management server.

According to various embodiments, digital signature data generated using ssp1.Cert.DS may be added to the above-described bundle. That is, digital signature data generated for part or all of components of the bundle specified above may be added as a part of the bundle. Further, part or all of bundles to be configured may be encrypted using ShKey02.

The above-described bundle may be referred to as a bound bundle material.

The first SSP 610 may transmit the bound bundle material to the second LBA 670 via the first LBA 620.

In step 6055, the second LBA 670 and the second SSP 660 may cooperate with each other to install a bundle in the second terminal 650.

When the metadata is transmitted, the second LBA 670 or the second SSP 660 may verify the content included in the metadata. When a transaction ID was transmitted, the second LBA 670 or the second SSP 660 may check whether the transaction ID is the same as the transaction ID used in a current session. When at least one of the bundle identifier (SPB ID), the bundle family identifier (SPB Family ID), or the bundle family manager identifier (SPB Family Custodian Object ID) was transmitted, the second LBA 670 or the second SSP 660 may check whether the information corresponds to information of a bundle to be currently installed.

When the received data includes encrypted data, the second SSP 660 may generate a session key ShKey02 using the received ssp1.bundle.ePK.KA and ssp2.eSK.KA thereof, decrypt the encrypted data using the session key, and then perform verification. When the received data includes a digital signature, the second SSP 660 may verify ssp1.Cer.DS and then verify the validity of the digital signature using the certificate.

Figure 7:
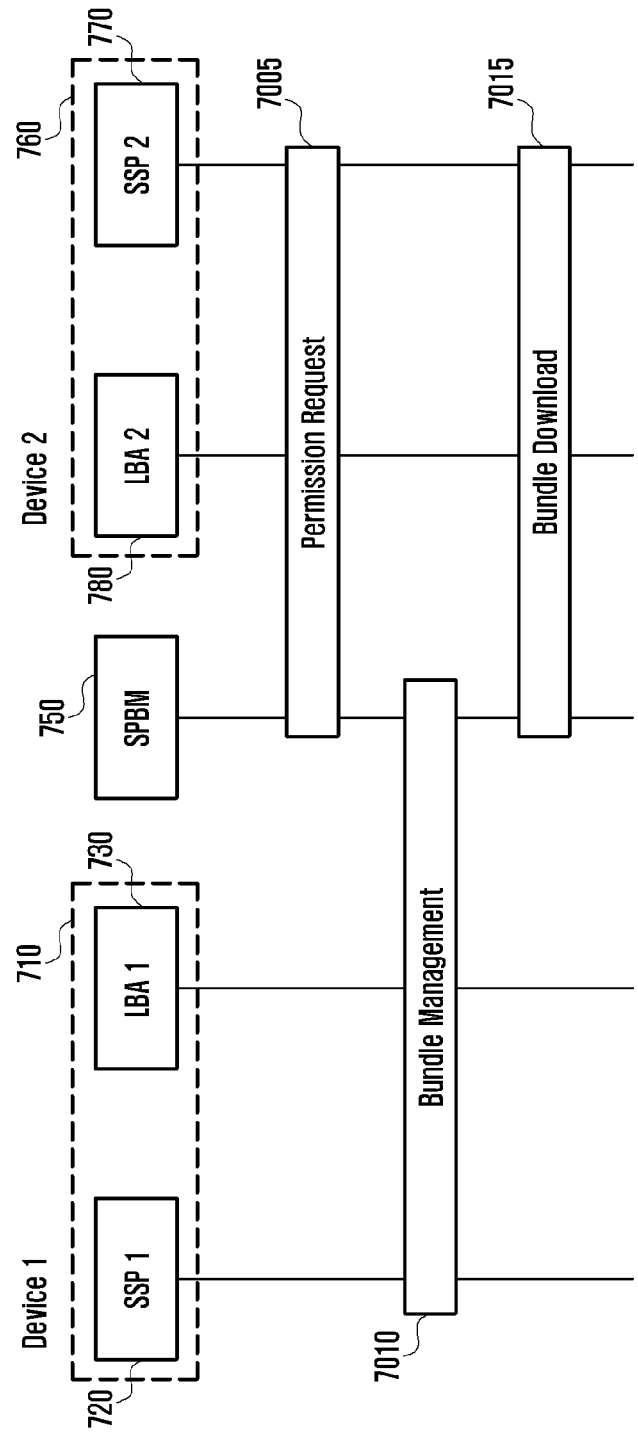
FIG. 7 illustrates a message flow diagram conceptually illustrating an online movement procedure of a bundle or a service related to the bundle according to an embodiment of the disclosure.

FIG. 7 illustrates a message flow diagram conceptually illustrating an online movement procedure of a bundle or a service related to the bundle according to an embodiment of the disclosure.

Referring to FIG. 7, the terminal may include at least one LBA and at least one SSP. For example, as illustrated in FIG. 4, a first terminal 710 may include a first LBA 730 and a first SSP 720, and a second terminal 760 may include a second LBA 780 and a second SSP 770. A description of a bundle management server 750 will be described with reference to FIG. 4.

A procedure illustrated in FIG. 7 may be performed after the procedure illustrated in FIG. 5.

In step 7005, the second terminal 760 may receive approval for moving the service related to the bundle from the bundle management server 750. A more detailed description of the procedure will be described with reference to a detailed description of FIG. 8 to be described later.

In step 7010, the first terminal 710 may perform a series of operations on a bundle related to a service to be moved according to a request of the bundle management server 750. For example, the first terminal 710 may upload a bundle thereof and/or some data of the bundle to the bundle management server 750. As another example, the first terminal 710 may delete the bundle thereof. A more detailed description of the procedure will be described with reference to a detailed description of FIG. 9 to be described later.

In step 7015, the second terminal 760 may download and install the bundle from the bundle management server 750. A more detailed description of the procedure will be described with reference to a detailed description of FIG. 10 to be described later.

Figure 8:
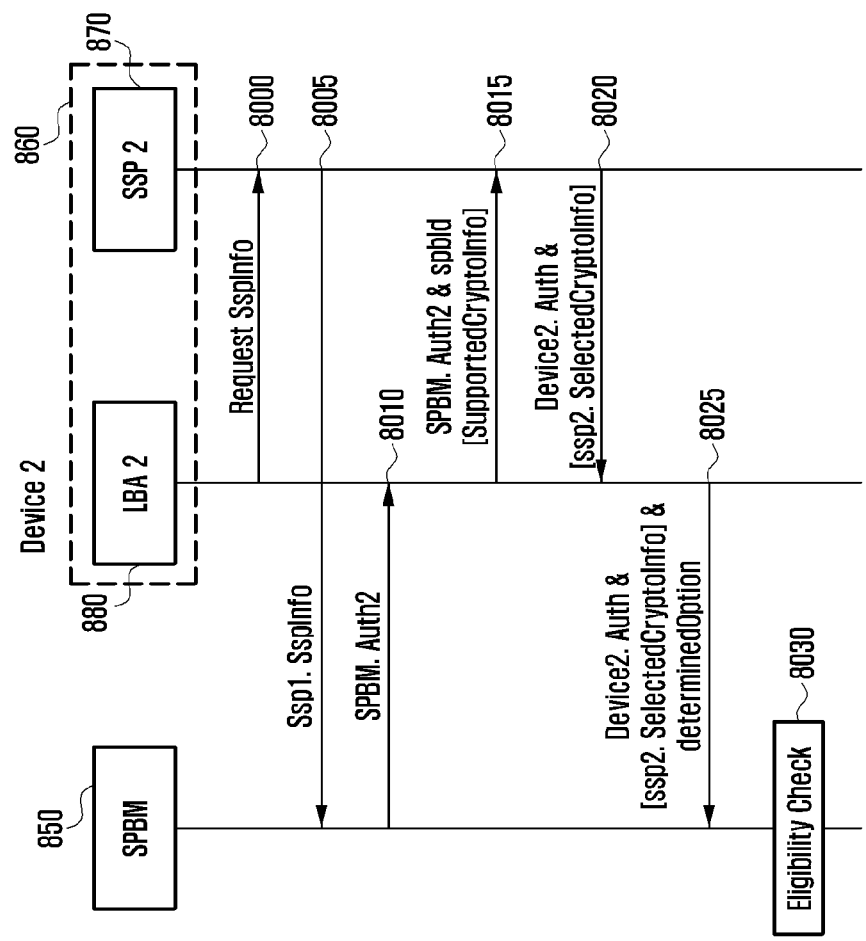
FIG. 8 illustrates a message flow diagram of a procedure in which a second terminal receives online movement approval from a bundle management server among the procedures presented in FIG. 7 according to an embodiment of the disclosure.

FIG. 8 illustrates a message flow diagram of a procedure in which a second terminal 860 receives online movement approval from a bundle management server 850 among the procedures presented in FIG. 7 according to an embodiment of the disclosure.

Referring to FIG. 8, the terminal may include at least one LBA and at least one SSP. For example, the second terminal 860 may include a second LBA 880 and a second SSP 870. A description of the bundle management server 850 will be described with reference to FIG. 4.

Referring to FIG. 8, in step 8000, the second LBA 880 may request "SSP information (SspInfo)" to the second SSP 870.

When the second LBA 880 requests "SspInfo" to the second SSP 870, the second LBA 880 may notify the second SSP that a movement of a service related to the bundle will be performed. When the second LBA 880 requests "SspInfo" to the second SSP 870, the second LBA 880 may further notify the second SSP that the service related to the bundle will be moved online. For example, the request message may include an indicator notifying that a movement of a service related to a bundle will be performed. As another example, the request message may include an indicator indicating that an online movement of a service related to a bundle is to be performed. The request message may include an indicator or set a value of the indicator to a specific value to notify the second SSP that a movement of the service related to the bundle will be performed or that an online movement of the service related to the bundle will be performed.

The second LBA 880 may provide information on a bundle related to a service to be moved to the second SSP 870. The information may include at least one of a bundle family identifier (SPB Family ID) or a bundle family manager identifier (SPB Family Custodian Object ID).

In step 8005, the second SSP 870 may generate "SSP information (ssp2.SspInfo)" thereof and transmit "ssp2.SspInfo" to the bundle management server 850 via the second LBA 880.

The "SSP information" may include information on the second SSP to be provided for movement of a service related to a bundle. In this case, the "SSP information" may include information (certificate negotiation information) for a certificate negotiation process in which the second SSP 870 should go through for communicating with the bundle management server 850. The "certificate negotiation information" may include certificate information that the second SSP 870 may use for verifying the bundle management server 850 and/or certificate information that the bundle management server 850 may use for verifying the second SSP 870. Further, the "certificate negotiation information" may further include a list of key agreement algorithms supported by the second SSP 870, and further include a list of encryption algorithms supported by the second SSP 870.

Further, "SSP information" may further include SSP version information including at least one of version information of the standard specification supported by a primary platform and a loader included in the second SSP 870.

In an embodiment, the second SSP 870 may transmit "SSP information" to the bundle management server 850 via the second LBA 880.

According to steps 8000 to 8005, after the second LBA 880 requests "SSP information" to the second SSP 870 and the second SSP 870 generates "SSP information" thereof, the second SSP 870 may transmit "SSP information" to the bundle management server 850 via the second LBA 880. However, according to an embodiment, the second LBA may generate "SSP information" and then transmit "SSP information" to the bundle management server.

In step 8010, the bundle management server 850 may check the received "SSP information", generate "server authentication information (SPBM.Auth2)" based on the information, and transmit the generated "server authentication information" to the second LBA.

"Server authentication information may include one or more of the following information.

a) A certificate for key agreement (referred to as SPBM.Cert.KA) that may be used for verifying the SPBM itself and certificates required for verifying the certificate.

b) Certificate information (referred to as CiPkIdToBeUsed) to be used by the SPBM for verifying the second SSP c) Information (referred to as CryptoToBeUsed) of an encryption algorithm to be used by the SPBM when performing encrypted communication with the second SSP In an embodiment, the bundle management server 850 may transmit "server authentication information" to the second LBA 880.

In step 8015, the second LBA 880 may transmit "server authentication information" to the second SSP 870. The second LBA 880 may further transmit a bundle identifier of a bundle related to the service to be moved to the second SSP 870. The second LBA 880 may further transmit supported crypto Info to the second SSP 870. A description of Supported Crypto Info will be described with reference to FIG. 5.

In operation 8020, the second SSP 870 may execute one or more of the following tasks.

a) The second SSP 870 may check the validity of "SPBM.Cert.KA".

b) The second SSP 870 may select at least one signing certificate (ssp2.Cert.DS) capable of verifying the second SSP based on the received "CiPkIdToBeUsed".

c) The second SSP 870 may check the received "CryptoToBeUsed" and generate a public key "ssp2.ePK.KA" and a private key "ssp2.eSK.KA", which are a key pair for encryption to be used for generating an encryption key for encrypted communication with the bundle management server. Further, the second SSP may generate ShKeyM2, which is a session key to be used for encrypted communication with the bundle management server using a public key for key agreement included in SPBM.Cert.KA and ssp2.eSK.KA.

In an embodiment, the second SSP 870 may generate "second terminal authentication information (Device2. Auth)". The second terminal authentication information (Device2.Auth)" may include one or more of the following information.
  a) Ssp2.Cert.DS
  b) Ssp2.ePK.KA
  c) Transaction ID indicating a current session
  d) SSP identifier of the second SSP
  e) Part number ID of the second SSP
  f) A bundle identifier of a bundle related to a service to be moved In an embodiment, the second SSP 870 may check the received supported crypto info and check whether encryption algorithms supported by the second terminal (e.g., second SSP) exist in the supported crypto info. When there are encryption algorithms supported by the second terminal in the received supported crypto info, the second SSP 870 may select one of them and set it as the 'selected encryption algorithm'. The 'selected encryption algorithm' may optionally include one or more of the following information: elliptic curve information, key agreement algorithm information, and encryption algorithm information.

The second SSP 870 may generate a key pair of the second terminal (temporary public key ssp2.ePK.BT and secret key ssp2.eSK.BT corresponding thereto) to be used later in order to generate an 'encryption key for encrypted communication with the first terminal' based on the 'selected encryption algorithm'. The second SSP 870 may map the generated key pair to the bundle identifier (SPB ID) of the bundle related to a service to be moved. The second SSP 870 may generate "selected encryption information (ssp2. SelectedCryptoInfo)". The "ssp2.SelectedCryptoInfo" may optionally include one or more of the following information: part and/or all of the selected encryption algorithm, ssp2.eEPK.BT Part or all of "second terminal authentication Information (Device2.Auth)" and/or "selected encryption Information (ssp2. SelectedCryptoInfo)" may be digitally signed to verify using ssp2.Cert.DS in order to ensure the integrity of information, and digital signature data may be added as part of "second terminal authentication information".

Further, part or all of "second terminal authentication information (Device2.Auth)" and/or "selected encryption information (ssp2. SelectedCryptoInfo)" may be encrypted using the previously generated session key ShKeyM2.

The second SSP 870 may transmit "second terminal authentication information (Device2.Auth)" and/or "selected encryption information (ssp2.SelectedCryptoInfo)" to the second LBA 880.

In operation 8025, one or more of the following tasks may be executed. The second LBA 880 may transmit "second terminal authentication information (Device2.Auth)" to the bundle management server 850. The second LBA 880 may transmit "selected encryption information (ssp2.SelectedCryptoInfo)" to the bundle management server 850. The second LBA 880 may transmit a "determined option" to the bundle management server 850. A description of the "determined option" will be described with reference to FIG. 5.

In step 8030, the bundle management server 850 may perform one or more of the following processes.
  a) The bundle management server may verify the validity of ssp2.Cert.DS included in "second terminal authentication information". Further, when a digital signature is included in the "second terminal authentication information", the bundle management server may verify the validity of the signature using ssp2.Cert.DS.
  b) When there is encrypted data in "second terminal authentication information", the bundle management server may generate ShKeyM2, which is a session key to be used for encrypted communication with the second terminal using a 'private key corresponding to the public key for key agreement included in SPBM.Cert.KA' and ssp2.ePK.KA, and decrypt encrypted data using the session key.
  c) The bundle management server may check and/or store the received transaction ID and/or the SSP identifier of the second SSP.
  d) The bundle management server may check and/or store a bundle identifier of a bundle related to a service in which the second terminal intends to use.

In an embodiment, the bundle management server 850 may further perform one or more of the following processes.
  a) The bundle management server may check a bundle identifier of a bundle related to a service in which the second terminal wants to use to check whether the corresponding service is a bundle that may be moved through an online method. For example, a process of checking whether the service is a service that may be moved online may be performed by performing verification using a 'bundle movement setting' value of a bundle related to a service to be moved by the bundle management server 850.
  b) When a bundle and/or some data of a bundle related to a service in which the second terminal wants to use moves to the second terminal, the bundle management server may check whether the bundle and/or some data of the bundle are/is normally installed and/or operated in the second terminal (e.g., the second SSP) (The process may be referred to as an eligibility check.) For example, the check process may be performed using a part number ID of the second terminal (e.g., the second SSP) and/or a bundle identifier of a bundle related to a service in which the second terminal intends to use.

In an embodiment, the bundle management server 850 may map part or all of the following information to each other: an SSP identifier of the second SSP, a bundle identifier of a bundle related to a service in which the second terminal wants to use, and "selected" encryption information (ssp2. SelectedCryptoInfo)"

Figure 9:
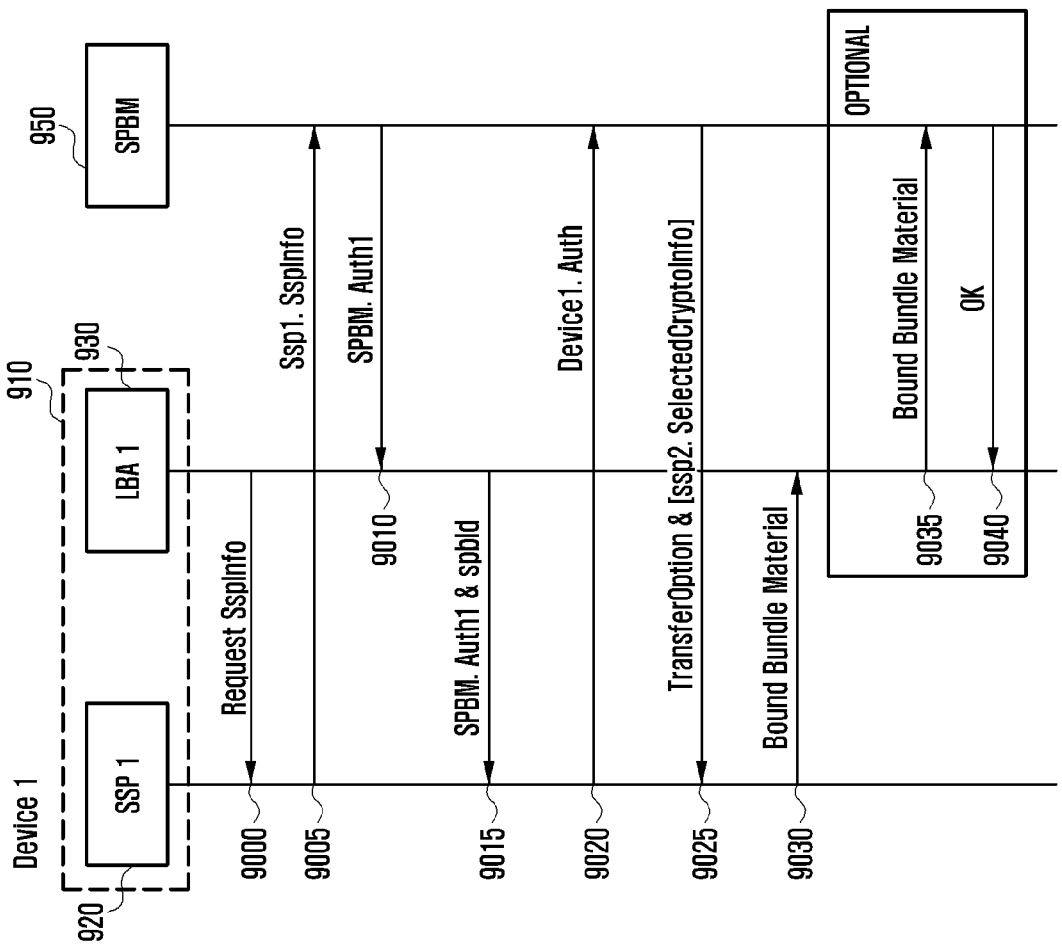
FIG. 9 illustrates a message flow diagram of a procedure in which a first terminal performs a series of operations on a bundle related to a service to be moved according to a request from a bundle management server among the procedures presented in FIG. 7 according to an embodiment of the disclosure.

FIG. 9 illustrates a message flow diagram of a procedure in which a first terminal 910 performs a series of operations on a bundle related to a service to be moved according to a request from a bundle management server 950 among the procedures presented in FIG. 7 according to an embodiment of the disclosure.

Referring to FIG. 9, the terminal may include at least one LBA and at least one SSP. For example, a first terminal 910 may include a first LBA 930 and a first SSP 920. A description of the bundle management server 950 will be described with reference to FIG. 4.

Referring to FIG. 9, in step 9000, the first LBA 930 may request "SSP information (SspInfo)" to the first SSP 920.

When the first LBA requests "SspInfo" to the first SSP, the first LBA may notify the first SSP that a service movement will be performed. When the first LBA requests "SspInfo" to the first SSP, the first LBA may further notify the first SSP that an on-line movement of the service will be performed. For example, the request message may include an indicator notifying that a service movement will be performed. As another example, the request message may include an indicator notifying that the on-line movement of the service will be performed. The request message may include an indicator or set a value of the indicator to a specific value, thereby notifying the first SSP that the service will be moved or that the service will be moved online.

The first LBA may provide information on a bundle related to a service to be moved to the first SSP. The information may include at least one of a bundle family identifier (SPB Family ID) or a bundle family manager identifier (SPB Family Custodian Object ID).

In step 9005, the first SSP 920 may generate "SSP information (ssp1.SspInfo)" thereof, and transmit the "SSP information" to the bundle management server 950 via the first LBA 930."

The "SSP information" may include information of the first SSP to be provided for an online movement of the service. In this case, the "SSP information" may include information (certificate negotiation information) for a certificate negotiation process in which the first SSP should go through for communicating with the bundle management server. "Certificate negotiation information" may include certificate information that the first SSP may use for verifying the bundle management server and/or certificate information that the bundle management server may use for verifying the first SSP. Further, the "certificate negotiation information" may further include a list of key agreement algorithms supported by the first SSP, and further include a list of encryption algorithms supported by the first SSP.

Further, "SSP information" may further include SSP version information including at least one of version information of the standard specification supported by a primary platform and a loader included in the first SSP.

In an embodiment, the first SSP 920 may transmit "SSP information" to the bundle management server 950 via the first LBA 930.

According to steps 9000 to 9005, after the first LBA requests "SSP information" to the first SSP and the first SSP generates "SSP information" thereof, the first SSP may transmit "SSP information" to the bundle management server via the first LBA. However, according to an embodiment, the first LBA may generate "SSP information" by itself and then transmit "SSP information" to the bundle management server.

In step 9010, the bundle management server 950 may check the received "SSP information", generate "server authentication information (SPBM.Auth1)" based on the information, and transmit "server authentication information" to the first LBA 930.

"Server authentication information" may include one or more of the following information.
  a) A certificate for key agreement (referred to as SPBM.Cert.KA) that may be used for verifying the bundle management server and certificates required for verifying the certificate.
  b) Certificate information (referred to as CiPkIdToBeUsed) to be used by the bundle management server for verifying the first SSP
  c) Information (referred to as CryptoToBeUsed) of encryption algorithm to be used when the bundle management server performs encrypted communication with the first SSP In an embodiment, the bundle management server 950 may transmit "server authentication information" to the first LBA 930.

In step 9015, the first LBA 930 may transmit "server authentication information" to the first SSP 920. The first LBA 930 may further transmit a "bundle identifier of a bundle related to a service to be moved" to the first SSP 920.

In operation 9020, the first SSP 920 may execute one or more of the following tasks.
  a) The first SSP 920 may check the validity of the received "SPBM.Cert.KA".
  b) The first SSP 920 may select at least one signature certificate (ssp1.Cert.DS) capable of verifying the first SSP based on the received "CiPkIdToBeUsed".
  c) The first SSP 920 may check the received "CryptoToBeUsed" and generate a public key "ssp1.ePK.KA" and a private key "ssp1.eSK.KA", which are a key pair for encryption to be used for generating an encryption key for encrypted communication with the bundle management server. Further, the first SSP may generate ShKeyM1, which is a session key to be used for encrypted communication with the bundle management server using a public key for key agreement included in SPBM.Cert.KA and ssp1.eSK.KA.

The first SSP 920 may generate "first terminal authentication information (Device1.Auth)" and transmit "first terminal authentication information (Device1.Auth)" to the bundle management server 950. "First terminal authentication information (Device1.Auth)" may include one or more of the following information.
  a) ssp1.Cert.DS
  b) ssp1.ePK.KA
  c) Transaction ID indicating a current session
  d) SSP identifier of the first SSP
  e) A bundle identifier of a bundle related to a service to be moved Part or all of the "first terminal authentication information (Device1.Auth)" may be digitally signed to be verifiable using ssp1.Cert.DS in order to ensure the integrity of the information, and digital signature data may be added as part of "first terminal authentication information".

Further, part or all of the "first terminal authentication information (Device1.Auth)" may be encrypted using the previously generated session key ShKeyM1.

In an embodiment, the first SSP 920 may transmit "first terminal authentication information (Device1.Auth)" to the bundle management server 950 via the first LBA 930.

In step 9025, the bundle management server 950 may perform one or more of the following processes.
  a) The bundle management server may verify the validity of ssp1.Cert.DS included in "first terminal authentication information". Further, when a digital signature is included in the "first terminal authentication information", the bundle management server may verify the validity of the signature using ssp1.Cert.DS.
  b) When there is encrypted data in "first terminal authentication information", the bundle management server may generate ShKeyM1, which is a session key to be used for encrypted communication with the first terminal using ssp1.ePK.KA and a 'private key corresponding to the public key for key agreement included in SPBM.Cert.KA', and decrypt encrypted data using the session key.
  c) The bundle management server may check and/or store the received transaction ID and/or an SSP identifier of the first SSP.
  d) The bundle management server may check and/or store a bundle identifier of the bundle transmitted by the first terminal.

In an embodiment, the bundle management server 950 may further perform one or more of the following processes.

a) The bundle management server may check that the first terminal (e.g., the first SSP) is a legitimate user of the current bundle using the 'SSP identifier of the first SSP' and the 'bundle identifier of the bundle transmitted by the first terminal'.

b) The bundle management server may check whether a 'service related to the bundle corresponding to the bundle identifier transmitted by the first terminal' has already been requested to move by another terminal (e.g., by the second terminal, as illustrated in FIG. 8). For example, the bundle management server may check whether the 'bundle identifier transmitted by the first terminal' is a bundle identifier stored through step 8030 of FIG. 8.

As a result of the above check, it was checked that 'a legitimate user of the bundle related to the bundle identifier transmitted by the first terminal is the first terminal', and when the service related to the bundle is requested to move by another terminal (e.g., the second terminal, as illustrated in FIG. 8), the bundle management server may determine which operation the first terminal should perform to generate a "transfer option" using the result of the "determined option" received in step 8025 and/or the "eligibility check" performed in step 8030. For example, the bundle management server may select one of movement methods that were allowed in the "determined option" and that may be simultaneously performed as the "eligibility check" result, and then configure a "transfer option" based on the selected method. For example, the "transfer option" may include at least one of the following data.

a) Information indicating the bundle management server 950 (e.g., the OID of the bundle management server)

b) Information indicating the first terminal 910 (e.g., the SSP identifier of the first SSP)

c) Information indicating the second terminal 860 (e.g., the SSP identifier of the second SSP)

d) Bundle identifier (SPB ID) of the bundle related to the service to be moved e) Information indicating information to be transmitted by the first terminal The first terminal should transmit a bundle related to a service wanting to move to the bundle management server The first terminal should transmit some of bundle information related to a service wanting to move (e.g., a series of updates performed after the bundle is installed in the first terminal, updates made by the service provider and/or setting or personal information added by the user and/or updates made by a third service provider) to the bundle management server f) Whether the first terminal should delete the bundle related to a service wanting to move g) When the first terminal transmits information, the information is information indicating whether this information should be "end-to-end encryption between the first terminal and the second terminal" or "encryption between the first terminal and the bundle management server"

h) Transaction ID

Part and/or all of the above-described information may be encrypted using ShKeyM1 and this may be included as part of "transfer options".

Part and/or all of the above-described information may be digitally signed using SPBM.Cert.DS, and a digital signature value thereof may be included as part of "transfer options". In this case, the SPBM.Cert.DS and a set of information necessary for verifying the validity of the SPBM.Cert.DS may be included as part of "transfer options".

The bundle management server 950 may transmit a "transfer option" to the first SSP 920 via the first LBA 930. The bundle management server 950 may further transmit ssp2.SelectedCryptoInfo to the first SSP 920 via the first LBA 930.

In step 9030, the first SSP 920 may perform one or more of the following processes.

a) When the received "transfer option" includes encrypted information, the first SSP 920 decrypts the encrypted information using ShKeyM1 b) When the received "transfer option" includes a digital signature value, the first SSP 920 verifies the validity of SPBM.Cert.DS and then verifies the validity of the digital signature value using SPBM.Cert.DS c) The first SSP 920 verifies whether the OID of the bundle management server included in the received "transfer option", the SSP identifier of the first SSP, the SSP identifier of the second SSP, the bundle identifier of a bundle related to the service to be moved, and/or the transaction ID are/is a correct value The first SSP 920 may check a bundle (or bundle image) to be transmitted to the bundle management server and/or whether there is some data in the bundle using the "transfer option".

When the bundle management server wants to receive a bundle and/or some data of the bundle, the first SSP 920 may prepare the requested bundle and/or some data of the bundle.

The first SSP 920 may check information included in ssp2.SelectedCryptoInfo.

The first SSP 920 may set a public key "ssp1.ePK.BT" and a private key "ssp1.eSK.BT", which are a key pair for encryption. The value may be the same as values of "ssp1.ePK.KA" and "ssp1.eSK.KA" according to an embodiment.

According to an embodiment, the first SSP 920 may generate a key ShKeyBT for encrypted communication with the bundle management server using a 'public key included in the prepared ssp1.eSK.BT and SPBM.Cert.KA'.

According to an embodiment, the first SSP 920 may generate a key ShKeyBT for encrypted communication with the second terminal using ssp2.ePK.BT included in the prepared ssp1.eSK.BT and ssp2.SelectedCryptoInfo.

The first SSP 920 may encrypt part and/or all of 'the previously prepared bundle and/or some data of the bundle' using ShKeyBT.

The above-described 'prepared bundle and/or some data of the bundle' may be referred to as a 'bound bundle material'.

The first SSP 920 may check whether the bundle management server wants to delete the bundle using the "transfer option". When the bundle management server wants to delete the corresponding bundle, the first SSP may delete the corresponding bundle.

The first SSP 920 may transmit a "bound bundle material" to the first LBA 930. The first SSP 920 may further transmit ssp1.ePK.BT to the first LBA 930.

In step 9035, the first LBA 930 may transmit a "bound bundle material" to the bundle management server 950. The first LBA 930 may further transmit ssp1.ePK.BT to the bundle management server 950.

In step 9040, the bundle management server 950 may transmit a response message notifying that all processes have been performed to the first LBA 930.

When the first terminal 910 does not need to send a bundle and/or some data of the bundle to the bundle management server 950, steps 9035 and 9040 may be omitted.

Figure 10:
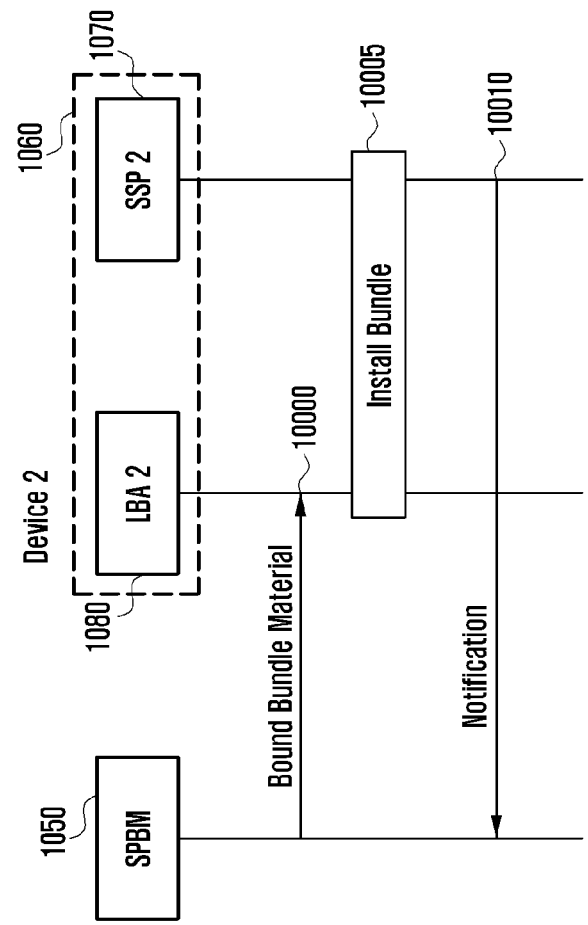
FIG. 10 illustrates a message flow diagram of a procedure in which a second terminal downloads and installs a bundle from a bundle management server among the procedures presented in FIG. 7 according to an embodiment of the disclosure.

FIG. 10 illustrates a message flow diagram of a procedure in which a second terminal 1060 downloads and installs a bundle from a bundle management server 1050 among the procedures presented in FIG. 7 according to an embodiment of the disclosure.

Referring to FIG. 10, the terminal may include at least one LBA and at least one SSP. For example, the second terminal 1060 may include a second LBA 1080 and a second SSP 1070. A description of the bundle management server 1050 will be described with reference to FIG. 4.

Referring to FIG. 10, the following process may be performed in step 10000.

The bundle management server 1050 may prepare data related to a bundle to be transmitted to the second terminal 1060. Possible examples of this preparation process are as follows:

[Case A]

In step 9035, when the bundle management server receives a 'bundle' that is 'encrypted between the first terminal and the bundle management server', the bundle management server may perform decryption. In an embodiment, the bundle management server may encrypt the decrypted bundle using ShKeyM2 and then prepare transfer of the bundle. In another embodiment, the bundle management server may generate a public key "SPBM.ePK.BT" and a private key "SPBM.eSK.BT", which are a key pair, then generate an encryption key ShKeyBT using SPBM.eSK.BT and ssp2.ePK.KA, encrypt the decrypted bundle using the key, and then prepare the bundle for transmission.

[Case B]

In step 9035, when the bundle management server receives 'partial data of the bundle' that is 'encrypted between the first terminal and the bundle management server', the bundle management server may perform decryption. In an embodiment, the bundle management server may prepare a bundle including the decrypted bundle data as a part. In another embodiment, after preparing a bundle to be transmitted to the second terminal, the bundle management server may include the decrypted bundle data as additional data. In an embodiment, the bundle management server may encrypt part and/or all of the prepared bundle and/or additional data using ShKeyM2. In another embodiment, the bundle management server may generate a public key "SPBM.ePK.BT" and a private key "SPBM.eSK.BT", which are a key pair, generate an encryption key ShKeyBT using the SPBM.ePK.BT and ssp2.ePK.KA, and then encrypt part and/or all of the prepared bundle and/or additional data using the encryption key ShKeyBT.

[Case C]

In step 9035, when the bundle management server receives a 'bundle' that is 'encrypted between the first terminal and the second terminal', the bundle management server may prepare the bundle as a bundle to be transmitted to the second terminal.

[Case D]

In step 9035, when the bundle management server receives 'partial data of the bundle' that is 'encrypted between the first terminal and the second terminal', the bundle management server may generate a bundle to be transmitted to the second terminal, and include the received bundle data as additional data. In an embodiment, part and/or all of the bundles generated by the bundle management server may be encrypted using ShKeyM2. In another embodiment, after the bundle management server generates a public key "SPBM.ePK.BT" and a private key "SPBM.eSK.BT", which are a key pair and generates an encryption key ShKeyBT using SPBM.eSK.BT and ssp2.ePK.KA, part and/or all of the bundles generated by the bundle management server may be encrypted using the encryption key ShKeyBT.

[CASE E]

When the bundle management server does not receive a bundle and/or some data of the bundle from the first terminal, the bundle management server may generate a bundle to be transmitted to the second terminal. In an embodiment, part and/or all of the bundles generated by the bundle management server may be encrypted using ShKeyM2. In another embodiment, after the bundle management server generates a public key "SPBM.ePK.BT" and a private key "SPBM.eSK.BT", which are a key pair and generates an encryption key ShKeyBT using SPBM.eSK.BT and ssp2.ePK.KA, part and/or all of the bundles generated by the bundle management server may be encrypted using the encryption key ShKeyBT.

The prepared bundle and additional data mentioned in the above [CASE A] to [CASE E] may be referred to as a bound bundle material.

The bundle management server 1050 may transmit the 'bound bundle material' to the second LBA 1080. The bundle management server 1050 may further transmit SPBM.ePK.BT to the second LBA 1080. The bundle management server 1050 may further transmit ssp1.ePK.BT to the second LBA 1080.

A bundle may be installed in the second SSP in step 10005. The second SSP 1070 and/or the second LBA 1080 may install a bundle in the second SSP 1070 using the "bound bundle material" received in step 10000.

In an embodiment, when the bundle and/or additional data received from the bundle management server 1050 are encrypted with an encryption key between the bundle management server and the second terminal, the second SSP 1070 may decrypt encrypted information using SHkeyM2.

In another embodiment, when the bundle and/or additional data received from the bundle management server 1050 are encrypted with an encryption key between the bundle management server and the second terminal, the second SSP 1070 may generate an encryption key ShKeyBT using SPBM.ePK.BT and then decrypt encrypted information using the key.

In another embodiment, when the bundle and/or additional data received from the bundle management server 1050 are encrypted with an encryption key between the first terminal and the second terminal, the second SSP 1070 may generate an encryption key ShKeyBT using ssp1.ePK.BT and then decrypt encrypted information using the key.

In step 10010, the second SSP 1070 may notify the bundle installation result to the bundle management server 1050.

Figure 11:
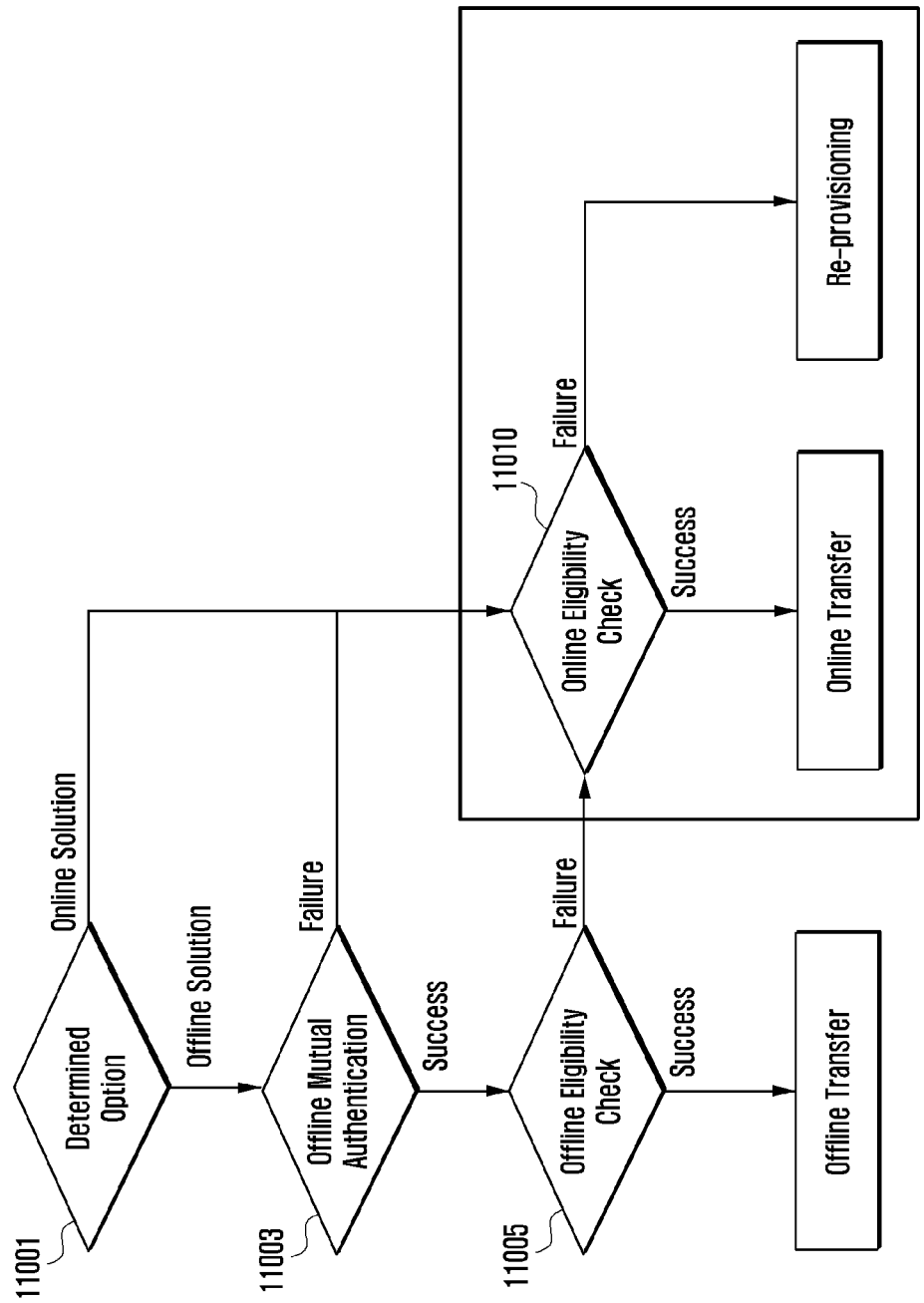
FIG. 11 illustrates a flowchart of an example of an overall process in which a bundle or a service related to the bundle is moved offline or online from one terminal to another terminal.

FIG. 11 illustrates a flowchart of an example of an overall process in which a bundle or a service related to the bundle is moved offline or online from one terminal to another terminal.

Referring to FIG. 11, a description of step 11001 is as follows.

A process illustrated in FIG. 5 is performed, and in step 5020, the second LBA may generate a "determined option".

When the "determined option" includes an "offline movement" as an allowed option, and the "offline movement" is a method to be performed first among options included in the "determined option", step 11003 may be performed. Whether the "offline movement" should be performed first among the options included in the "determined option" may be determined by various methods. That is, it may be determined by the policy of the service provider, or it may be determined by the policy of the terminal manufacturer, or when the "determined option" includes an "offline movement", the option may be attempted first.

"Online movement" (or "online transfer" and "re-provisioning", which are two examples of the online movement) is included in "determined options" as allowed options, and when the "online movement" is a method to be performed first among options included in "determined options", step 11010 may be performed. Whether the "online movement" should be performed first among the options included in the "determined option" may be determined by various methods. That is, it may be determined by the policy of the service provider, it may be determined by the policy of the terminal manufacturer, or when the "offline movement" is not included but the "online movement" is included in the "determined option", the "online movement" may be a method that should be performed first.

A description of step 11003 is as follows.

Steps 6000 to 6020 illustrated in FIG. 6 may be performed.

When a "certificate negotiation process" fails in step 6025 illustrated in FIG. 6 and the "online movement" is included in the "determined option", step 11010 may be performed. A more detailed description of this process will be described with reference to FIG. 6.

When the "certificate negotiation process" is successful in step 6025 illustrated in FIG. 6, step 11005 may be performed.

A description of step 11005 is as follows.

Steps 6030 to 6040 illustrated in FIG. 6 may be performed.

When the "eligibility check" fails in step 6045 illustrated in FIG. 6 and the "online movement" is included in the "determined option", step 11010 may be performed. A more detailed description of this process will be described with reference to FIG. 6.

When the "eligibility check" is successful in step 6045 illustrated in FIG. 6, the remaining processes illustrated in FIG. 6 may be performed. In this way, "a process in which two terminals establish a connection without a bundle management server therebetween and in which the bundle moves from one terminal to another terminal through the connection" may be referred to as an "offline movement" or "offline transfer".

A description of step 11010 is as follows.

The process illustrated in FIG. 8 may be performed.

Steps 9000 to 9020 of the process illustrated in FIG. 9 may be performed.

In step 9025 of the process illustrated in FIG. 9, the bundle management server may generate a "transfer option". A definition and generation process of "transfer option" will be described with reference to the description of FIG. 9.

When the first terminal needs to transmit the bundle and/or some data of the bundle to the bundle management server in the "transfer option", the first terminal may transmit data requested in step 9030 and steps 9035 to 9040 may be performed. Next, a process of FIG. 10 may be performed. In this way, "a process in which two terminals and the bundle management server, respectively establish a connection, and in which the bundle or some data of the bundle installed in one terminal is transmitted to the bundle management server and then is transmitted to another terminal" may be referred to as "online transfer".

When there is no need for the first terminal to transmit the bundle and/or some data of the bundle to the bundle management server in the "transfer option", the bundle and/or some data of the bundle do not need to be transmitted in step 9030 and steps 9035 to 9040 may be omitted. Next, the process of FIG. 10 may be performed. In this way, "a process in which the two terminals and the bundle management server, respectively establish a connection and in which the bundle of the terminal where an original bundle was installed is selectively deleted and in which the bundle management server generates a bundle related to a service to be moved and transmits the bundle to another terminal" may be referred to as "re-provisioning".

Figure 12:
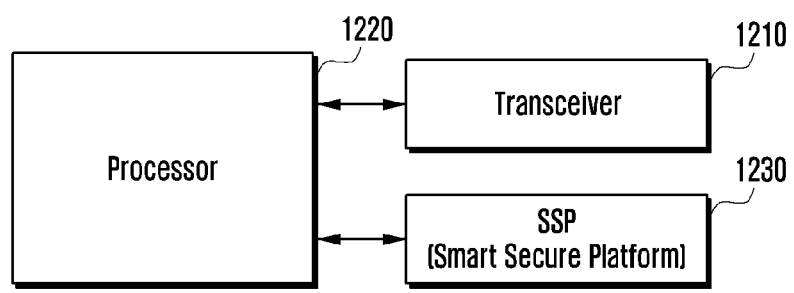
FIG. 12 illustrates a block diagram of a configuration of a terminal equipped with an SSP according to some embodiments of the disclosure.

FIG. 12 illustrates a block diagram of a configuration of a terminal equipped with an SSP according to some embodiments of the disclosure.

As illustrated in FIG. 12, the terminal may include a transceiver 1210 and at least one processor 1220. Further, the terminal may further include an SSP 1230. For example, the SSP 1230 may be inserted into the terminal or may be built into the terminal. The at least one processor 1220 may be referred to as a 'controller'. However, a configuration of the terminal is not limited to FIG. 12, and may include more or fewer components than the components illustrated in FIG. 12. According to some embodiments, the transceiver 1210, at least one processor 1220, and a memory (not illustrated) may be implemented in the form of one chip. Further, when the SSP 1230 is embedded, the transceiver 1210, at least one processor 1220, and the memory (not illustrated) may be implemented in the form of a single chip including the SSP 1230.

According to various embodiments, the transceiver 1210 may transmit and receive signals, information, data, and the like according to various embodiments of the disclosure to and from a transceiver of another terminal or an external server. The transceiver 1210 may include an RF transmitter for up-converting and amplifying a frequency of a transmitted signal, and an RF receiver for low-noise amplifying a received signal and down-converting a frequency thereof. However, this is only an embodiment of the transceiver 1210, and components of the transceiver 1210 are not limited to the RF transmitter and the RF receiver. Further, the transceiver 1210 may receive a signal through a wireless channel, output the signal to at least one processor 1220, and transmit the signal output from the at least one processor 1220 through the wireless channel.

At least one processor 1220 is a component for overall controlling the terminal. At least one processor 1220 may control the overall operation of the terminal according to various embodiments of the disclosure, as described above.

The SSP 1230 may include a processor or a controller for installing and controlling a bundle, or an application may be installed therein. Further, according to various embodiments, the SSP 1230 may operate under the control of the processor 1220. Alternatively, the SSP 1230 may include a processor or a controller for installing and controlling a bundle, or an application may be installed therein. Part or all of the application may be installed in the SSP 1230 or a memory (not illustrated).

The terminal may further include a memory (not illustrated), and store data such as a basic program, an application program, and configuration information for an operation of the terminal. Further, the memory may include at least one storage medium of a flash memory type, a hard disk type, a multimedia card micro type, a card type memory (e.g., SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Further, the processor may perform various operations using various programs, contents, data, and the like stored in the memory.

Figure 13:
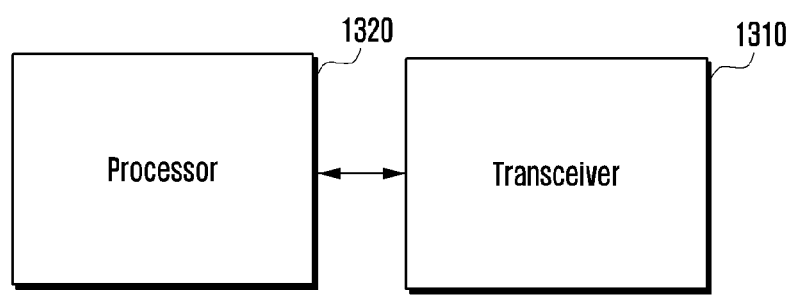
FIG. 13 illustrates a block diagram of a configuration of a bundle management server according to some embodiments of the disclosure.

FIG. 13 illustrates a block diagram of a configuration of a bundle management server according to some embodiments of the disclosure.

According to some embodiments, the bundle management server may include a transceiver 1310 and at least one processor 1320. However, a configuration of the bundle management server is not limited to FIG. 13, and may include more or fewer components than components illustrated in FIG. 13.

According to some embodiments, the transceiver 1310 may transmit and receive signals, information, data, and the like according to various embodiments of the disclosure to and from the terminal. The transceiver 1310 may include an RF transmitter for up-converting and amplifying a frequency of a transmitted signal, and an RF receiver for low-noise amplifying a received signal and down-converting a frequency thereof. However, this is only an embodiment of the transceiver 1310, and components of the transceiver 1310 are not limited to the RF transmitter and the RF receiver. Further, the transceiver 1310 may receive a signal through a wireless channel, output the signal to at least one processor 1320, and transmit a signal output from the at least one processor 1320 through a wireless channel.

At least one processor 1320 is a component for overall controlling the bundle management server. The processor 1320 may control the overall operation of the bundle management server according to various embodiments of the disclosure, as described above. The at least one processor 1320 may be referred to as a controller.

The bundle management server may further include a memory (not illustrated), and store data such as a basic program, an application program, and configuration information for an operation of the bundle management server. Further, the memory may include at least one storage medium of a flash memory type, a hard disk type, a multimedia card micro type, a card type memory (e.g., SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM).

Figure 14:
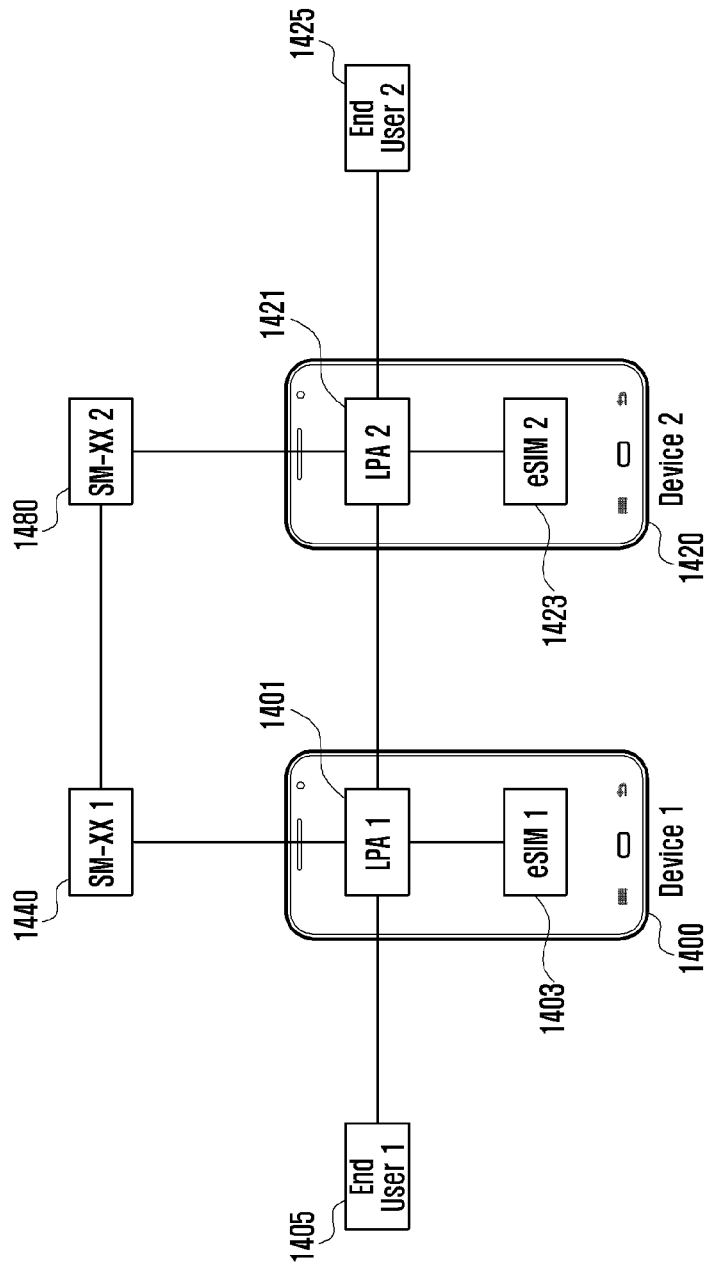
FIG. 14 illustrates a diagram of an example of a method in which two terminals and a server mutually operate so that a profile or a service related to the profile is moved offline or online from one terminal to another terminal according to an embodiment of the disclosure.

FIG. 14 illustrates a diagram of an example of a method in which two terminals and a server mutually operate so that a profile or a service related to the profile is moved offline or online from one terminal to another terminal according to an embodiment of the disclosure.

As illustrated in FIG. 14, a first eSIM 1403 and a second eSIM 1423 may be mounted in a first terminal 1400 and a second terminal 1420, respectively, and a profile (not illustrated) may be installed in each of the first eSIM 1403 and the second eSIMs 1423. Further, a first LPA 1401 and a second LPA 1421 may be installed in the first terminal 1400 and the second terminal 1420, respectively. The first eSIM 1403 and the second eSIM 1423 may be controlled by the first LPA 1401 and the second LPA 1421, respectively. A first user 1405 and a second user 1425 may control profiles installed in the eSIM (the first eSIM 1403 and the second eSIM 1423) of each terminal through the first LPA 1401 and the second LPA 1421, respectively. In this case, the first user 1405 and the second user 1425 may be the same. Further, the first LPA 1401 and the second LPA 1421 may be connected to each other to communicate. In this case, a possible connection method between the LPAs will be described with reference to the drawings to be described later.

The first LPA 1401 of the first terminal 1400 may be connected to a first RSP server 1440, and the second LPA 1421 of the second terminal 1420 may be connected to a second RSP server 1480. In this case, the first RSP server 1440 and the second RSP server 1480 may be the same. Further, for convenience, in the drawing, a case is illustrated that the first RSP server 1440 and the second RSP server 1480 are each configured as a single server, but according to implementations and embodiments, one or more profile providing servers (SM-DP+) may be included in a server configuration, and one or more subscription manager discovery services (SM-DS) that assist the generation of a connection between a specific profile providing server and the terminal may be included in the server configuration. Further, although not illustrated in the drawing, one or more RSP servers and/or relay servers may be connected between the first RSP server 1440 and the second RSP server 1480.

Further, although not illustrated in the drawings, each RSP server and/or relay server may be connected to an operator server. When one or more operator servers are included in the configuration, each operator server may be connected to each separate RSP server and/or relay server, and at least one operator server may be connected to the same RSP server and/or relay server.

A configuration of various servers as described above may be briefly illustrated as a single RSP server in the following drawings. For example, when one or more RSP servers and/or relay servers are connected between the first terminal 1400 and the second terminal 1420, and when part or all of the RSP servers and/or the relay servers are connected to an operator server, a configuration of various servers existing between the first terminal and the second terminal may be represented as a single RSP server, and the single RSP server may be referred to as SM-XX in the drawings and embodiments.

Figure 15:
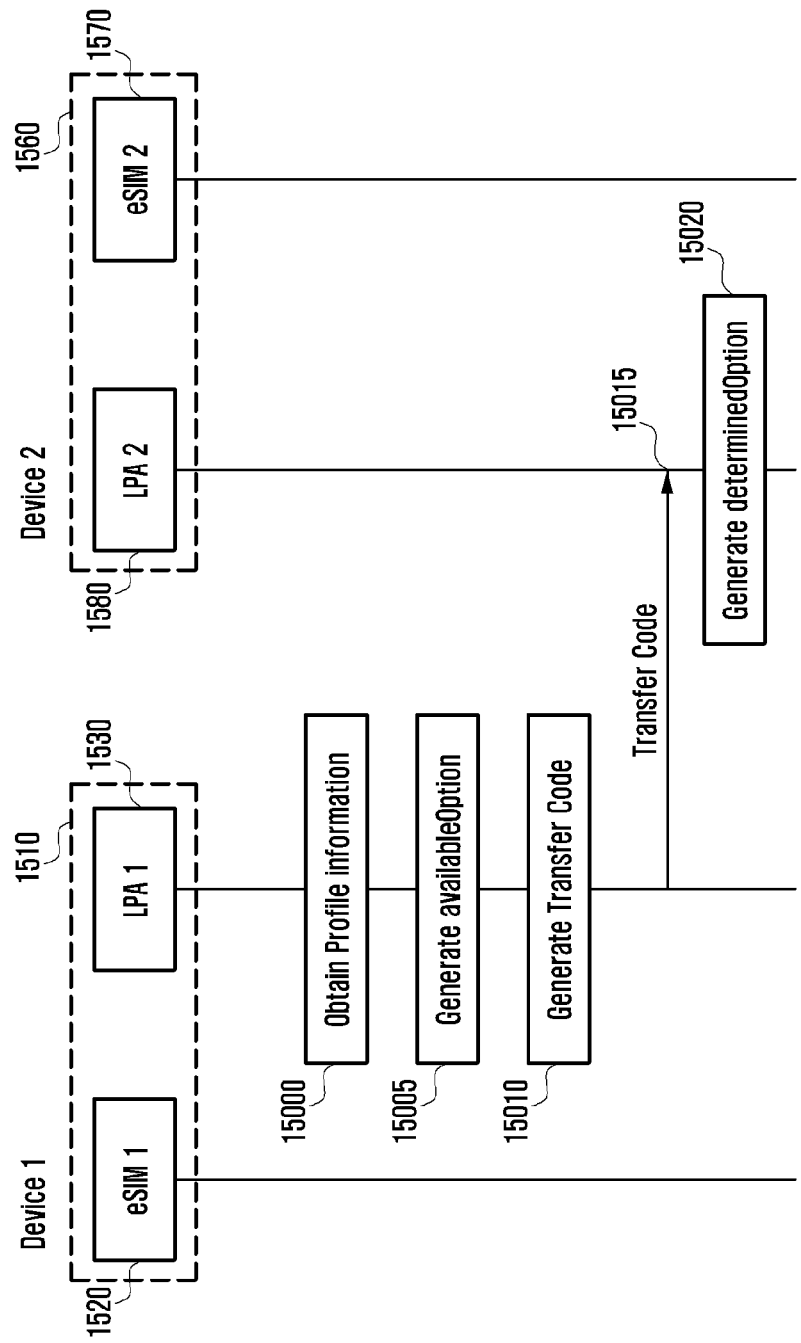
FIG. 15 illustrates a message flow diagram of a procedure for preparing to move a profile or a service related to the profile from one terminal to another terminal according to an embodiment of the disclosure.

FIG. 15 illustrates a message flow diagram of a procedure for preparing to move a profile or a service related to the profile from one terminal to another terminal according to an embodiment of the disclosure.

Referring to FIG. 15, the terminal may include at least one LPA and at least one eSIM. For example, a first terminal 1510 may include a first LPA 1530 and a first eSIM 1520, and a second terminal 1560 may include a second LPA 1580 and a second eSIM 1570.

A method of moving a profile or a service related to the profile from one terminal to another terminal may be broadly classified as follows.

Offline movement: Movement of a profile or a service related to the profile through an offline method may mean that two terminals establish a connection without an RSP server therebetween and that the profile moves from one terminal to another terminal through the connection. Through the movement of the profile, a service related to the corresponding profile may be moved. In this case, the possible connection method will be referred to the description of FIG. 17.

Online movement: Movement of a profile or a service related to the profile through the online method may mean that two terminals and an RSP server, respectively establish a connection and that the profile or the service related to the profile moves with the help of the RSP server.

In this case, an offline movement may be classified as follows.

Offline image transfer: It may mean that a profile image is transmitted from one terminal to another terminal through the offline movement.

Offline package transfer: It may mean that a profile package is transmitted from one terminal to another terminal through offline movement.

Further, the online movement may be classified as follows.

Online image transfer: It may mean that a profile image is transmitted from one terminal to another terminal through the online movement.

Online package transfer: It may mean that a profile package is transmitted from one terminal to another terminal through the online movement.

Re-provisioning: It may mean a process in which two terminals and the RSP server, respectively establish a connection, but a profile of the terminal where an original profile was installed is selectively deleted and in which the RSP server generates a profile related to a service to be moved and transmits the profile to another terminal.

The above 'offline image transfer' and 'offline package transfer' may be referred to as 'offline transfer', and 'offline package transfer' may be used as the same meaning as that of 'offline movement'.

The above 'online image transfer' and 'online package transfer' may be referred to as 'online transfer'.

The above description may be classified in the following manner.

Offline movement
  Offline transfer
    Offline image transfer
    Offline package transfer
Online movement
  Online transfer
    Online image transfer
    Online package transfer
Re-provisioning According to various embodiments, the first terminal 1510 may have a pre-installed profile, and may further have metadata related to the pre-installed profile. According to various embodiments, the first terminal 1510 may have a 'profile identifier' related to a pre-installed profile.

According to various embodiments, the first terminal 1510 may have 'profile movement setting' related to a pre-installed profile.

The 'profile movement setting' may include factors including the following information.

Whether the corresponding profile or a service related to the profiles may be moved from one terminal to another terminal Further, the 'profile movement setting' may include a factor indicating through which method a corresponding profile or a service related to the profile may be moved from one terminal to another terminal.

For example, the 'profile movement setting' may include information on which method(s) of the following methods is(are) allowed.

Offline movement
Online movement

As another example, the 'profile movement setting' may include information on which method(s) of the following methods is(are) allowed.

Offline transfer
Online transfer
Re-provisioning

As another example, the 'profile movement setting' may include information on which method(s) of the following methods is(are) allowed.

Offline image transfer
Offline package transfer
Online image transfer
Online package transfer
Re-provisioning Referring to FIG. 15, in step 15000, the first LPA 1530 may obtain information on a (service related) profile to be moved. Alternatively, information on a (service related) profile to be moved may be transferred to the first LPA. For example, the first LPA may obtain information on the (service related) profile to be moved when the user receives a user input that selects a profile through a UI provided by the first terminal 1510, and information on a (service related) profile to be moved may be input from a remote server to the first LPA through a push input, or the first LPA may access the remote server to read information on the (service related) profile to be moved. However, a method in which the first LPA obtains information on a (service related) profile to be moved is not limited thereto.

In step 15005, the first LPA 1530 may configure an "available option", which is information representing through which method a profile to be moved by itself or a service related to the profile may be moved. For example, "available option" may include information on which method(s) of the following methods is(are) allowed.

Offline movement
Online movement

As another example, the 'available option' may include information on which method(s) of the following methods is(are) allowed.

Offline transfer
Online transfer
Re-provisioning

As another example, the 'available option' may include information on which method(s) of the following methods is(are) allowed.

Offline image transfer
Offline package transfer
Online image transfer
Online package transfer
Re-provisioning In this case, one or more of the following information may be used for configuring "available option".

'Profile movement setting' of the (service related) profile to be moved

Functions implemented in the first terminal (i.e., what type of movement a terminal function supports)

A currently possible connection method of the first terminal (e.g., whether the first terminal can currently communicate with the server through an online connection)

That is, the first terminal (e.g., the first LPA 1530) may check a 'movement method allowed in the profile movement setting', 'a movement method that is implemented in the first terminal and that may be supported', and/or a 'movement method that may be performed through the currently available connection method of the first terminal' and then configure "available options" using this information.

In step 15010, the first LPA 1530 may generate a 'profile transfer code'. The profile transfer code may include a 'profile identifier' of the profile to be transmitted. Further, the profile transfer code may include an address of the RSP server related to the profile to be transmitted. (In the future, the second terminal 1560 may access the RSP server and download a profile using the address.) Further, the profile transfer code may further include other information indicating properties of the profile (e.g., profile metadata or part of metadata).

Further, the profile transfer code may include information (supported crypto info) on encryption algorithms supported by the first terminal (e.g., the first eSIM). Information on encryption algorithms supported by the first terminal may optionally include one or more of the following information; elliptic curve list supported by the first terminal/key agreement algorithm list supported by the first terminal/encryption algorithm list supported by the first terminal.

Further, when the first terminal and the second terminal need to establish a connection in the future, the profile transfer code may include information necessary for establishing the connection.

Further, the profile transfer code may include an "available option".

In step 15015, the profile transfer code generated in step 15010 may be transmitted from the first LPA 1530 to the second LPA 1580. The profile transfer code may be transmitted in various methods.

For example, the first LPA 1530 may provide information to be transmitted to the second LPA 1580 to a first user of the first terminal through an UI of the first terminal. The first user may provide the received information to a second user of the second terminal. The second user may input the received information into the second LPA using an UI of the second terminal.

Alternatively, the first LPA 1530 may make information to be transmitted to the second LPA 1580 in the form of an image (e.g., QR code) and display the image on a screen of the first terminal, and the second user may scan the image displayed on the screen of the first terminal using the second terminal to transmit information to the second LPA.

Alternatively, the first LPA 1530 may establish a connection between the first LPA 1530 and the second LPA 1580 and transmit information to be transmitted using the established connection. In this case, the connection established between the first LPA 1530 and the second LPA 1580 may be a direct device-to-device connection (e.g., wired connection such as NFC, Bluetooth, UWB, WiFi-Direct, LTE device-to-device (D2D), and 5G D2D and wireless connection such as a cable connection) or a remote connection in which a remote server (e.g., relay server) is located between the first LPA 1530 and the second LPA 1580.

In step 15020, the second LPA 1580 may configure a "determined option", which is information indicating through which method a profile wanting to receive by itself or a service related to the profile may be received. For example, the "determined option" may include information on which method(s) of the following methods is(are) allowed.
  Offline movement
  Online movement
As another example, the "determined option" may include information on which method(s) of the following methods is(are) allowed.
  Offline transfer
  Online transfer
  Re-provisioning
As another example, the "determined option" may include information on which method(s) of the following methods is(are) allowed.
  Offline image transfer
  Offline package transfer
  Online image transfer
  Online package transfer
  Re-provisioning
In this case, one or more of the following information may be used for configuring a "determined option".
  "Available options" received in step 15015
  Functions implemented in the second terminal (i.e., which type of movement the terminal function supports)
  A currently possible connection method of the second terminal (e.g., whether the second terminal can currently communicate with the server through an online connection)

That is, the second terminal (e.g., the second LPA 1580) may check a 'movement method allowed in the received "available option", a 'movement method that is implemented in the second terminal and that can support', and/or a 'movement method that may be performed through the currently available connection method of the second terminal' and then configure a "determined option" using the information.

Figure 16:
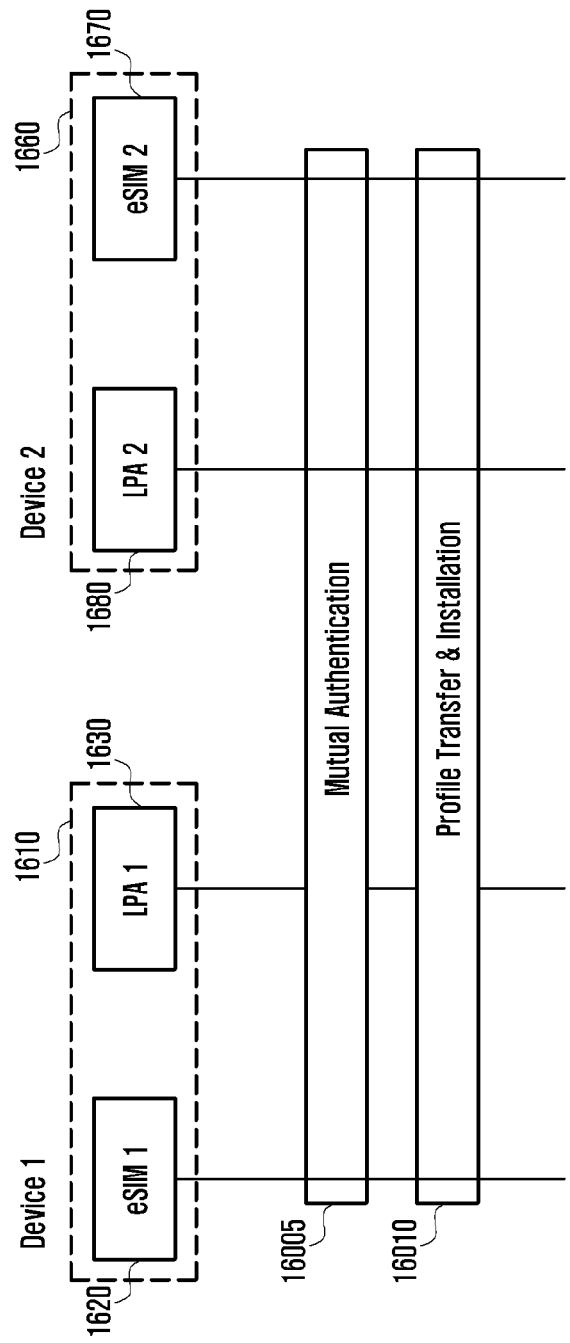
FIG. 16 illustrates a message flow diagram conceptually illustrating an offline movement procedure of a profile according to an embodiment of the disclosure.

FIG. 16 illustrates a message flow diagram conceptually illustrating an offline movement procedure of a profile according to an embodiment of the disclosure.

According to various embodiments, the terminal may include at least one LPA and at least one eSIM. For example, as in the example of FIG. 16, a first terminal 1610 may include a first LBA 1630 and a first eSIM 1620, and a second terminal 1660 may include a second LPA 1680 and a second eSIM 1670.

A procedure illustrated in FIG. 16 may be performed after the procedure illustrated in FIG. 15.

Referring to FIG. 16, in step 16005, a mutual authentication process may be performed between the first terminal 1610 and the second terminal 1660 (e.g., between the first eSIM 1620 and the second eSIM 1670). A more detailed description of the procedure will be described with reference to FIG. 17 to be described later.

Referring to FIG. 16, in step 16010, a procedure may be performed in which a profile is transmitted from the first terminal 1610 to the second terminal 1660 and in which the transmitted profile is installed in the second terminal. A more detailed description of the procedure will be described with reference to FIG. 18 to be described later.

Figure 17:
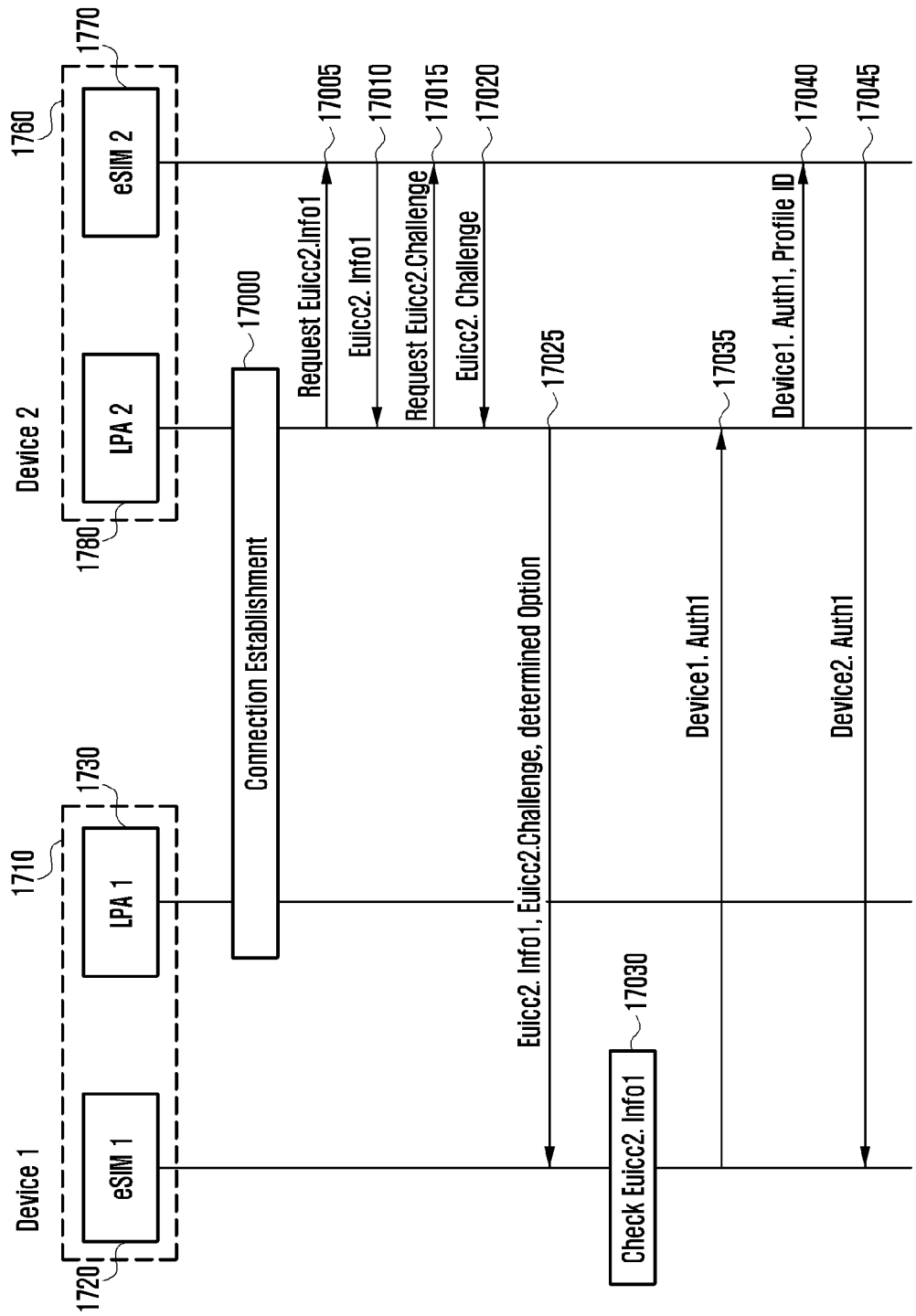
FIG. 17 illustrates a message flow diagram of a detailed procedure for performing mutual authentication between a first terminal and a second terminal among the procedures presented in FIG. 16 according to an embodiment of the disclosure.

FIG. 17 illustrates a message flow diagram of a detailed procedure for performing mutual authentication between a first terminal 1710 and a second terminal 1760 among the procedures presented in FIG. 16 according to an embodiment of the disclosure.

Referring to FIG. 17, the terminal may include at least one LPA and at least one eSIM. For example, the first terminal 1710 may include a first LPA 1730 and a first eSIM 1720, and the second terminal 1760 may include a second LPA 1780 and a second eSIM 1770.

Referring to FIG. 17, in operation 17000, a connection may be established (or set) between the first LPA 1730 and the second LPA 1780. The connection between the first LPA 1730 and the second LPA 1780 may be a direct device-to-device connection (e.g., a wireless connection such as NFC, Bluetooth, UWB, WiFi-Direct, LTE device-to-device (D2D), and 5G D2D, or a wired connection through a cable) or a remote connection in which a remote server (e.g., relay server) is located between the first LPA 1730 and the second LPA 1780.

In step 17005, the second LPA 1780 may request Euicc2.Info1 to the second eSIM 1770.

In step 17010, the second eSIM 1770 may form Euicc2.Info1. Euicc2.Info1 may include the following information.

- Certificate information that may be used by the first eSIM for verifying the second eSIM
- Certificate information that may be used the second eSIM for verifying the first eSIM
- Version information supported by the second terminal Further, the second eSIM may provide Euicc2.Info1 to the second LPA 1780.

In step 17015, the second LPA 1780 may request Euicc2.Challenge to the second eSIM 1770.

In step 17020, the second eSIM 1770 may generate Euicc2.Challenge. Euicc2.Challenge may be any random number generated by the second eSIM 1770. The second eSIM 1770 may provide Euicc2.Challenge to the second LPA 1780.

In step 17025, the second LPA 1780 may provide Euicc2.Info1 to the first eSIM 1720 via the first LPA 1730. Further, the second LPA 1780 may provide Euicc2.Challenge to the first eSIM 1720 via the first LPA 1730.

Further, the second LPA 1780 may provide a "determined option" to the first eSIM 1720 via the first LPA 1730. However, it is not necessary for the first LPA 1730 to provide the "determined option" (received from the second LPA) to the first eSIM 1720 at this stage. For example, as part of step 17045, the first LPA 1730 may provide a "determined option" to the first eSIM 1720.

Further, the first LPA 1730 may further provide a 'profile identifier' of a profile to be transmitted to the first eSIM 1720.

The following process may be performed in step 17030.

The first eSIM 1720 may select an Euicc1.Certificate to be used by itself using 'certificate information that may be used by the second eSIM for verifying the first eSIM' included in Euicc2.Info1.

The first eSIM 1720 may select a certificate to be used by the second eSIM 1770 using 'certificate information that may be used by the first eSIM for verifying the second eSIM' included in Euicc2.Info1. In this case, the selected certificate information or information that can refer to the selected certificate may be referred to as euiccCiPKIdTo-BeUsed.

The first eSIM 1720 may check version information supported by the second terminal included in Euicc2.Info1 and check whether a version supported by itself exists among the version information.

When at least one of the above-described processes fails (e.g., by checking 'certificate information that may be used by the second eSIM for verifying the first eSIM', when certificate information capable of verifying the first eSIM is not included therein, or by checking 'certificate information that may be used by the first eSIM for verifying the second eSIM', when certificate information that may be used by the first eSIM for verifying another eSIM is not included therein), an offline movement between the two terminals may be stopped. In this case, when an online movement (or at least one of movement methods belonging to the category of the online movement) is allowed in the "determined option", an online movement between the two terminals may be attempted. This process may be started when the first terminal notifies the second terminal that an offline movement has failed, and when the first terminal and the second terminal initiate an online movement process. A description of the online method service movement will be described with reference to the description of FIGS. 19 to 22.

The first eSIM 1720 may check 'profile movement setting' of the profile related to the received profile identifier. The first eSIM 1720 may check whether the corresponding profile may be moved offline.

The first eSIM 1720 may generate a session ID or a transaction ID used for indicate future communication with the second eSIM.

The first eSIM 1720 may generate Euicc1.Challenge. Euicc1.Challenge may be any random number generated by the first eSIM 1720.

The first eSIM 1720 may digitally sign all and/or part of the following values. In this case, the digital signature may be performed using Euicc1.Certificate.

- Transaction ID
- Euicc1.Challenge
- Euicc2. Challenge

In step 17035, the first eSIM 1720 may transmit all and/or part of the following data to the second LPA 1780 via the first LPA 1730.

- Transaction ID and/or Euicc1.Challenge and/or Euicc2.Challenge and digital signature values thereof
- euiccCiPKIdToBeUsed
- Euicc1.Certificate and a series of certificate chain information required for verifying this certificate The provided data may be referred to as Device1.Auth1.

In step 17040, the second LPA 1780 may transmit all and/or part of the following data to the second eSIM 1770.

- Device1.Auth1
- Profile identifier of a profile that the first terminal wants to transmit to the second terminal The following process may be performed in step 17045.

The second eSIM 1770 may verify the validity of Euicc1.Certificate.

The second eSIM 1770 may verify a digital signature value included in Device1.Auth1.

The second eSIM 1770 may check whether Euicc2.Challenge included in Device1.Auth1 has the same value as that of Euicc2.Challenge transmitted by itself in step 17020.

The second eSIM 1770 may select an Euicc2.Certificate to be used by itself using euiccCiPKIdToBeUsed.

The second eSIM 1770 may digitally sign all and/or part of the following values. In this case, the digital signature may be performed using Euicc2.Certificate.

- Transaction ID
- Euicc1.Challenge
- Euicc2.Info2. Here, Euicc2.Info2 may be information that may be used for an eligibility check on whether the 'profile transmitted from the first terminal to the second terminal' may be installed and operate in the second terminal. For example, Euicc2.Info2 may include hardware and/or software information of the second eSIM.
- Profile identifier of a profile that the first terminal wants to transmit to the second terminal The second eSIM 1770 may transmit all and/or part of the following data to the first eSIM 1720 via the second LPA 1780 and the first LPA 1730.

Transaction ID, Euicc1.Challenge, Euicc2.Info2, and/or 'profile identifier of the profile that the first terminal intends to transmit to the second terminal' and digital signature values thereof Euicc2.Certificate and a series of certificate chain information required for verifying the certificate The above data may be referred to as Device2.Auth1.

The first LPA 1730 may further transmit a "determined option" to the first eSIM 1720.

Figure 18:
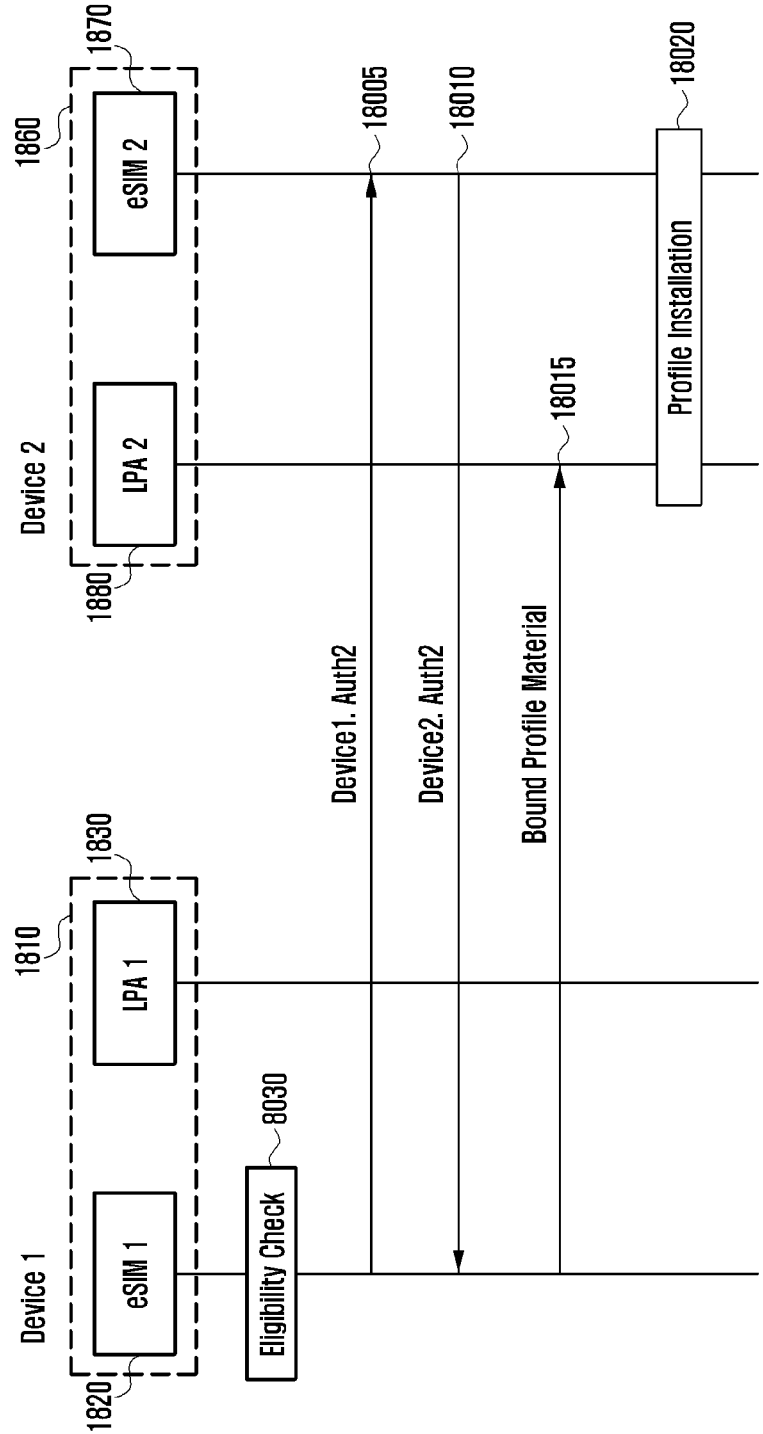
FIG. 18 illustrates a message flow diagram of a detailed procedure in which a profile is transmitted from a first terminal to a second terminal and the transmitted profile is installed in the second terminal among the procedures presented in FIG. 16 according to an embodiment of the disclosure.

FIG. 18 illustrates a message flow diagram of a detailed procedure in which a profile is transmitted from a first terminal 1810 to a second terminal 1860 and the transmitted profile is installed in the second terminal among the procedures presented in FIG. 16 according to an embodiment of the disclosure.

Referring to FIG. 18, the terminal may include at least one LPA and at least one eSIM. For example, the first terminal 1810 may include a first LPA 1830 and a first eSIM 1820, and the second terminal 1860 may include a second LPA 1880 and a second eSIM 1870.

Referring to FIG. 18, the following process may be performed in step 18000.

The first eSIM 1820 may verify the validity of Euicc2.Certificate.

The first eSIM 1820 may verify a digital signature value included in Device2.Auth1.

The first eSIM 1820 may check whether Euicc1.Challenge included in Device2.Auth1 has the same value as that of Euicc1.Challenge that has transmitted by itself.

The first eSIM 1820 may check a profile identifier included in Device2.Auth1 to specify a profile to be transmitted by itself. Alternatively, the first eSIM 1820 may check whether the profile identifier included in Device2.Auth1 corresponds to the profile identifier received in step 17045.

The first eSIM 1820 may check 'profile movement setting' of the profile related to the received profile identifier.

The first eSIM 1820 may perform an eligibility check on whether the corresponding profile can be normally installed and operate in the second terminal (e.g., the second eSIM). In this case, the profile identifier and Euicc2.Info2 may be used for eligibility check.

The first eSIM 1820 may determine which method of movement to continue based on data received so far and results of the performed checks (e.g., the received "determined option" and/or "eligibility check"). For example, the first eSIM 1820 may determine whether to continue to perform "offline movement." As another example, the first eSIM 1820 may determine to stop "offline movement" and to switch to an "online movement." Alternatively, the first eSIM 1820 may determine whether to stop the procedure of moving a profile or a service related to the profile. For the above-described determination, the policy of the service provider may be used. Alternatively, the policy of the terminal manufacturer may be used for the determination. Information necessary for the above determination may be preset or stored in the first eSIM 1820.

The first eSIM 1820 may generate a transferOption using the result of the above-described determination. The transferOption may include information on which of the following methods will be performed.

Offline image transfer

Offline package transfer

Conversion of the movement method to the online movement

Suspension of a service movement process

The following process may be performed in step 18005.

The first eSIM 1820 may digitally sign all and/or part of the following values. In this case, the digital signature may be performed using Euicc1.Certificate.

Transaction ID transferOption

The first eSIM 1820 may transmit a tranction ID and/or transferOption and digital signature values thereof to the second eSIM 1870 via the first LPA 1830 and the second LPA 1880. In this case, the transmitted value may be referred to as Device1.Auth2.

The first terminal 1810 may check the received transferOption and obtain end user consent of the corresponding method.

The following process may be performed in step 18010.

The second eSIM 1870 may verify the digital signature value included in Device1.Auth2.

The second eSIM 1870 may check the transferOption to check how the profile or the service related to the profile will be moved.

When conversion to the 'online movement' is to be performed according to the transferOption, the first terminal and the second terminal may end the 'offline movement' and start the 'online movement' method. This process may be started when the first terminal and the second terminal initiate the process illustrated in FIGS. 19 to 22.

The second eSIM 1870 may generate an encryption key pair (e.g., public key otPK.EUICC2.KA and corresponding private key otSK.EUICC2.KA) thereof necessary for generating a session key to be used for encrypted communication with the first eSIM 1820.

The second eSIM 1870 may digitally sign all and/or part of the following values. In this case, the digital signature may be performed using Euicc2.Certificate.

Transaction ID otPK.EUICC2.KA

The second eSIM 1870 may transmit a Transaction ID and/or otPK.EUICC2.KA and digital signature values thereof to the first eSIM 1820 via the second LPA 1880 and the first LPA 1830. In this case, the transmitted value may be referred to as Device2.Auth2.

The following process may be performed in step 18015.

The first eSIM 1820 may verify the digital signature value included in Device2.Auth2.

The first eSIM 1820 generate an encryption key pair (e.g., public key otPK.EUICC1.KA and corresponding private key otSK.EUICC1.KA) thereof necessary for generating a session key to be used for encrypted communication with the second eSIM 1870.

The first eSIM 1820 may generate a session key for encrypted communication with the second terminal 1860 using otSK.EUICC1.KA generated by itself and the received otPK.EUICC2.KA.

The first eSIM 1820 may prepare a profile image and/or a profile package to be transmitted to the second terminal 1860. In this case, the prepared profile image or profile package may be referred to as a bound profile package or a bound profile image. Further, the bound profile package and the bound profile image may be collectively referred to as a bound profile.

In this preparation process, all and/or part of the 'profile image and/or profile package to be transmitted' may be encrypted by the previously generated session key. Further, all and/or part of the 'profile image and/or profile package to be transmitted' may be digitally signed using Euicc1.Certificate, and this value may be included as part of the bound profile. Further, otPK.EUICC1.KA may be included as part of the bound profile.

The first eSIM 1820 may transmit the bound profile to the second LPA 1880 via the first LPA 1830. In this case, metadata related to the corresponding profile may be transmitted together. In this case, the metadata may be included as a part of the bound profile or may be transmitted as separate data from the bound profile.

The first eSIM 1820 may delete the corresponding profile. The following process may be performed in step 18020.

The second terminal 1860 may check the transmitted metadata.

The second terminal 1860 may receive end user consent related to the installation of the received bound profile.

The second terminal 1860 may install the received bound profile in the second eSIM 1870. This process may be performed by collaboration between the second LPA 1880 and the second eSIM 1870. In this process, when there is encrypted data in the bound profile, the second eSIM 1870 may generate a session key using otSK.EUICC2.KA and otPK.EUICC1.KA, and then decrypt the data using the key. Further, when the digital signature value is included in the bound profile, the second eSIM 1870 may verify the validity of the digital signature value using Euicc1.Certificate.

Figure 19:
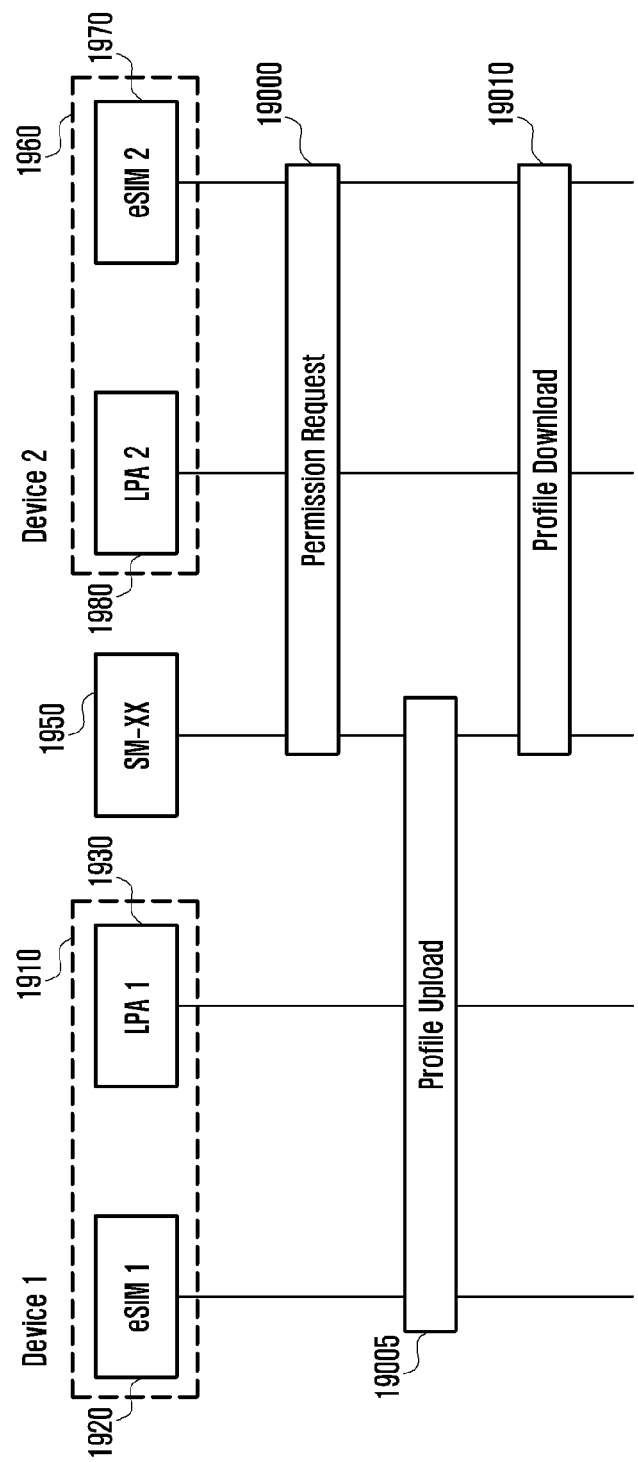
FIG. 19 illustrates a message flow diagram conceptually illustrating a procedure in which a service related to a profile used in one terminal is moved to another terminal using an online method according to an embodiment of the disclosure.

FIG. 19 illustrates a message flow diagram conceptually illustrating a procedure in which a profile or a service related to the profile is moved online from one terminal to another terminal according to an embodiment of the disclosure.

Referring to FIG. 19, the terminal may include at least one LPA and at least one eSIM. For example, as illustrated in FIG. 19, a first terminal 1910 may include a first LPA 1930 and a first eSIM 1920, and a second terminal 1960 may include a second LPA 1980 and a second eSIM 1970. A description of the RSP server will be described with reference to FIG. 14.

In step 19000, the second terminal 1960 may receive approval for moving the service related to the profile to an RSP server 1950. A more detailed description of the procedure will be described with reference to the detailed description of FIG. 20.

In step 19005, the first terminal 1910 may perform a series of operations on a (service related) profile to be moved according to a request of the RSP server 1950. For example, the first terminal 1910 may upload a profile thereof to the RSP server 1950. As another example, the first terminal 1910 may delete a profile thereof. A more detailed description of the procedure will be described with reference to the detailed description of FIG. 21.

In step 19010, the second terminal 1960 may download and install a profile from the RSP server 1950. A more detailed description of the procedure will be described with reference to the detailed description of FIG. 22.

Figure 20:
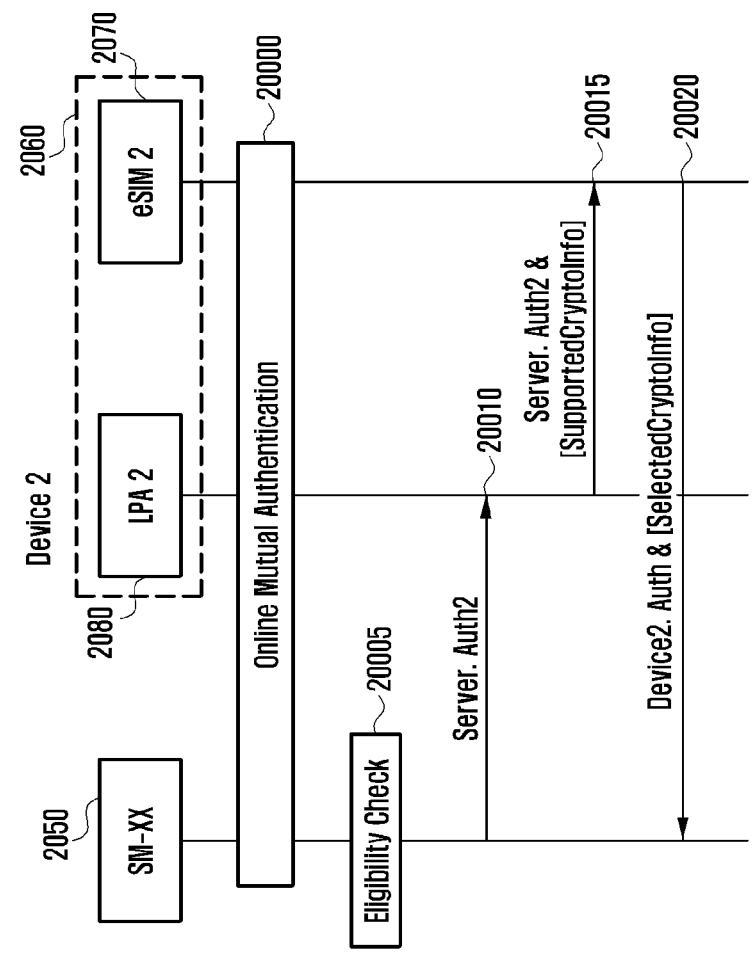
FIG. 20 illustrates a message flow diagram of a procedure in which a second terminal receives approval for moving a service related to a profile from an RSP server among the procedures presented in FIG. 19 according to an embodiment of the disclosure.

FIG. 20 illustrates a message flow diagram of a procedure in which a second terminal 2060 receives approval for moving a service related to the profile from an RSP server 2050 among the procedures presented in FIG. 19 according to an embodiment of the disclosure.

Referring to FIG. 20, the terminal may include at least one LPA and at least one eSIM. For example, the second terminal 2060 may include a second LPA 2080 and a second eSIM 2070. A description of the RSP server 2050 will be described with reference to FIG. 14.

Referring to FIG. 20, in step 20000, mutual authentication may be performed between the second terminal 2060 and the RSP server 2050. The mutual authentication process may include one or more of the following processes.

The mutual authentication process may include a certificate negotiation process in which the second terminal and the RSP server should go through in order to communicate. For example, the second terminal may transmit certificate information that may be used for verifying the RSP server and/or certificate information that may be used by the RSP server for verifying the second terminal to the RSP server. The RSP server that has received the information may select certificate information to be used by the second terminal for verifying the RSP server and/or certificate information to be used by the RSP server for verifying the second terminal. In this case, the certificate information selected by the RSP server may be transmitted to the second terminal. Through such a process, the second terminal and the RSP server may obtain certificate information that can authenticate each other. In this case, the certificate information may be a certificate, information included in the certificate, and/or a series of information that may refer to the certificate.

The second terminal may transmit a random number (eUICC Challenge) value generated by itself to the RSP server. The RSP server may digitally sign the received random number value and then transmit a signature value to the second terminal. The second terminal may verify the received signature value to authenticate the RSP server.

The RSP server may transmit a random number (server challenge) value generated by itself to the second terminal. The second terminal may digitally sign the received random number value and then transmit a signature value to the RSP server. The RSP server may verify the received signature value to authenticate the second terminal.

While the RSP server and the second terminal communicate, an ID (Transaction ID) for managing a session may be exchanged. For example, the RSP server may generate a transaction ID and transmit the value to the second terminal. In this case, the digital signature value of the RSP server may be added to check the reliability and integrity of the transaction ID.

The RSP server and the second terminal may exchange a profile identifier of a profile related to a service to be moved in the disclosure. For example, the second terminal may transmit a profile identifier of a profile related to a service to be received by itself to the RSP server. In this case, the profile identifier may be transmitted together with the digital signature value of the second terminal in order to ensure reliability and integrity.

The RSP server and the second terminal may exchange IDs with each other.

For example, the RSP server may provide an object identifier (OID) thereof to the second terminal. As another example, the second terminal may provide an eUICC identifier thereof to the RSP server.

The second terminal may transmit the "determined option" to the RSP server.

The following process may be performed in step 20005.

The RSP server 2050 may check the received "determined option". In particular, the RSP server 2050 may check the received profile identifier, select 'profile movement setting' associated with the corresponding profile, and check whether online movement methods included in the "determined option" are online movement methods allowed in the 'profile movement setting'.

In order to check whether a service desired by the second terminal to be moved may be used by the second terminal, the RSP server 2050 may perform an 'eligibility check'. For example, the RSP server 2050 may perform a 'eligibility check' using the received eUICC identifier of the second terminal and the received profile identifier.

For example, the RSP server 2050 may check whether a profile image used in the first terminal may be installed and operated in the second terminal. As another example, the RSP server 2050 may check whether a profile package stored in the first terminal may be installed and operated in the second terminal. Further, the RSP server 2050 may check whether it is possible to generate a profile that may be installed and operated in the second terminal in relation to the service to be moved.

In other words, the RSP server 2050 may check option(s) that can actually be performed (i.e., the service used in the first terminal moves to the second terminal as a result of the execution) among the "determined options". The RSP server 2050 may select one of these available option(s) to generate a transfer option.

For example, the "transfer option" may include at least one of the following data.
a) Information indicating the RSP server 2050 (e.g., the OID of the RSP server)
b) Information indicating the second terminal 2060 (e.g., the eUICC identifier of the second eSIM)
c) Profile identifier of the profile related to the service to be moved
d) Information indicating which type of online movement will proceed
  Online image transfer
  Online package transfer
  Re-provisioning
  Online movement is not possible
e) Information indicating which of "end-to-end encryption between the first terminal and the second terminal" and "encryption between the second terminal and the RSP server" will be used
f) Transaction ID Part and/or all of the above-described information may be digitally signed by the RSP server 2050, and a digital signature value may be included as part of the "transfer options".

In step 20010, the RSP server 2050 may transmit a transfer option to the second LPA 2080. Further, the RSP server 2050 may transmit a certificate of the RSP server used for the digital signature in step 20005 and related information to the second LPA 2080. A series of information transmitted by the RSP server 2050 to the second LPA 2080 may be referred to as Server.Auth2.

The following process may be performed in step 20015.

The second LPA 2080 may check the received transfer option and then receive end user consent.

The second LPA 2080 may transmit Server.Auth2 to the second eSIM 2070.

The second LPA 2080 may further selectively transmit 'supported crypto info' to the second eSIM 2070.

The following process may be performed in step 20020.

The second eSIM 2070 may verify the validity of the certificate and related information received in step 20015.

The second eSIM 2070 may verify the validity of the digital signature value received in step 20015.

The second eSIM 2070 may check the content of the transfer option received in step 20015.

When the 'supported crypto info' is received, the second eSIM 2070 may check the contents of the received 'supported crypto info' and check whether an encryption algorithm supported by the second eSIM 2070 exists. When there are encryption algorithms supported by the second eSIM in the received supported crypto info, the second eSIM 2070 may select one of them and set it as the 'selected crypto info'. The 'selected encryption algorithm' may optionally include one or more of the following information: elliptic curve information, key agreement algorithm information, and encryption algorithm information.

The second eSIM 2070 may generate a public key "otPK.EUICC.KA" and a private key "otSK.EUICC.KA", which are a key pair for encryption to be used for generating an encryption key for encrypted communication. In this case, the generated encryption key may be for 'encrypted communication between the RSP server and the second terminal' or may be for 'encrypted communication between the first terminal and the second terminal'. In this case, when the generated encryption key is for 'encrypted communication between the first terminal and the second terminal', the encryption keys (otPK.EUICC.KA and otSK.EUICC.KA) may be an encryption key that follows an encrypted algorithm included in the above-described selected crypto info.

The second eSIM 2070 may transmit the generated otPK.EUICC.KA to the RSP server 2050 via the second LPA 2080. The encryption key may be digitally signed by the second eSIM, and a digital signature value may also be transmitted to the RSP server. The above encryption key and/or digital signature value may be referred to as Device2.Auth.

The second eSIM 2070 may further transmit the selected crypto info to the RSP server 2050 via the second LPA 2080.

Figure 21:
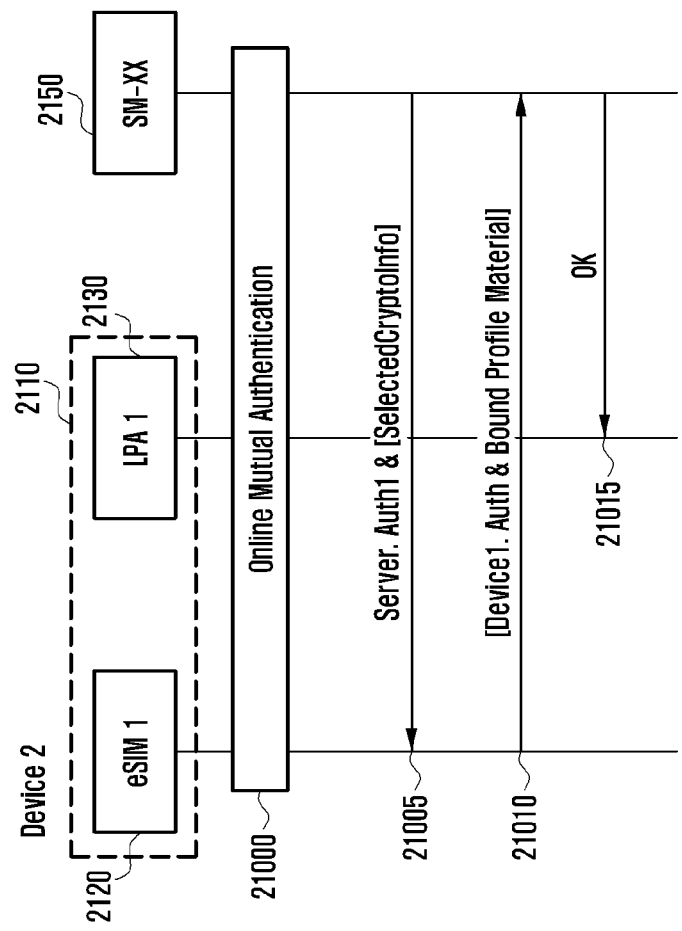
FIG. 21 illustrates a message flow diagram of a procedure in which a first terminal performs a series of operations on a profile related to a service to be moved according to a request of an RSP server among the procedures presented in FIG. 19 according to an embodiment of the disclosure.

FIG. 21 illustrates a message flow diagram of a procedure in which a first terminal 2110 performs a series of operations on a profile related to a service to be moved according to a request from an RSP server 2150 among the procedures presented in FIG. 19 according to an embodiment of the disclosure.

Referring to FIG. 21, the terminal may include at least one LPA and at least one eSIM. For example, the first terminal 2110 may include a first LPA 2130 and a first eSIM 2120. A description of the RSP server 2150 will be described with reference to FIG. 14.

Referring to FIG. 21, in step 21000, mutual authentication may be performed between the first terminal 2110 and the RSP server 2150. The mutual authentication process may include one or more of the following processes.

The mutual authentication process may include a certificate negotiation process in which the first terminal 2110 and the RSP server 2150 should go through in order to communicate. For example, the first terminal 2110 may transmit certificate information that may be used for verifying the RSP server 2150 and/or certificate information that may be used by the RSP server 2150 for verifying the first terminal 2110 to the server 2150. The RSP server 2150 that has received the information may select certificate information to be used by the first terminal 2110 for verifying the RSP server 2150 and/or certificate information to be used by the RSP server 2150 for verifying the first terminal 2110. In this case, the certificate information selected by the RSP server 2150 may be transmitted to the first terminal 2110. Through such a process, the first terminal 2110 and the RSP server 2150 may obtain certificate information that can authenticate each other. In this case, the certificate information may be a certificate, information included in the certificate, and/or a series of information that may indicate the certificate.

The first terminal 2110 may transmit a random number (eUICC Challenge) value generated by itself to the RSP server 2150. The RSP server 2150 may digitally sign the received random number value and then transmit a signature value to the first terminal 2110. The first terminal 2110 may verify the received signature value to authenticate the RSP server 2150.

The RSP server 2150 may transmit a random number (server challenge) value generated by itself to the first terminal 2110. The first terminal 2110 may digitally sign the received random number value and then transmit a signature value to the RSP server 2150. The RSP server 2150 may verify the received signature value to authenticate the first terminal 2110.

While the RSP server 2150 and the first terminal 2110 communicate, an ID (Transaction ID) for managing a session may be exchanged. For example, the RSP server 2150 may generate a transaction ID and transmit the value to the first terminal 2110. In this case, a digital signature value of the RSP server may be added to check the reliability and integrity of the transaction ID.

The RSP server 2150 and the first terminal 2110 may exchange a profile identifier related to a profile to be transmitted in the disclosure. For example, the first terminal 2110 may transmit an identifier of a profile to be transmitted by itself to the RSP server 2150. In this case, in order to ensure reliability and integrity, the profile identifier may be transmitted together with the digital signature value of the first terminal 2110.

The RSP server 2150 and the first terminal 2110 may exchange IDs with each other. For example, the RSP server 2150 may provide an object identifier (OID) thereof to the first terminal 2110. As another example, the first terminal 2110 may provide an eUICC identifier thereof to the RSP server 2150.

The following process may be performed in step 21005.
The RSP server 2150 may perform one or more of the following processes.
  a) The RSP server may check that the first terminal (e.g., the first eSIM) is a legitimate user of the current profile using an 'eUICC identifier of the first eSIM' and a 'profile identifier of the profile transmitted by the first terminal'.
  b) The RSP server may check whether a movement of a 'service related to the profile corresponding to the profile identifier transmitted by the first terminal' has already been requested by another terminal (e.g., the second terminal, as illustrated in FIG. 20). For example, the RSP server may check whether the 'profile identifier transmitted by the first terminal' is a profile identifier related to the service movement requested in FIG. 20.

As a result of the above check, it was checked that 'a legitimate user of the profile related to the profile identifier transmitted by the first terminal is the first terminal', and when the movement of the service related to the profile is requested by another terminal (e.g., the second terminal, as illustrated in FIG. 20), the RSP server may determine which action to be performed by the first terminal to generate a "transfer option" using the result of the "determined option" received in step 20000 and/or the "eligibility check" performed in step 20005. For example, the bundle management server may select one of movement methods that were allowed in the "determined option" and that can be simultaneously performed as the "eligibility check" result, and then configure a "transfer option" based on the movement method. For example, the "transfer option" may include at least one of the following data.
  a) Information indicating the RSP server 2150 (e.g., the OID of the RSP server)
  b) Information indicating the first terminal 2110 (e.g., the eUICC identifier of the first eSIM)
  c) Information indicating a second terminal 2060 (e.g., the eUICC identifier of the second eSIM)
  d) Profile identifier of the profile related to the service to be moved
  e) Information indicating information to be transmitted by the first terminal
  Profile image related to a service in which the first terminal wants to move
  Profile package related to a service in which the first terminal wants to move
  f) Whether the first terminal should delete a profile related to a service to be moved
  g) Information indicating which type of security should be used between "end-to-end encryption between the first terminal and the second terminal" and "encryption between the first terminal and the bundle management server"
  h) Transaction ID Part and/or all of the above-described information may be digitally signed by the RSP server, and a digital signature value may be included as part of the "transfer option".

The RSP server 2150 may generate a public key "otPK.DP.KA" and a private key "otSK.DP.KA", which are a key pair for encryption to be used for generating an encryption key for encrypted communication with the first eSIM 2120."

The RSP server 2150 may transmit a transfer option to the first eSIM 2120 via the first LPA 2130. The RSP server 2150 may transmit a public key otPK.XX.KA to the first eSIM 2120 via the first LPA 2130. In this case, otPK.XX.KA may be otPK.EUICC.KA received in step 20020, or otPK.DP.KA.

In this case, otPK.XX.KA and/or the transfer option transmitted from the RSP server 2150 to the first eSIM 2120 may be digitally signed by the RSP server 2150. The digital signature value may be transmitted from the RSP server 2150 to the first eSIM 2120 via the first LPA 2130. Further, the certificate and related information of the RSP server 2150 that may be used for verifying the digital signature may be transmitted from the RSP server 2150 to the first eSIM 2120 via the first LPA 2130.

The RSP server 2150 may further selectively transmit the selected crypto info received in step 20020 to the first eSIM 2120 via the first LPA 2130.

The first terminal 2110 (e.g., the first LPA 2130) may receive end user consent in relation to the received transfer option. That is, the first terminal 2110 may notify the user and receive end user consent on which type of movement will be performed based on the received transfer option.

The following process may be performed in step 21010.
The first eSIM 2120 may verify the validity of the certificate and related information received in step 21005.
The first eSIM 2120 may verify the validity of the digital signature value received in step 21005.
The first eSIM 2120 may check the content of the transfer option received in step 21005 and then perform at least one of the following processes.
The first eSIM 2120 may check whether it is necessary to transmit a profile image or a profile package by the first eSIM 2120 to the RSP server using the "transfer option".

If it is necessary to transmit a profile image or a profile package by the first eSIM 2120 to the RSP server, the first eSIM 2120 may prepare requested data. A detailed procedure thereof is as follows.

The first eSIM 2120 may check information included in the selected crypto Info.

The first eSIM 2120 may generate a public key "otPK.EUICC.KA" and a private key "otSK.EUICC.KA", which are a key pair for encryption to be used for generating an encryption key for encrypted communication. In this case, the generated encryption key may be for 'encrypted communication between the RSP server and the first terminal' or may be for 'encrypted communication between the first terminal and the second terminal'. Whether the generated encryption key is for which encrypted communication may be determined according to a value of otPK.XX.KA received in step 21005. Alternatively, whether the generated encryption key is for which encrypted communication may depend on the contents of "transfer option". The first eSIM 2120 may calculate a digital signature value of the generated otPK.EUICC.KA. The above-described otPK.EUICC.KA and/or digital signature value may be collectively referred to as Device1.Auth.

The first eSIM 2120 may generate a session key to be used for encrypted communication using "otSK.EUICC.KA" generated by itself and otPK.XX.KA received in step 21005.

The first eSIM 2120 may prepare a profile to be transmitted to the second terminal (in some cases, with the help of the first LPA). In this case, the type of the prepared profile may correspond to the transfer option received in step 21005. That is, the type of the prepared profile may be one of the following.

Profile image

Profile package

All and/or part of the prepared profile may be encrypted by the above-described session key. Further, all and/or part of the prepared profile may be digitally signed by the first terminal, and a digital signature value may be included as a part of the prepared profile.

The above-described 'prepared profile image' or 'prepared profile package' may be referred to as 'bound profile material'.

The first eSIM 2120 may check whether the RSP server wants to delete the corresponding profile using the "transfer option". When the RSP server wants to delete the corresponding profile, the first eSIM may delete the corresponding profile.

The first eSIM 2120 may transmit a "bound profile material" to the RSP server 2150 via the first LPA 2130. The first eSIM 2120 may further transmit Device1.Auth to the RSP server 2150 via the first LPA 2130.

The following process may be performed in step 21015.

The RSP server 2150 may verify the validity of the received Device1.Auth. The process may be performed by verifying the validity of the digital signature value calculated by the first eSIM for Device1.Auth.

Figure 22:
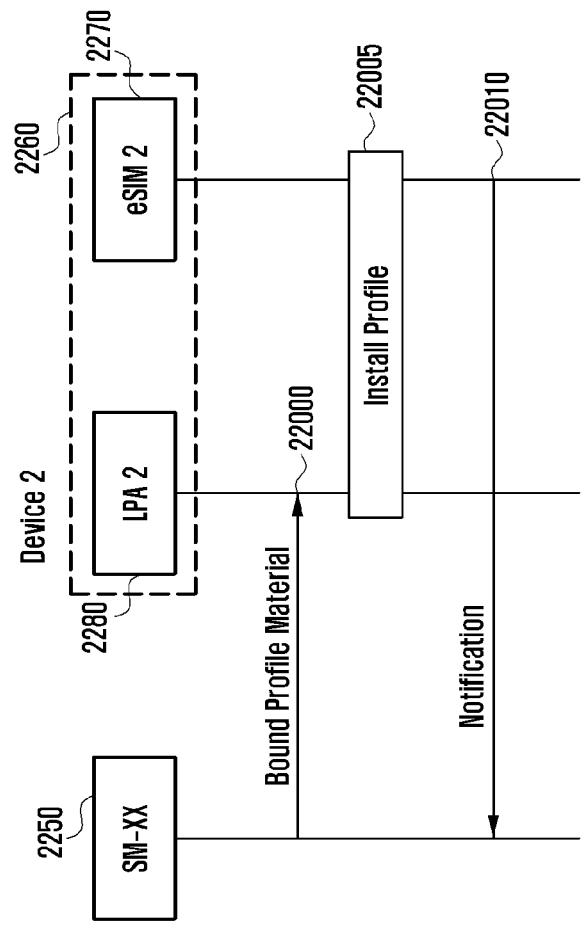
FIG. 22 illustrates a message flow diagram of a procedure in which a second terminal downloads and installs a profile from an RSP server among the procedures presented in FIG. 19 according to an embodiment of the disclosure.

FIG. 22 illustrates a message flow diagram of a procedure in which a second terminal 2260 downloads and installs a profile from an RSP server 2250 among the procedures presented in FIG. 19 according to an embodiment of the disclosure.

Referring to FIG. 22, the terminal may include at least one LPA and at least one eSIM. For example, the second terminal 2260 may include a second LPA 2280 and a second eSIM 2270. A description of the RSP server 2250 will be described with reference to FIG. 14.

Referring to FIG. 22, the following process may be performed in operation 22000.

The RSP server 2250 may prepare a profile to be transmitted to the second terminal 2260. Possible examples of the preparation process are as follows:

[CASE F]

In step 21010, when the RSP server receives a 'profile (profile image or profile package)' that is 'encrypted between the first terminal and the RSP server', the RSP server may perform decryption. In this case, the decryption may be performed using a session key generated using the otSK.DP.KA generated in step 21005 and the otPK.EUICC.KA of the first terminal received in step 21010. The decrypted profile may undergo an 'encryption process between the second terminal and the RSP server' for transmission to the second terminal. The RSP server 2250 may generate a public key "otPK.DP.KA" and a private key "otSK.DP.KA", which are a key pair to be used for generating an encryption key for 'encrypted communication between the second terminal and the RSP server'. The RSP server 2250 may generate a session key using the generated otSK.DP.KA and otPK.EUICC.KA of the second terminal received in step 20020, encrypt the profile using the key, and prepare for transmission.

[CASE G]

In step 21010, when the RSP server receives a 'profile (profile image or profile package)' that is 'encrypted between the first terminal and the second terminal', the RSP server may prepare the profile as a profile to be transmitted to the second terminal.

[CASE H]

In step 21010, when the RSP server does not receive a profile from the first terminal, the RSP server may generate a profile (e.g., profile package) to be transmitted to the second terminal. The RSP server 2250 may generate a public key "otPK.DP.KA" and a private key "otSK.DP.KA", which are a key pair to be used for generating an encryption key for 'encrypted communication between the second terminal and the RSP server'. The RSP server 2250 may generate a session key using the generated otSK.DP.KA and otPK.EUICC.KA of the second terminal received in step 20020, encrypt the profile using the key, and prepare for transmission.

The profile prepared in the above [CASE F] to [CASE H] may be referred to as a bound profile material.

The RSP server 2250 may transmit the 'bound profile material' to the second LPA 2280.

The following process may be performed in operation 22005.

The second LPA 2280 may verify the received 'bound profile material'. For example, the second LPA 2280 may check and verify the content of metadata included in the 'bound profile material'. Further, the second LPA 2280 may receive end user consent on whether to install the 'bound profile material'.

The second LPA 2280 and a second eSIM 2270 may install the received 'bound profile material' in the second eSIM.

In step 22010, the second eSIM 2270 may notify the RSP server 2250 that the profile has been installed via the second LPA 2280.

Figure 23:
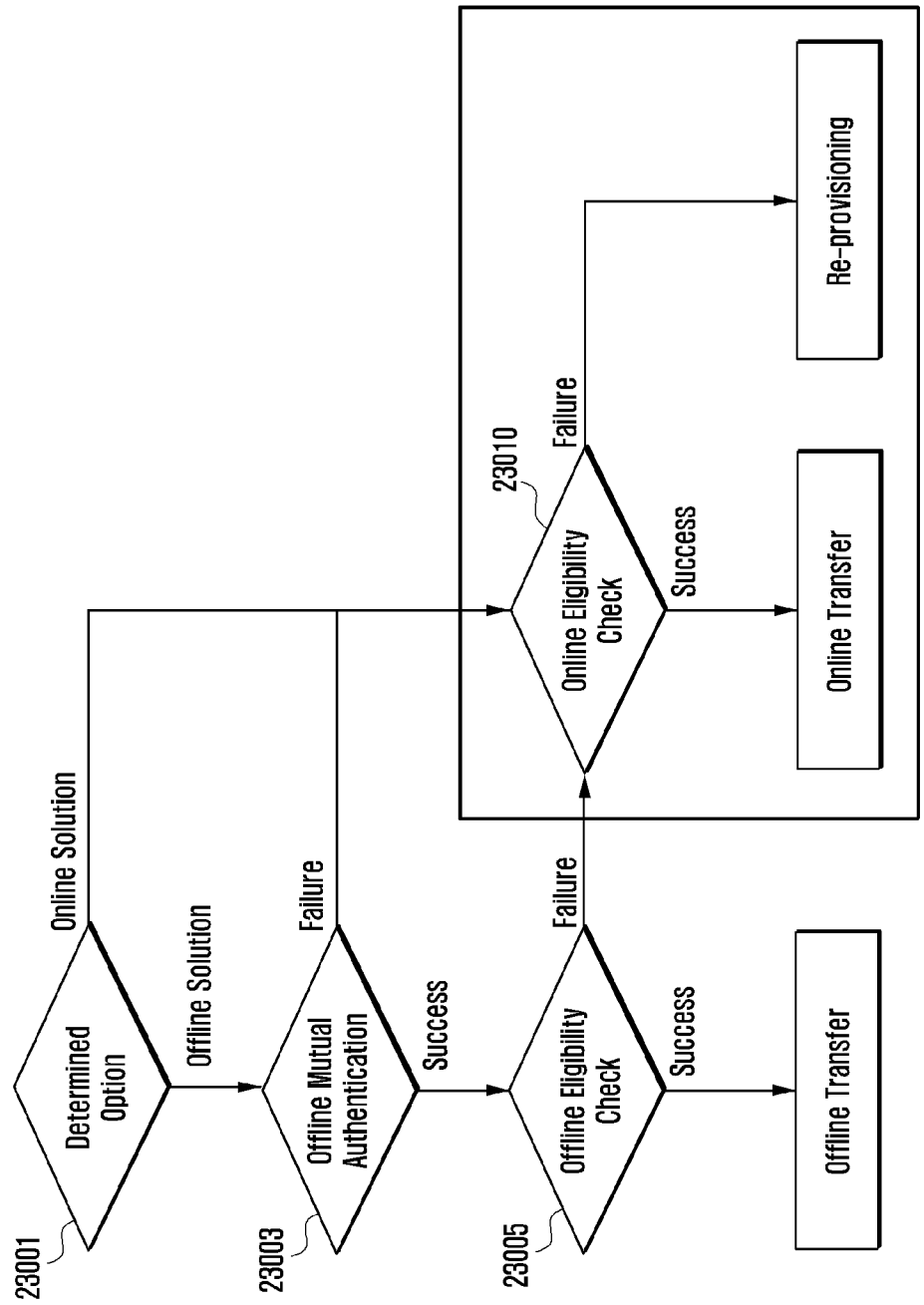
FIG. 23 illustrates a flowchart of an example of an overall process in which a profile or a service related to the profile is delivered from one terminal to another terminal through an offline or online movement method.

FIG. 23 illustrates a flowchart of an example of an overall process in which a profile or a service related to the profile is delivered from one terminal to another terminal through an offline or online movement method.

Referring to FIG. 23, a description of step 23001 is as follows.

The process illustrated in FIG. 15 is performed, and in step 15020, the second LPA may generate a "determined option".

In "determined options", "offline movement (or movement method(s) belonging to offline movement)" is included as an allowed option, and when at least one of the included offline movement or a movement option belonging to an offline movement is a method to be performed first among options included in the "determined option", step 23003 may be performed.

In "determined options", an "online movement" (or movement method(s) belonging to an online movement) is included as an allowed option, and when at least one of the included online movement or a movement option belonging to the online movement is a method to be performed first among options included in the "determined option", step 23010 may be performed.

The priority of which option is to be performed first among the options included in the "determined option" may be determined by various methods. That is, it may be determined by the policy of the service provider or may be determined by the policy of the terminal manufacturer.

Information on the priority of which option should be performed first among the options included in the "determined option" may be stored in the terminal.

A description of step 23003 is as follows.

Steps 17000 to 17025 illustrated in FIG. 17 may be performed.

In step 17030 illustrated in FIG. 17, a "certificate negotiation process" fails (e.g., 'the second eSIM checks certificate information that may use for verifying the first eSIM', and when certificate information capable of verifying the first eSIM is not included therein, or 'the first eSIM checks certificate information that may use for verifying the second eSIM' and when certificate information in which the first eSIM may be used for verifying other eSIMs is not included), and when the "determined option" includes an "online movement" (or movement method(s) belonging to an online movement), step 23010 may be performed. A more detailed description of the process will be described with reference to FIG. 17.

When a "certificate negotiation process" is successful in step 17030 illustrated in FIG. 17, step 23005 may be performed.

A description of step 23005 is as follows.

Steps 17035 to 17045 illustrated in FIG. 17 may be performed.

As a result of an "eligibility check" in step 18000 illustrated in FIG. 18, when an offline movement is not possible, but an "online movement" (or movement method(s) belonging to an online movement) is included in the "determined option", step 23010 may be performed. A more detailed description of the process will be described with reference to FIG. 18.

As a result of an "eligibility check" in step 18000 illustrated in FIG. 18, when offline movement is possible, the remaining processes presented in FIG. 18 may be performed. In this way, "a process in which two terminals establish a connection without an RSP server therebetween, and in which a profile (profile package or profile image) moves from one terminal to another terminal through the connection" may be referred to as offline movement" or "offline transfer".

A description of step 23010 is as follows.

A process illustrated in FIG. 20 may be performed.

Step 21000 of the process illustrated in FIG. 21 may be performed.

In step 21005 of the process illustrated in FIG. 21, the RSP server may generate a "transfer option". The definition and generation process of "transfer option" refer to the description of FIG. 21.

When the first terminal needs to transmit a profile to the RSP server in the "transfer option", data requested in step 21010 is transmitted from the first terminal to the RSP server. Next, the process of FIG. 22 may be performed by transmitting the profile received by the RSP server to the second terminal. In this way, "a process in which two terminals and the RSP server, respectively establish a connection and move a profile (profile package or profile image) from one terminal to another terminal with the help of the RSP server" may be referred to as "online transfer".

When there is no need for the first terminal to transmit a profile to the RSP server in the "transfer option", there is no need to transmit profile related data in step 21010. Next, a process of FIG. 22 may be performed when the RSP server generates a profile and transmits the profile to the second terminal. In this way, "a process in which two terminals and the RSP server, respectively establish a connection, but in which the profile of the terminal where the original profile was installed is selectively deleted and in which the RSP server generates a profile related to a service to be moved and transmits the profile to another terminal" may be referred to as "re-provisioning".

Figure 24:
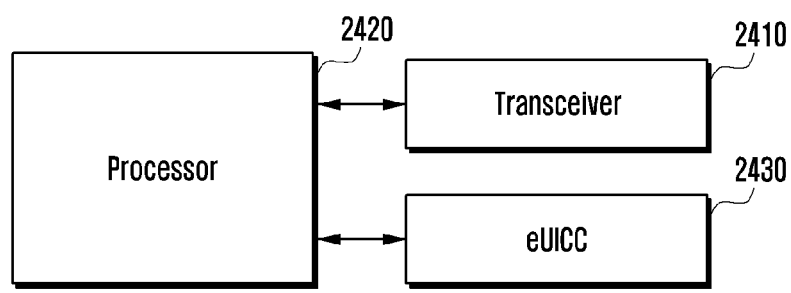
FIG. 24 illustrates a block diagram of a configuration of a terminal equipped with an eUICC according to some embodiments of the disclosure.

FIG. 24 illustrates a block diagram of a configuration of a terminal equipped with an eUICC according to some embodiments of the disclosure.

Referring to FIG. 24, the terminal may include a transceiver 2410, a processor 2420, and an eUICC 2430. Some of the above-described terminal(s) in the disclosure may correspond to the terminal described in FIG. 24. However, a configuration of the terminal is not limited to that of FIG. 24, and may include more or fewer components than the components illustrated in FIG. 24. According to some embodiments, the transceiver 2410, the processor 2420, and the eUICC 2430 may be implemented in the form of one chip. Further, the terminal may further include a memory, and the processor 2420 may be configured as at least one processor.

According to various embodiments, the transceiver 2410 may transmit and receive signals, information, data, and the like according to various embodiments of the disclosure to and from a transceiver of another terminal or an external server. The transceiver 2410 may include an RF transmitter for up-converting and amplifying a frequency of a transmitted signal, and an RF receiver for low-noise amplifying a received signal and down-converting a frequency thereof. However, this is only an embodiment of the transceiver 2410, and components of the transceiver 2410 are not limited to the RF transmitter and the RF receiver. Further, the transceiver 2410 may receive a signal through a wireless channel and output the signal to the processor 2420, and transmit the signal output from the processor 2420 through the wireless channel.

The processor 2420 is a component for overall controlling the terminal. The processor 2420 may control the overall operation of the terminal according to various embodiments of the disclosure, as described above.

The terminal may further include a memory (not illustrated), and store data such as a basic program, an application program, and configuration information for an operation thereof. Further, the memory may include at least one storage medium of a flash memory type, a hard disk type, a multimedia card micro type, a card type memory (e.g., SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Further, the processor 2420 may perform various operations using various programs, contents, data, and the like stored in the memory.

Figure 25:
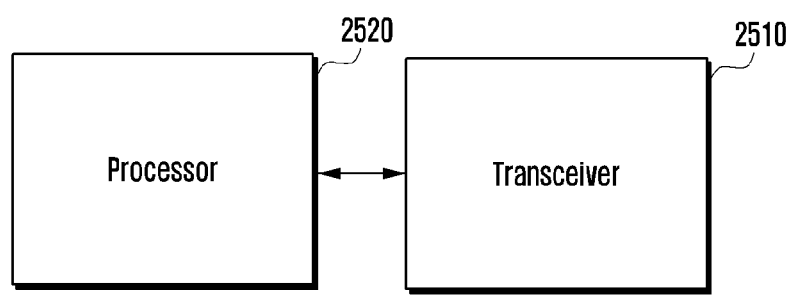
FIG. 25 illustrates a block diagram of a configuration of an RSP server according to some embodiments of the disclosure.

FIG. 25 illustrates a block diagram of a configuration of an RSP server according to some embodiments of the disclosure.

Referring to FIG. 25, the server may include a transceiver 2510 and a processor 2520. Some of the above-described server(s) in the disclosure may correspond to the server illustrated in FIG. 25. However, a configuration of the server is not limited to that of FIG. 25, and may include more or fewer components than those illustrated in FIG. 25. According to some embodiments, the transceiver 2510 and the processor 2520 may be implemented in the form of one chip. Further, the server may further include a memory, and the processor 2520 may be configured as at least one processor.

According to some embodiments, the transceiver 2510 may transmit and receive signals, information, data, and the like according to various embodiments of the disclosure to and from the terminal. The transceiver 2510 may include an RF transmitter for up-converting and amplifying a frequency of a transmitted signal, and an RF receiver for low-noise amplifying a received signal and down-converting a frequency thereof. However, this is only an embodiment of the transceiver 2510, and components of the transceiver 2510 are not limited to the RF transmitter and the RF receiver. Further, the transceiver 2510 may receive a signal through a wireless channel and output the signal to the processor 2520, and transmit the signal output from the processor 2520 through the wireless channel.

At least one processor 2520 is a component for overall controlling the server. The processor 2520 may control the overall operation of the server according to various embodiments of the disclosure, as described above. The one or more processors 2520 may be referred to as a controller.

The server may further include a memory (not illustrated), and store data such as a basic program, an application program, and configuration information for an operation thereof. Further, the memory may include at least one storage medium of a flash memory type, a hard disk type, a multimedia card micro type, a card type memory (e.g., SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Further, the processor 2520 may perform various operations using various programs, contents, data, and the like stored in the memory.

In the specific embodiments of the disclosure described above, components included in the disclosure are represented in the singular or plural according to the specific presented embodiments. However, the singular or plural expression is appropriately selected for a presented situation for convenience of description, and the disclosure is not limited to the singular or plural component, and even if the component is represented in plural, the component may be configured with the singular or even if the component is represented in the singular, the component may be configured with the plural.

Although specific embodiments have been described in the detailed description of the disclosure, various modifications are possible without departing from the scope of the disclosure. Therefore, the scope of the disclosure should not be limited to the described embodiments and should be defined by the claims described below as well as the claims and equivalents.

Various embodiments of the disclosure and terms used therein are not intended to limit technology described in the disclosure to a specific embodiment, and should be understood to include various modifications, equivalents, and/or substitutions of the embodiments. In connection with the description of the drawings, like reference numerals may be used for like components. The singular expression may include the plural expression unless the context clearly dictates otherwise. In this disclosure, expressions such as "A or B", "at least one of A and/or B", and "A, B or C" or "at least one of A, B and/or C" may include all possible combinations of items listed together. Expressions such as "first" and "second" may modify the corresponding components regardless of order or importance, and are only used for distinguishing one component from another component but do not limit the components. When an (e.g., first) component is referred to as being "connected (functionally or communicatively)" or "accessed" to another (e.g., second) component, the component may be directly connected to the other component or may be connected through the other component (e.g., third component).

The term "module" used in the disclosure includes a unit configured with hardware, software, or firmware, and may be used interchangeably with terms such as, for example, logic, logic block, component, or circuit. The module may be an integrally formed component or a minimum unit or a part of performing one or more functions. For example, the module may be configured with an application-specific integrated circuit (ASIC).

Various embodiments of the disclosure may be implemented into software (e.g., program) including instructions stored in storage media (e.g., internal memory or external memory) readable by a machine (e.g., computer). The device is a device capable of calling a stored instruction from a storage medium and operating according to the called instruction, and may include a terminal according to various embodiments. When the command is executed by a processor (e.g., the processor 1420 of FIG. 14), the processor may perform a function corresponding to the command using other components directly or under the control of the processor. The command may include code generated or executed by a compiler or an interpreter.

The device readable storage medium may be provided in the form of a non-transitory storage medium. Here, 'non-transitory' means that the storage medium does not include a signal and is tangible, and does not distinguish that data is semi-permanently or temporarily stored in the storage medium.

Methods according to various embodiments disclosed in the disclosure may be provided by being included in a computer program product. Computer program products may be traded between sellers and buyers as commodities. The computer program product may be distributed in the form of a machine readable storage medium (e.g., compact disc read only memory (CD-ROM)) or online through an application store (e.g., Play Store™). In the case of online distribution, at least a part of the computer program product may be at least temporarily stored or temporarily generated in a storage medium such as a memory of a server of a manufacturer, a server of an application store, or a relay server. Each of components (e.g., module or program) according to various embodiments may be configured with a singular entity or a plurality of entities, and some sub-components of the above-described sub-components may be omitted, or other sub-components may be further included in various embodiments. Alternatively or additionally, some components (e.g., module or program) may be integrated into a single entity to perform the same or similar functions performed by each corresponding component prior to integration. Operations performed by a module, a program, or other component according to various embodiments may be sequentially, parallelly, repetitively, or heuristically executed, at least some operations may be executed in different order, omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first terminal in a wireless communication system, the method comprising:
   obtaining profile information;
   setting an available transfer option based on the profile information, wherein the available transfer option includes at least one of an offline transfer, an online transfer, or a re-provisioning;
   generating a transfer code including the available transfer option;
   transmitting, to a second terminal, the transfer code, wherein a transfer option is determined based on the transfer code;
   performing an offline mutual authentication, in case that the determined transfer option is an offline transfer;
   in case that the offline mutual authentication is a success, performing an offline eligibility check; and
   in case that the offline mutual authentication is a failure, performing an online eligibility check.

2. The method of claim 1, further comprising:
   in case that the offline eligibility check is a success, performing an offline transfer; and
   in case that the offline eligibility check is a failure, performing an online eligibility check.

3. The method of claim 1, further comprising:
   performing an online eligibility check;
   in case that the online eligibility check is a success, performing an online transfer; and
   in case that the online eligibility check is a failure, performing a re-provisioning.

4. The method of claim 1, wherein the second terminal is an embedded Subscriber Identity Module (eSIM) or an Integrated Smart Secure Platform (iSSP).

5. The method of claim 1, wherein the profile information comprises at least one of a movement setting of a profile, a movement function implemented in the first terminal, or a possible connection method between the first terminal with a server.

6. A method performed by a second terminal in a wireless communication system, the method comprising:
   receiving, from a first terminal, a transfer code including an available transfer option, wherein the available transfer option includes at least one of an offline transfer, an online transfer, or a re-provisioning;
   determining a transfer option based on the transfer code;
   performing an offline mutual authentication, in case that the determined transfer option is an offline transfer;
   in case that the offline mutual authentication is a success, performing an offline eligibility check; and
   in case that the offline mutual authentication is a failure, performing an online eligibility check,
   wherein the available transfer option is set based on profile information.

7. The method of claim 6, further comprising:
   in case that the offline eligibility check is a success, performing an offline transfer; and
   in case that the offline eligibility check is a failure, performing an online eligibility check.

8. The method of claim 6, further comprising:
   performing an online eligibility check;
   in case that the online eligibility check is a success, performing an online transfer; and
   in case that the online eligibility check is a failure, performing a re-provisioning.

9. The method of claim 6, wherein the second terminal is an embedded Subscriber Identity Module (eSIM) or an Integrated Smart Secure Platform (iSSP).

10. The method of claim 6, wherein the profile information comprises at least one of a movement setting of a profile, a movement function implemented in the first terminal, or a possible connection method between the first terminal with a server.

11. A first terminal in a wireless communication system, the first terminal comprising:
    a transceiver; and
    a controller coupled with the transceiver and configured to control to:
       obtain profile information,
       set an available transfer option based on the profile information, wherein the available transfer option includes at least one of an offline transfer, an online transfer, or a re-provisioning,
       generate a transfer code including the available transfer option,
       transmit, to a second terminal, the transfer code, wherein a transfer option is determined based on the transfer code,
       perform an offline mutual authentication, in case that the determined transfer option is an offline transfer;
       in case that the offline mutual authentication is a success, perform an offline eligibility check; and
       in case that the offline mutual authentication is a failure, perform an online eligibility check.

12. The first terminal of claim 11, wherein the controller is further configured to:
    perform an offline transfer, in case that the offline eligibility check is a success, and
    perform an online eligibility check, in case that the offline eligibility check is a failure.

13. The first terminal of claim 11, wherein the controller is further configured to:
    perform an online eligibility check,
    perform an online transfer, in case that the online eligibility check is a success, and
    performing a re-provisioning, in case that the online eligibility check is a failure.

14. The first terminal of claim 11, wherein the second terminal is an embedded Subscriber Identity Module (eSIM) or an Integrated Smart Secure Platform (iSSP).

15. A second terminal in a wireless communication system, the second terminal comprising:
- a transceiver; and
- a controller coupled with the transceiver and configured to control to:
  - receive, from a first terminal, a transfer code including an available transfer option, wherein the available transfer option includes at least one of an offline transfer, an online transfer, or a re-provisioning,
  - determine a transfer option based on the transfer code,
  - perform an offline mutual authentication, in case that the determined transfer option is an offline transfer,
  - perform an offline eligibility check, in case that the offline mutual authentication is a success, and
  - perform an online eligibility check, in case that the offline mutual authentication is a failure,
- wherein the available transfer option is set based on profile information.

16. The second terminal of claim 15, wherein the controller is further configured to:
- perform an offline transfer, in case that the offline eligibility check is a success, and
- perform an online eligibility check, in case that the offline eligibility check is a failure.

17. The second terminal of claim 15, wherein the controller is further configured to:
- perform an online eligibility check,
- perform an online transfer, in case that the online eligibility check is a success, and
- performing a re-provisioning, in case that the online eligibility check is a failure.

18. The second terminal of claim 15, wherein the second terminal is an embedded Subscriber Identity Module (eSIM) or an Integrated Smart Secure Platform (iSSP).

* * * * *